(12) United States Patent  (10) Patent No.: US 8,139,149 B2
Otake  (45) Date of Patent: Mar. 20, 2012

(54) STILL IMAGE ACQUISITION DEVICE, STILL IMAGE ACQUISITION METHOD, AND IMAGE FLUCTUATION CORRECTION DEVICE

(75) Inventor: Yoshichi Otake, Kanagawa-ken (JP)

(73) Assignee: Victor Company of Japan, Limited, Yokohama-shi, Kanagawa-ken (JP)

( * ) Notice: Subject to any disclaimer, the term of this patent is extended or adjusted under 35 U.S.C. 154(b) by 622 days.

(21) Appl. No.: 12/225,380

(22) PCT Filed: Mar. 22, 2007

(86) PCT No.: PCT/JP2007/055900
§ 371 (c)(1),
(2), (4) Date: Sep. 19, 2008

(87) PCT Pub. No.: WO2007/116636
PCT Pub. Date: Oct. 18, 2007

(65) Prior Publication Data
US 2010/0220200 A1  Sep. 2, 2010

(30) Foreign Application Priority Data

Mar. 22, 2006  (JP) ............................... P2006-079747
Mar. 30, 2006  (JP) ............................... P2006-094815

(51) Int. Cl.
*H04N 3/14* (2006.01)
*H04N 5/335* (2006.01)
(52) U.S. Cl. .................................................. 348/408.1
(58) Field of Classification Search ..... 348/208.1–208.6
See application file for complete search history.

(56) References Cited

U.S. PATENT DOCUMENTS
5,790,490 A  8/1998  Satoh et al.
(Continued)

FOREIGN PATENT DOCUMENTS
JP  06-090398  3/1994
(Continued)

OTHER PUBLICATIONS

Extended European Search Report issued Aug. 19, 2010, in counterpart European Application No. 07739343.7, seven (7) pages.

*Primary Examiner* — Gevell Selby
(74) *Attorney, Agent, or Firm* — The Nath Law Group; Jerald L. Meyer; Stanley N. Protigal

(57) ABSTRACT

A still image acquisition device includes: a fluctuation detection unit (5) for detecting a horizontal or a vertical fluctuation generated in an imaging device; light refraction means (10A, 10B) for refracting light into an arbitrary direction; hand shake control means (6A) for controlling the refraction direction of the light by the light refraction means; control amount detection means (8A, 8B) for detecting control amounts of the light refraction means (10A, 10B); angle calculation means (6B) for calculating the hand shake angle of the horizontal direction or the vertical direction from the detected control amounts; acquisition reference time decision means (6C) for deciding a reference time for acquiring a still image according to the time when the absolute value of the calculated hand shake angle of the horizontal direction or the vertical direction is zero or a minimum value; and a still image processing unit (25) for acquiring the hand shake-corrected image corresponding to a moment immediately after the decided acquisition reference time as a still image.

12 Claims, 46 Drawing Sheets

U.S. PATENT DOCUMENTS 6,987,529 B1 * 1/2006 Ito ............................ 348/208.2
2005/0168587 A1 8/2005 Sato et al.

FOREIGN PATENT DOCUMENTS

| | | |
|---|---|---|
| JP | 08-032864 | 2/1996 |
| JP | 08032864 * | 2/1996 |
| JP | 09-015670 | 1/1997 |
| JP | 09-051469 | 2/1997 |
| JP | 09-181959 | 7/1997 |
| JP | 10-042188 | 2/1998 |
| JP | 2000-019576 | 1/2000 |

* cited by examiner

FIG. 6
(a)
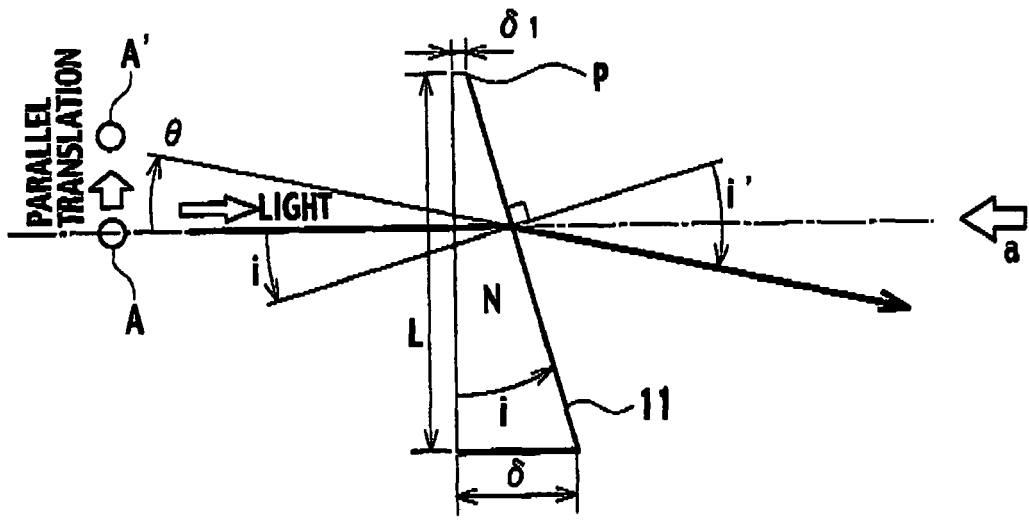
(b)
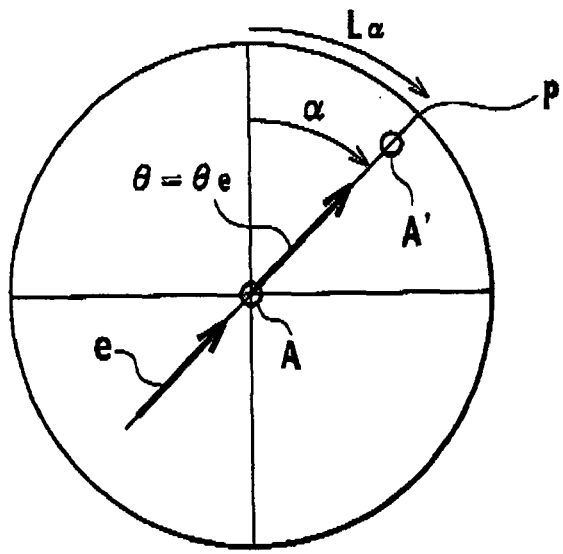

$\theta_1 = -(\theta_2 + \theta_3)$

FIG. 9
(a)
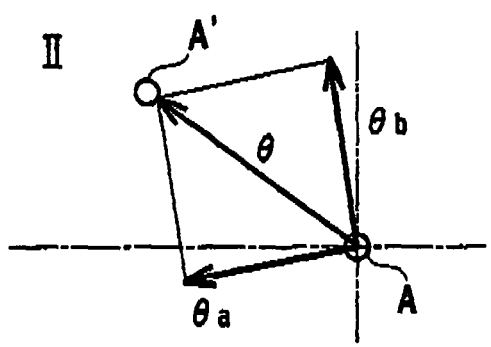
(b)
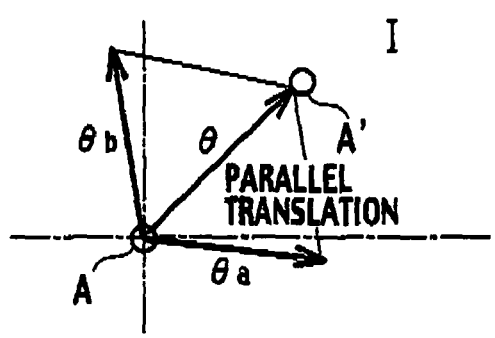
(c)
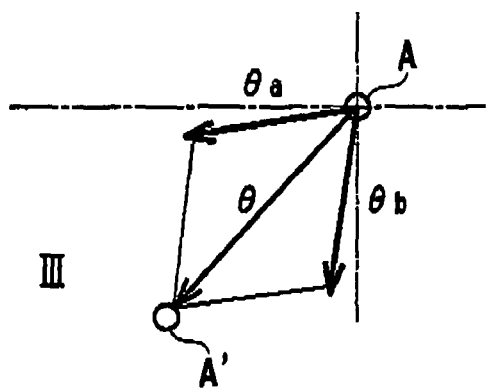
(d)
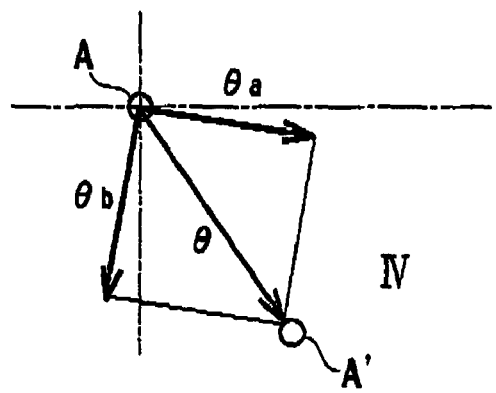

FIG. 10
(a)
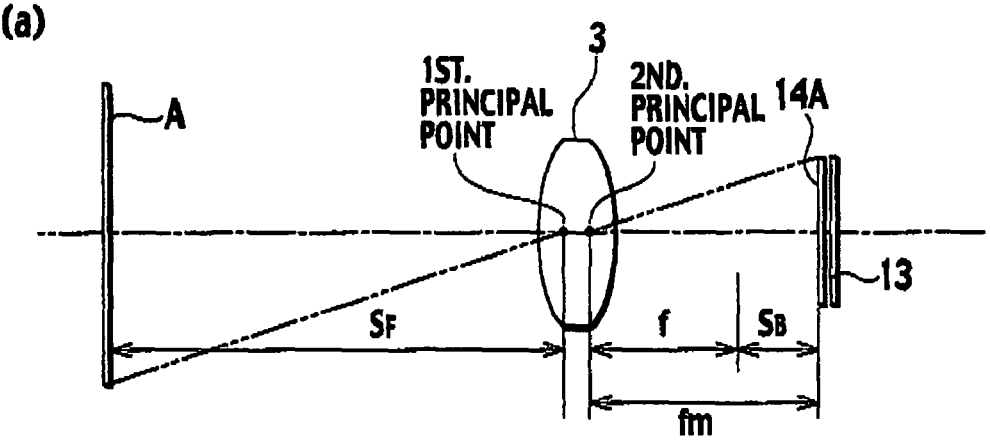
(b)
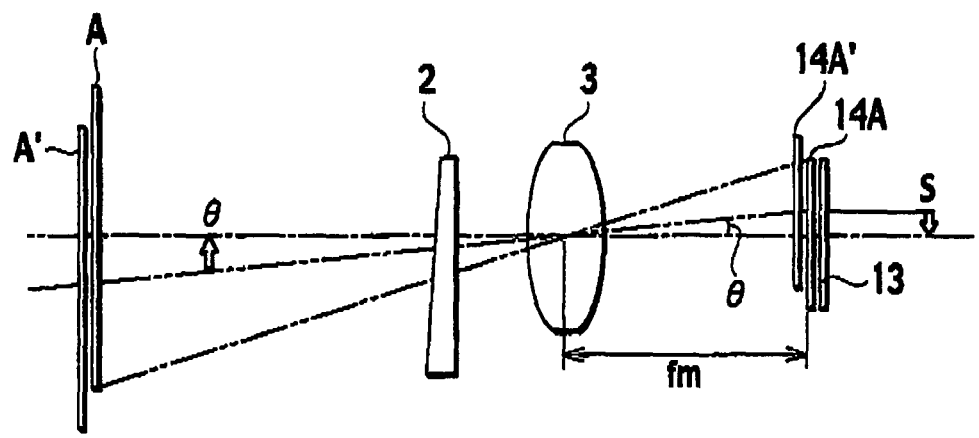

FIG. 11
(a)
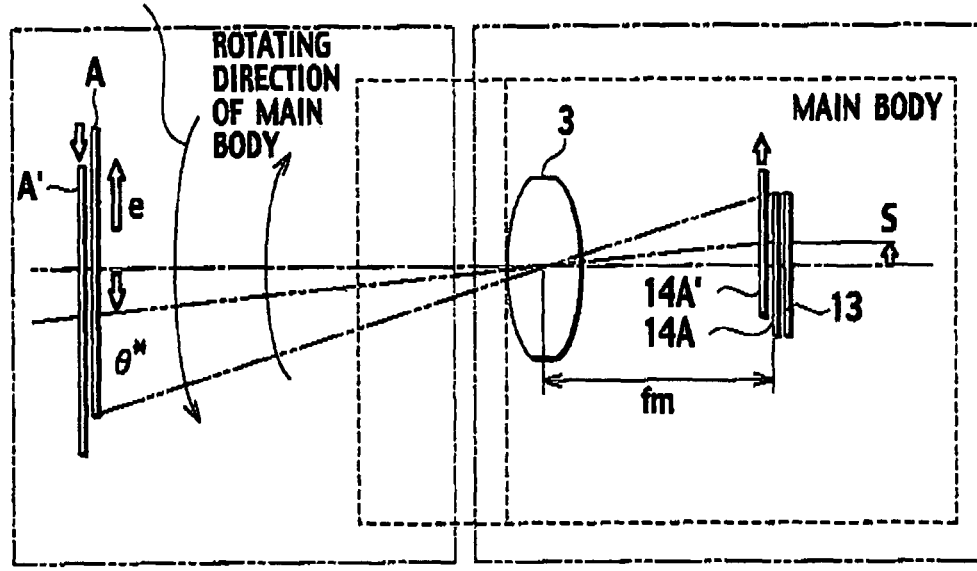
(b)
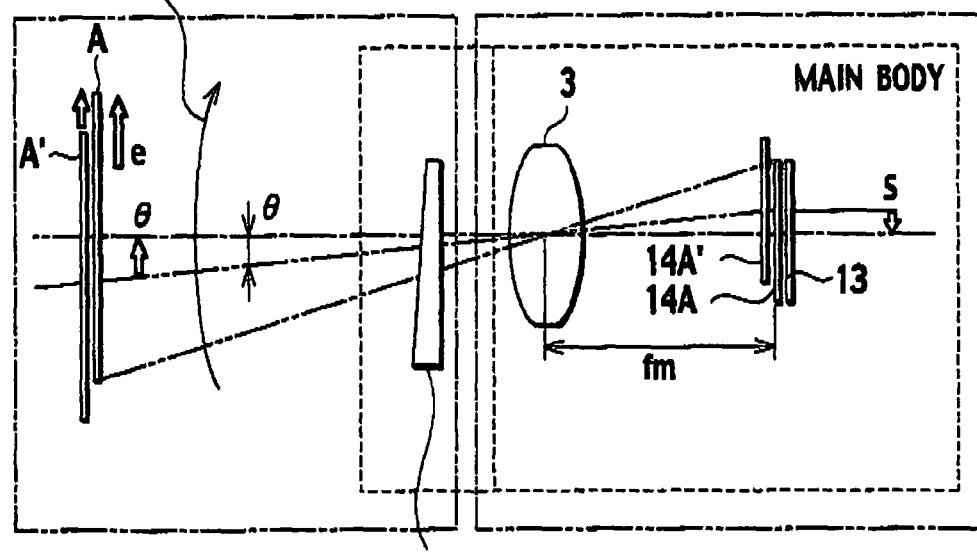

FIG. 21
(a)
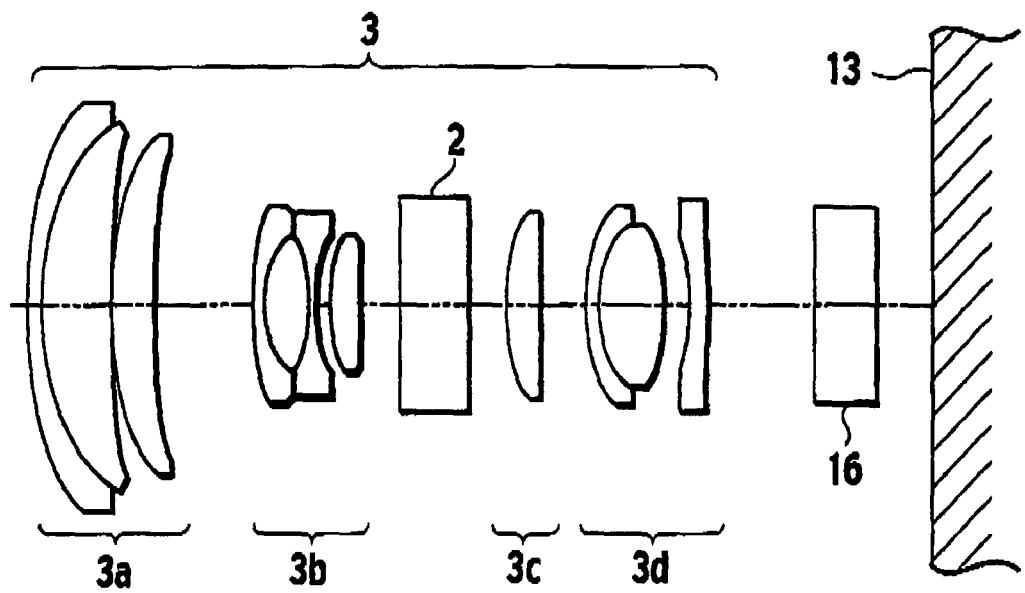
(b)
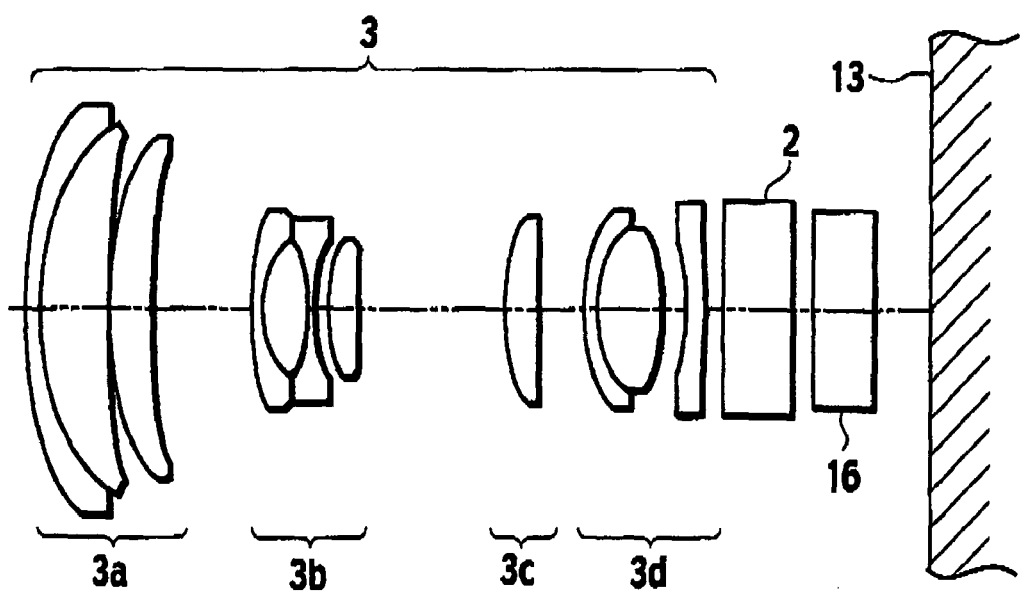

FIG. 23
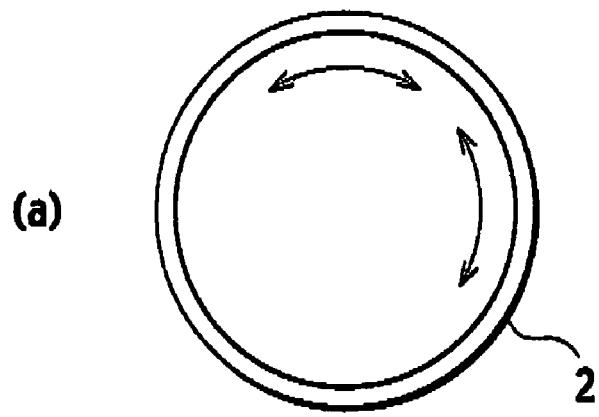
(a)
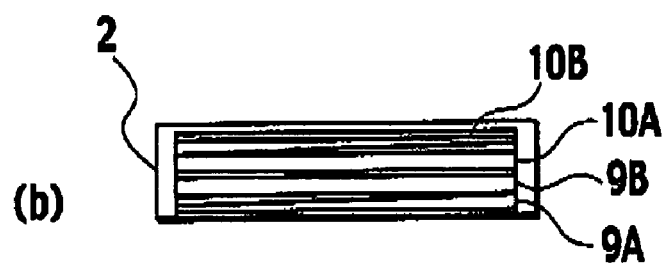
(b)
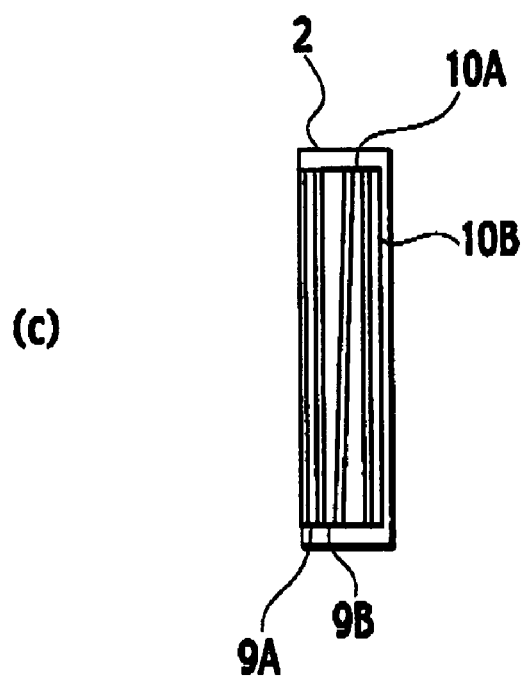
(c)

FIG. 30
(a)
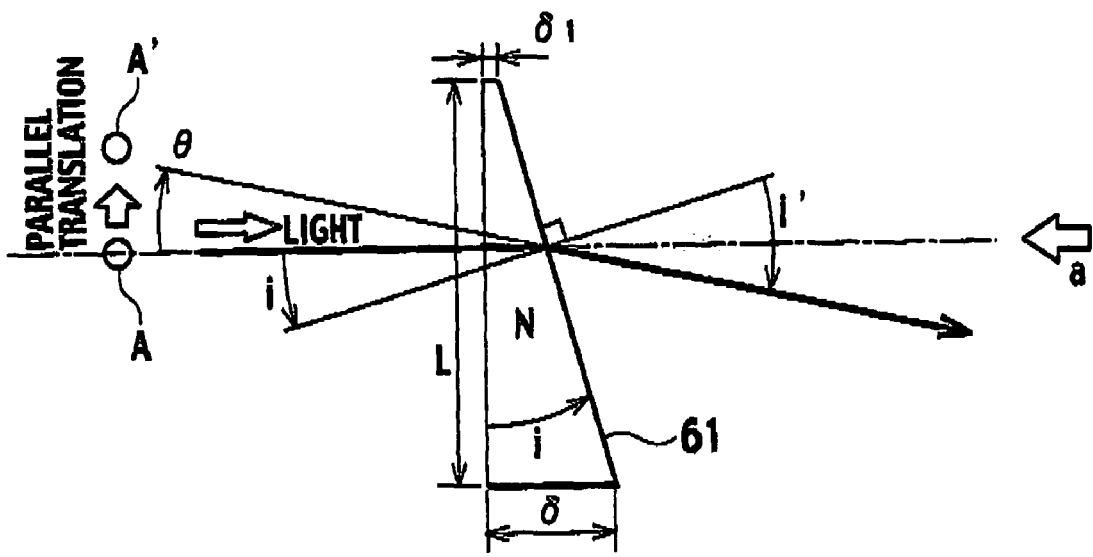
(b)
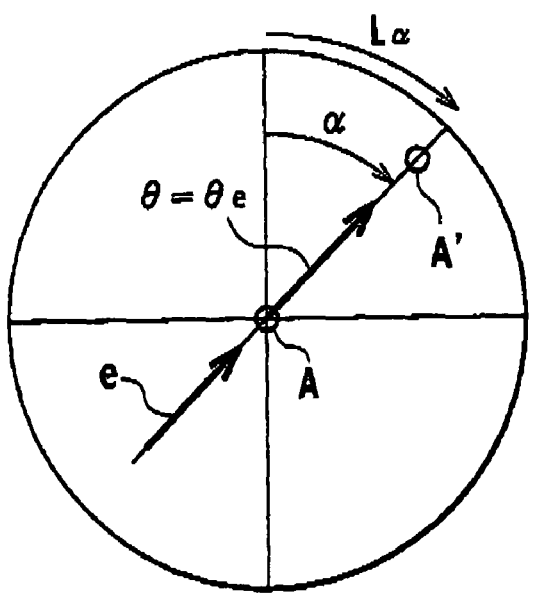

FIG. 34
(a)
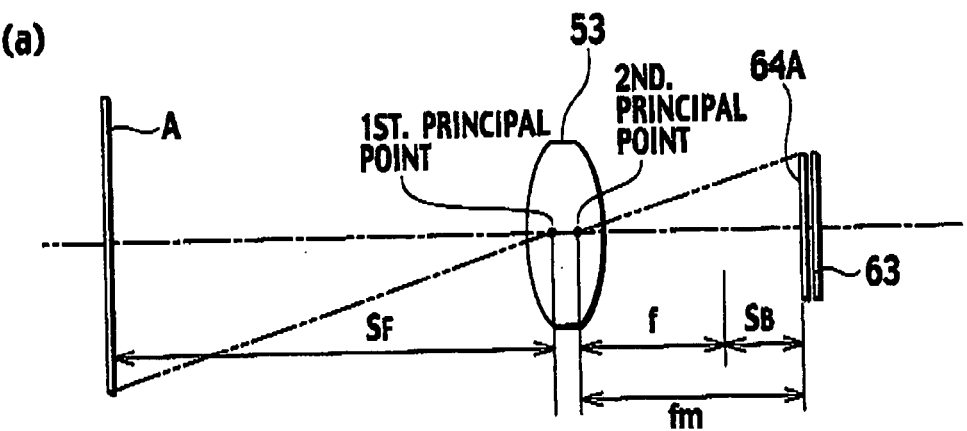
(b)
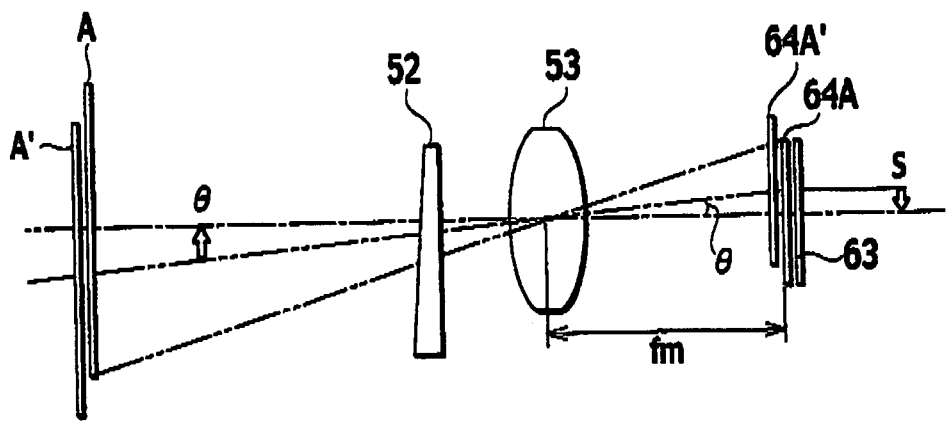

FIG. 35
(a)
RELATIVE ROTATING DIRECTION OF SUBJECT
ROTATING DIRECTION OF MAIN BODY
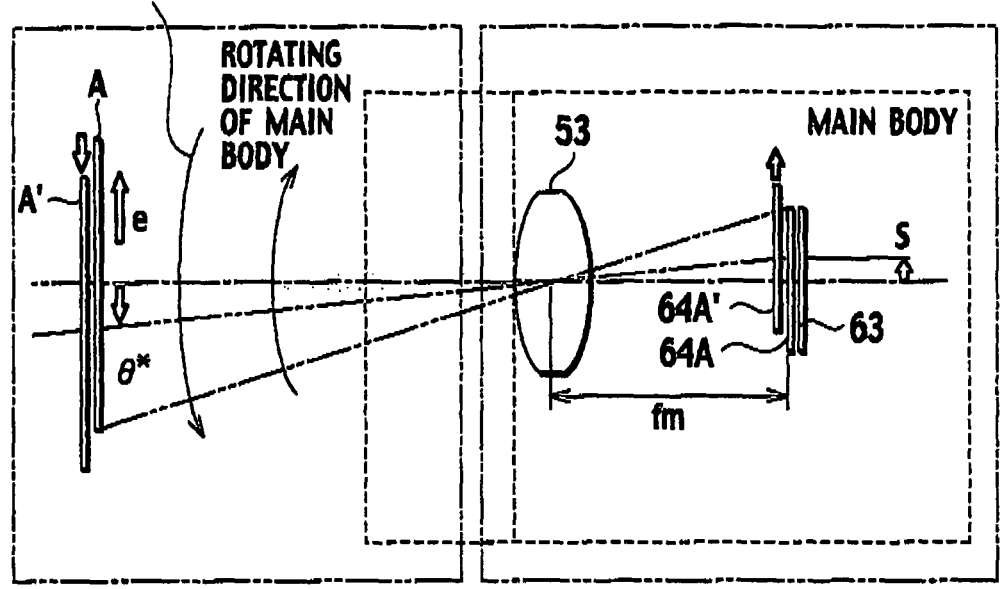
(b)
CORRECTING DIRECTION OF SUBJECT ROTATION
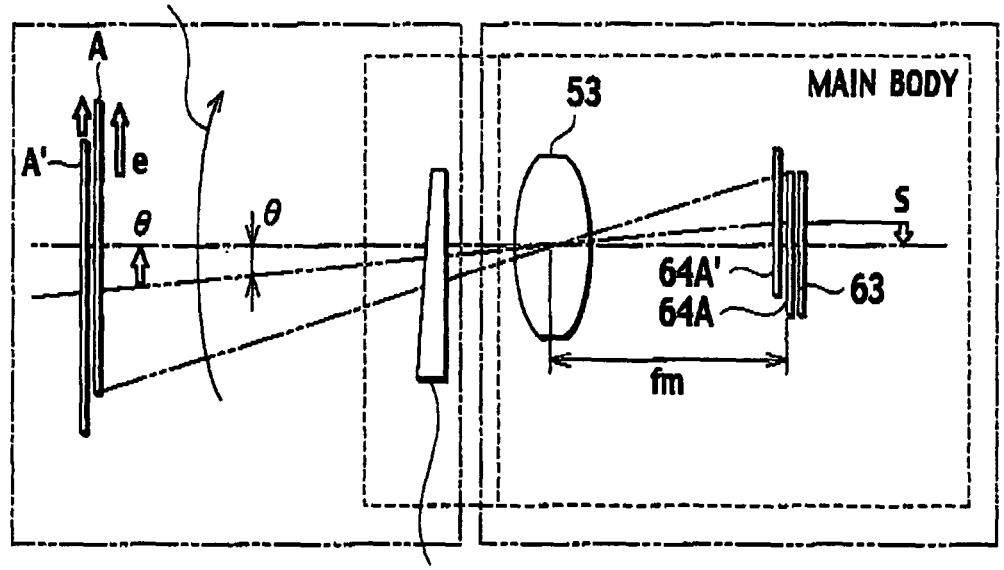

FIG. 41
(a)
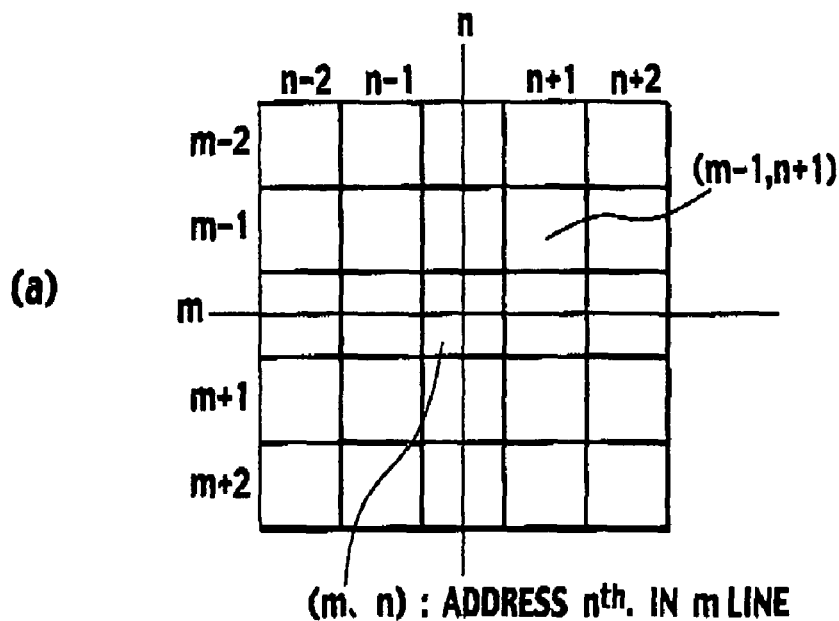
(m, n) : ADDRESS n$^{th}$. IN m LINE
(b)
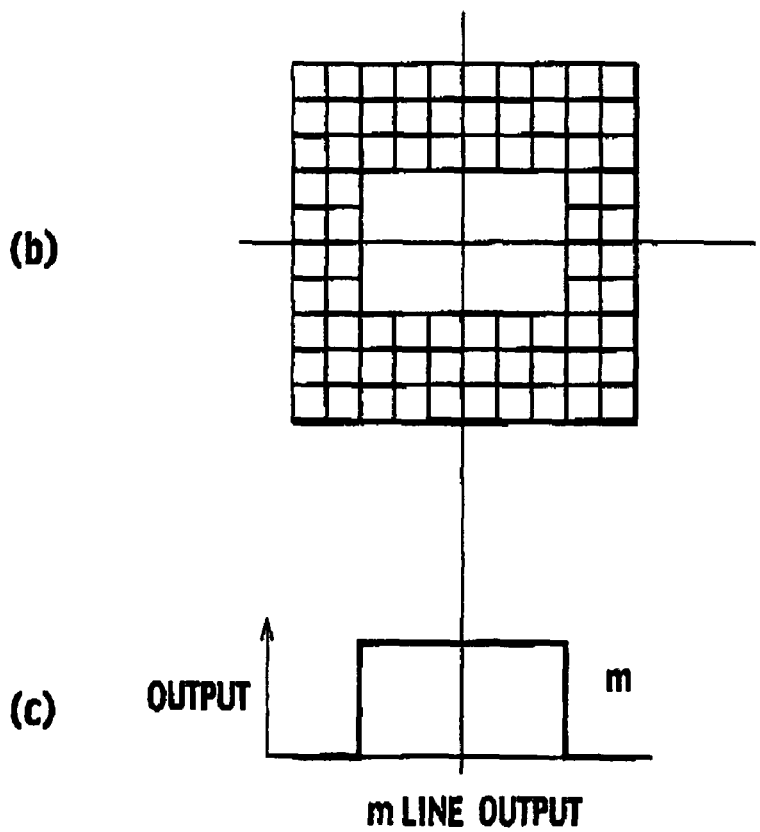
(c) OUTPUT
m LINE OUTPUT

FIG. 45
(a)  (b)
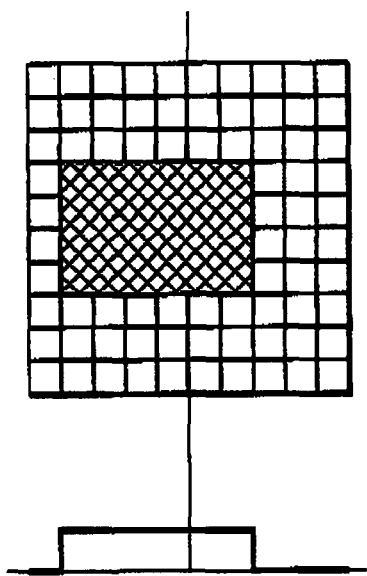 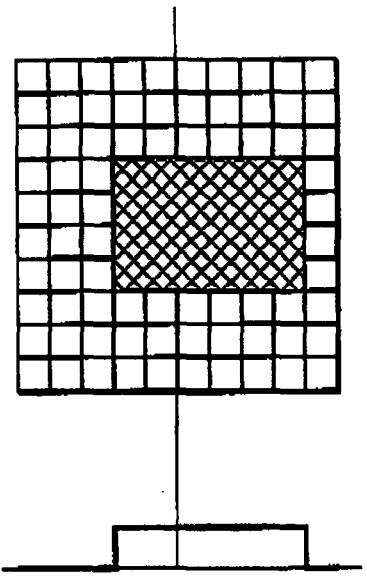
(c)  (d)

FIG. 48
(a)
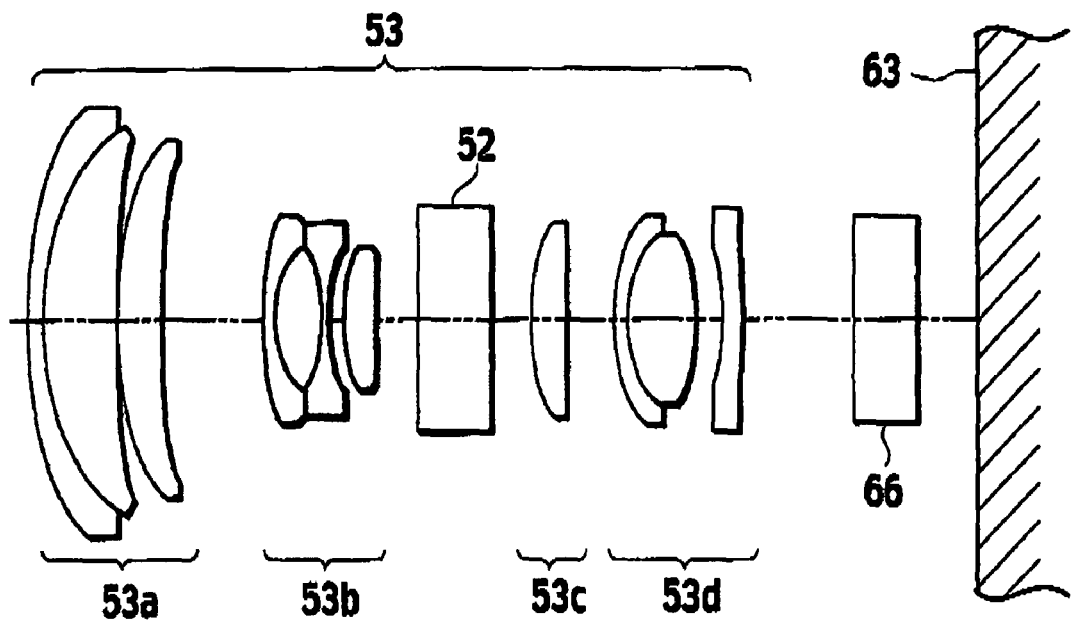
(b)
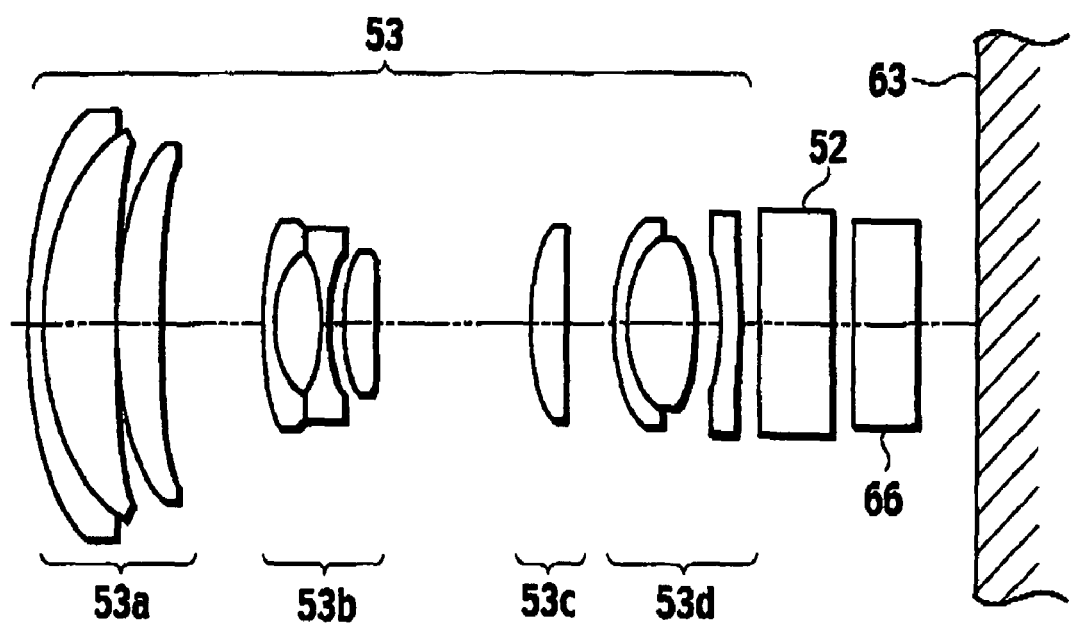

FIG. 50
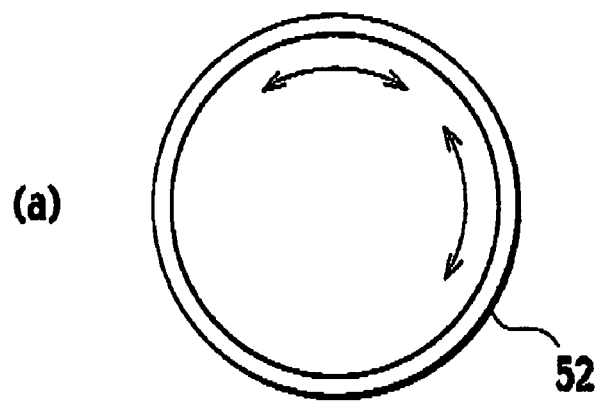
(a)
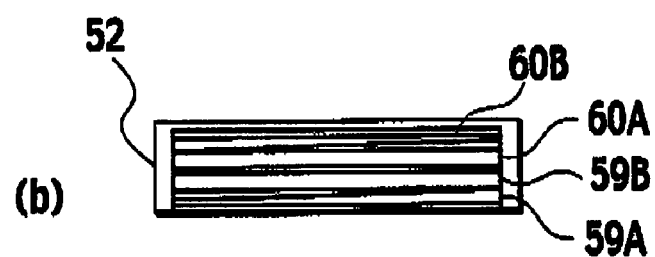
(b)
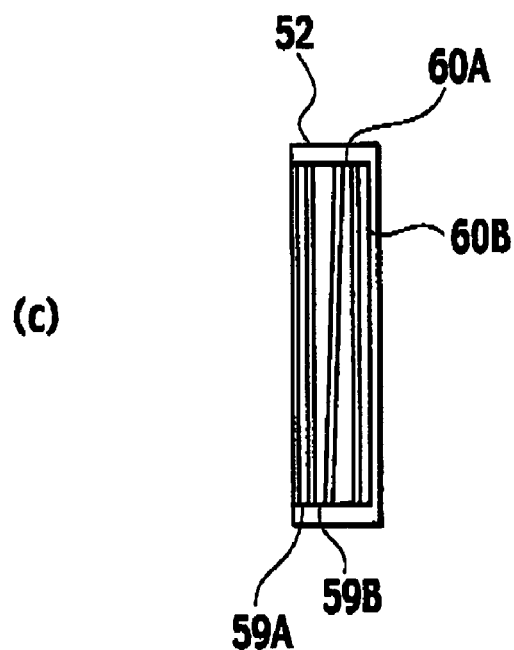
(c)

STILL IMAGE ACQUISITION DEVICE, STILL IMAGE ACQUISITION METHOD, AND IMAGE FLUCTUATION CORRECTION DEVICE

TECHNICAL FIELD

The present invention relates to still image acquisition device and method of acquiring a still image from images taken while correcting their fluctuation at the timing of minimizing an image shift due to chromatic aberration and further relates to an image fluctuation correction device having a function of correcting chromatic aberration non-optically.

BACKGROUND OF ART

As the image fluctuation correction device for correcting fluctuation of taken image, there has been conventionally known a camera whose main body has a built-in function of correcting fluctuation of images at filming. Patent Document No. 1 (Japanese Patent Publication Laid-open No. 9-51469) proposes a technique of utilizing a prism as one method of correcting this image fluctuation.

An active prism used in this technique has a structure where two sheets of glass plates are connected to each other through an expandable bellows of special film, and liquid having a refraction index generally equal to that of the glasses is charged between the glass plates. This active prism is arranged between a CCD image sensor and an objective lens of a lens unit which leads a subject image from the objective lens on the front side of a video camera body to the CCD image sensor. By changing respective tilting angles of respective glass plates to the video camera body in a vertical or a horizontal direction, the active prism is adapted so as to correct the image fluctuation.

However, in a device for correcting image fluctuation with the use of a refractive element, such as the image fluctuation correction device described in Patent Document No. 1, as the correction of image fluctuation is carried out through the use of refraction index, chromatic aberration is produced in an optical image due to different refraction indexes every wavelengths. Consequently, as the so-taken image is apt to be shifted with respect to each color thereby to cause its deterioration (referred to as "image shift" hereinafter), it has been impossible to provide an image taken for a user in the form of a vivid image.

It is therefore considered to correct this chromatic aberration optically. However, while the use of a normal lens causes chromatic aberration to be radially produced about its optical axis as a center, the use of a device for correcting image fluctuation by a prism would produce chromatic aberration in one direction irrespective of the optical axis and furthermore, the direction of chromatic aberration varies to an opposite direction temporally. Thus, it has been difficult to optically correct the chromatic aberration like a normal lens.

As the still image acquisition device for acquiring a still image from taken images, in addition, there is generally known a device that acquires a still image from taken images immediately after receiving a still image acquisition signal inputted by a user.

However, when using a general still image acquisition device to acquire a general still image from images corrected by the image fluctuation correction device described in Patent Document No. 1, the refraction angle of incident light gets larger as the correction amount against the fluctuation of an image is increased. As a result, the still image acquired with such an increased refraction angle has an increased image shift due to chromatic aberration.

Therefore, in the general still image acquisition device mentioned above, if receiving the still image acquisition signal under condition that the correction amount of the image fluctuation is maximum, then the image shift due to chromatic aberration in the acquisition image is maximized to preclude an acquisition of a clear still image.

On the assumption of providing a threshold value in terms of the angle change in taking moving images, therefore, Patent Document No. 2 (Japanese Patent Publication No. 3548308) proposes an imaging device that is constructed so as to allow an acquisition of a still image when the actual angle change is less than the threshold value.

DISCLOSURE OF THE INVENTION

However, as the imaging device of Patent Document No. 2 is adapted so as to allow an acquisition of a still image when the angle change in taking moving images becomes less than the threshold value, it is difficult to acquire a still image whose image shift due to chromatic aberration is the smallest, at any time in the correcting operation. Alternatively, even if this imaging device is constructed so that a user can set up a threshold value, there is fear of causing the following problem. That is if the set threshold value is too low, the minimal value of the correction amount would become less than the threshold value thereby to preclude an acquisition of the still image. In such a case, it becomes remarkably difficult to establish the threshold value, making it impossible to minimize the image shift due to chromatic aberration usually.

In consideration of the above-mentioned problem, an object of the present invention is to provide:

(1) still image acquisition device and method both capable of minimizing an image shift due to chromatic aberration in acquiring a still image from taken images; and (2) an image fluctuation correction device having a function of correcting an image shift due to chromatic aberration non-optically.

In order to attain the above object, a first feature of the still image acquisition device of the present invention resides in the provision of a still image acquisition device that corrects fluctuation of images caused by shakes of an imaging device having an image sensor to convert a subject image by incident light through an optical lens to an electrical signal thereby to obtain images and that acquires a still image from corrected hand shake-corrected images, the still image acquisition device comprising:

a fluctuation detection unit for detecting a horizontal or a vertical fluctuation generated in the imaging device;

light refraction means arranged on an optical path up to the image sensor, for refracting the light into an arbitrary direction;

hand shake control means for controlling a refraction direction of the light by the light refraction means so as to cancel the fluctuation detected by the fluctuation detection unit;

control amount detection means for detecting control amounts of the light refraction means controlled by the hand shake control means;

hand shake angle calculation means for calculating a hand shake angle in either a horizontal direction or a vertical direction from the control amounts detected by the control amount detection means;

acquisition reference time decision means that decides an acquisition reference time when receiving a command signal requiring an acquisition of the still image, the still image according to a time when the absolute value of the hand shake angle of the horizontal direction or the vertical direction calculated by the hand shake angle calculation means is zero or a minimum value; and a still image processing unit for acquiring, as the still image, the hand shake-corrected image read out by the image sensor immediately after the acquisition reference time decided by the acquisition reference time decision means.

A second feature of the still image acquisition device of the present invention resides in the provision of a still image acquisition device that corrects fluctuation of images caused by shakes of an imaging device having an image sensor to convert a subject image by incident light through an optical lens to an electrical signal thereby to obtain images and that acquires a still image from corrected hand shake-corrected images, the still image acquisition device comprising:

a fluctuation, detection unit for detecting a horizontal or a vertical fluctuation generated in the imaging device;

hand shake angle calculation means for calculating a hand shake angle in either a horizontal direction or a vertical direction from the fluctuation detected by the fluctuation detection unit;

acquisition reference time decision means that decides an acquisition reference time when receiving a command signal requiring an acquisition of the still image, the still image according to a time when the absolute value of the hand shake angle of the horizontal direction or the vertical direction calculated by the hand shake angle calculation means is zero or a minimum value; and a still image processing unit for acquiring, as the still image, the hand shake-corrected image read out by the image sensor immediately after the acquisition reference time decided by the acquisition reference time decision means.

A third feature of the still image acquisition device of the present invention resides in the provision of a still image acquisition device that corrects fluctuation of images caused by shakes of an imaging device having an image sensor to convert a subject image by incident light through an optical lens to an electrical signal thereby to obtain images and that acquires a still image from corrected hand shake-corrected images, the still image acquisition device comprising:

a fluctuation detection unit for detecting a horizontal or a vertical fluctuation generated in the imaging device;

light refraction means arranged on an optical path up to the image sensor, for refracting the light into an arbitrary direction;

hand shake control means for controlling a refraction direction of the light by the light refraction means so as to cancel the fluctuation detected by the fluctuation detection unit;

control amount detection means for detecting control amounts of the light refraction means controlled by the band shake control means;

hand shake angle calculation means for calculating a hand shake angle in either a horizontal direction or a vertical direction from the control amounts detected by the control amount detection means;

storing means for storing:
a plurality of hand shake-corrected images read out by the image senor within a predetermined period;
information specifying respective imaging times of the plurality of hand shake-corrected images; and
the hand shake angle in either the horizontal direction or the vertical direction calculated by the band shake angle calculation means in a storage unit, in coordination with each other;

acquisition reference time decision means that decides an acquisition reference time when receiving a command signal requiring an acquisition of the still image, the still image according to:
a first time when the absolute value of the hand shake angle of the horizontal direction or the vertical direction calculated by the hand shake angle calculation means is zero or a minimum value, or
a second time when the absolute value of the hand shake angle in either the horizontal direction or the vertical direction stored in the storage unit is zero or a minimum value; and in case of deciding the second time as the acquisition reference time,
a still image processing unit that acquires, as the still image, the hand shake-corrected image read out by the image sensor immediately after or before the acquisition reference time decided by the acquisition reference time decision means, the hand shake-corrected image being stored in the storage unit.

A fourth feature of the still image acquisition device of the present invention resides in the provision of a still image acquisition device that corrects fluctuation of images caused by shakes of an imaging device having an image sensor to convert a subject image by incident light through an optical lens to an electrical signal thereby to obtain images and that acquires a still image from corrected hand shake-corrected images, the still image acquisition device comprising:

a fluctuation detection unit for detecting a horizontal or a vertical fluctuation generated in the imaging device;

light refraction means arranged on an optical path up to the image sensor, for refracting the light into an arbitrary direction;

hand shake control means for controlling a refraction direction of the light by the light refraction means so as to cancel the fluctuation detected by the fluctuation detection unit;

control amount detection means for detecting control amounts of the light refraction means controlled by the hand shake control means;

hand shake angle calculation means for calculating a hand shake angle in either a horizontal direction or a vertical direction from the control amounts detected by the control amount detection means;

storing means for storing:
a plurality of hand shake-corrected images read out by the image senor immediately after the hand shake angle of the horizontal direction or the vertical direction calculated by the hand shake angle calculation means is zero, and
information specifying respective imaging times of the plurality of hand shake-corrected images
in a storage unit, in coordination with each other;

acquisition reference time decision means that decides an acquisition reference time when receiving a command signal requiring an acquisition of the still image, the still image according to:
a first time when the absolute value of the hand shake angle of the horizontal direction or the vertical direction calculated by the hand shake angle calculation means is zero or a minimum value, or
a second time when the hand shake angle in either the horizontal direction or the vertical direction stored in the storage unit is zero; and in case of deciding the second time as the acquisition reference time, a still image processing unit that acquires, as the still image, the hand shake-corrected image read out by the image sensor immediately after the acquisition reference time decided by the acquisition reference time decision means, the hand shake-corrected image being stored in the storage unit.

A fifth feature of the still image acquisition device of the present invention resides in the provision of a still image acquisition device for acquiring a still image from hand shake-corrected images which are obtained by correcting fluctuations of images due to shakes of an imaging device by a fluctuation correction amount corresponding to the fluctuations of the images, the imaging device having an image sensor to convert a subject image by incident light through an optical lens to an electrical signal thereby to obtain the images, the still image acquisition device comprising:

acquisition reference time decision means for deciding an acquisition reference time for acquiring the still image according to a time when the absolute value of the fluctuation correction amount is zero or a minimum value; and a still image processing unit for acquiring, as the still image, the hand shake-corrected image read out by the image sensor immediately after the acquisition reference time decided by the acquisition reference time decision means.

In order to attain the above object, a first feature of the image fluctuation correction device of the present invention resides in the provision of an image fluctuation correction device that corrects fluctuation of images caused by an on-camera fluctuation of an imaging equipment allowing an image sensor to convert incident imaging light through an optical lens to an electrical signal thereby to acquire an image, the image fluctuation correction device comprising:

fluctuation detection means for detecting a fluctuation generated in the imaging equipment;

a pair of movable refraction elements arranged on an incident side of the optical lens thereby to change a direction of refraction of the light incident on the optical lens;

two rotating means for rotating the movable refraction elements about an optical axis respectively;

rotation control means for controlling the two rotating means so as to cancel the fluctuation detected by the fluctuation detection means;

rotation amount detection means for detecting rotation amounts of the movable refraction elements;

color separator means for separating image data of the image acquired into respective color images in three primary colors;

image shift amount calculation means in case of outputting the respective color images separated by the color separator means in connection with the rotation, the image shift amount calculation means calculating image shift amounts of the colors' images at respective output positions from the rotation amounts detected by the rotation amount detection means; and chromatic aberration correction means for correcting a relative image shift among the respective color images by the image shift amount calculation means.

A second feature of the image fluctuation correction device of the present invention resides in the provision of an image fluctuation correction device that corrects fluctuation of images caused by an on-camera fluctuation of an imaging equipment allowing an image sensor to convert incident imaging light through an optical lens to an electrical signal thereby to acquire an image, the image fluctuation correction device comprising:

color separator means for separating image data of the image acquired into respective color images in three primary colors;

image shift amount calculation means for:
laying the respective color images by the color separator means one on top of another;
shifting the respective color images by one pixel horizontally and vertically;
totalizing a difference between outputs with respect to each pixel; and
deciding the positions of the color images to minimize a total of differences totalized, and chromatic aberration correction means for correcting output positions of the respective color images based on the positions of the respective color images decided by the image shift amount calculation means.

BRIEF DESCRIPTION OF THE DRAWINGS

FIG. 2 are schematic views showing a correction unit of the still image acquisition device shown in FIG. 1, in which
FIG. 2(a) is a schematic front view and
FIG. 2(b) is a schematic side view.
FIG. 3 are structural views of the correction unit, in which
FIG. 3(a) is a front view,
FIG. 3(b) a sectional view viewed in a direction B of FIG. 2(a),
and
FIG. 3(c) is a sectional view viewed in a direction A of FIG. 2(a).
FIG. 5 are arrangement views of actuators and sensors that the correction unit of FIG. 3 includes, in which
FIG. 5(a) is a schematic side view,
FIG. 5(b) an arrangement view of an actuator and a sensor of a movable prism 10A,
and
FIG. 5(c) is an arrangement view of an actuator and a sensor of a movable prism 10B.
FIG. 6 includes views explaining the movement of a subject image by a prism, in which
FIG. 6(a) is a view explaining refraction of light by the prism and
FIG. 6(b) is a view of the prism of FIG. 6(a) viewed in its front direction.
FIG. 8 includes views explaining the movement of a subject image when the movable prisms rotate, in which
FIG. 8(a) is a view showing the image shift vectors when the movable prisms rotate and
FIG. 8(b) is a view where displacements of the image shift vectors of FIG. 8(a) are picked up.
FIG. 9 includes views showing parallel translating forms of a subject image (subject), in which
FIG. 9(a) is a view of the subject image moved to a second quadrant,
FIG. 9(b) a view of the subject image moved to a first quadrant,
FIG. 9(c) a view of the subject image moved to a third quadrant,
and
FIG. 9(d) is a view of the subject image moved to a fourth quadrant.
FIG. 10 includes views explaining an equivalent focal distance and a shift amount, in which
FIG. 10(a) is a view explaining the equivalent focal distance and
FIG. 10(b) is a view explaining a shift amount.

FIG. 11 includes views explaining a hand shake correction, in which

FIG. 11(a) is a view explaining the movement of a subject image due to the hand shake and FIG. 11(b) is a view explaining the hand shake correction against the movement of the subject image due to the hand shake.

FIG. 21 includes views showing the arrangement of the correction unit, the lens system and the others of FIG. 1, in which FIG. 21(a) is a view showing the correction unit arranged in the lens system and FIG. 21(b) is a view showing the correction unit arranged behind the lens system.

FIG. 22 includes views showing the correction unit without a fixed prism as another constitution of the correction unit of the present invention, in which FIG. 22(a) is a front view of the correction unit, FIG. 22(b) a plan view of the unit, and FIG. 22(c) is a side view of the unit.

FIG. 23 includes views showing the correction unit with two sheets of fused prisms as the other constitution of the correction unit of the present invention, in which FIG. 23(a) is a front view of the correction unit, FIG. 23(b) a plan view of the part, and FIG. 23(c) is a side view of the part.

FIG. 24 includes views showing the other constitution of the prism of the present invention, in which FIG. 24(a) is a view showing a simplex prism, FIG. 24(b) a view of a compound prism, and FIG. 24(c) is a view showing a parallel plate having prism effect.

FIG. 26 are schematic views showing a correction unit of the image fluctuation correction device shown in FIG. 25, in which FIG. 26(a) is a schematic front view and FIG. 26(b) is a schematic side view.

FIG. 27 are structural views of the correction unit, in which

FIG. 27(a) is a front view,

FIG. 27(b) a sectional view viewed in a direction B of FIG. 26(a), and

FIG. 27(c) is a sectional view viewed in a direction A of FIG. 26(a).

FIG. 29 are arrangement views of actuators and sensors that the correction unit of FIG. 27 includes, in which FIG. 29(a) is a schematic side view, FIG. 29(b) an arrangement view of an actuator and a sensor of a movable prism 60A, and FIG. 29(c) is an arrangement view of an actuator and a sensor of a movable prism 60B.

FIG. 30 includes views explaining the movement of a subject image by a prism, in which FIG. 30(a) is a view explaining refraction of light by the prism and FIG. 30(b) is a view of the prism of FIG. 30(a) viewed in its front direction.

FIG. 32 includes views explaining the movement of a subject image when the movable prisms rotate, in which FIG. 32(a) is a view showing the image shift vectors when the movable prisms rotate and FIG. 32(b) is a view where displacements of the image shift vectors of FIG. 32(a) are picked up.

FIG. 33 includes views showing parallel translating forms of a subject image (subject), in which FIG. 33(a) is a view of the subject image moved to a second quadrant, FIG. 33(b) a view of the subject image moved to a first quadrant, FIG. 33(c) a view of the subject image moved to a third quadrant, and FIG. 33(d) is a view of the subject image moved to a fourth quadrant.

FIG. 34 includes views explaining a equivalent focal distance and a shift amount, in which FIG. 34(a) is a view explaining the equivalent focal distance and FIG. 34(b) is a view explaining a shift amount.

FIG. 35 includes views explaining a hand shake correction, in which

FIG. 35(a) is a view explaining the movement of a subject image due to the hand shake and FIG. 35(b) is a view explaining the hand shake correction against the movement of the subject image due to the hand shake.

FIG. 41(a) is a view showing the address of pixels in arrangement.

FIG. 41(b) is a view showing part of an image having no image shift due to chromatic aberration, in enlargement.

FIG. 41(c) is a view showing a signal output in case of FIG. 41(b).

FIG. 45(a) is a view showing one example of the R output image when shifting the R output image to right by one pixel.

FIG. 45(b) is a view showing one example of the B output image when shifting the B output image to left by one pixel.

FIGS. 45(c) and 45(d) are views showing signal outputs corresponding to FIGS. 45(a) and 45(b), respectively, as an example.

FIG. 48 includes views showing the arrangement of the correction unit, the lens system and the others of FIG. 25, in which FIG. 48(a) is a view showing the correction unit arranged in the lens system and FIG. 48(b) is a view showing the correction unit arranged behind the lens system.

FIG. 49 includes views showing the correction unit without a fixed prism as another constitution of the correction unit of the present invention, in which FIG. 49(a) is a front view of the correction unit, FIG. 49(b) a plan view of the unit, and FIG. 49(c) is a side view of the unit.

FIG. 50 includes views showing the correction unit with two sheets of fixed prisms as the other constitution of the correction unit of the present invention, in which FIG. 50(a) is a front view of the correction unit, FIG. 50(b) a plan view of the part, and FIG. 50(c) is a side view of the part.

FIG. 51 includes views showing the other constitution of the prism of the present invention, in which FIG. 51(a) is a view showing a simplex prism, FIG. 51(b) a view of a compound prism, and FIG. 51(c) is a view showing a parallel plate having prism effect.

BEST MODE FOR CARRYING OUT THE INVENTION

There will be described preferred embodiments of the present invention with reference to drawings.

(Still Image Acquisition Device)

First, an embodiment of the still image acquisition device will be described. In this embodiment, we now illustrate our explanation by citing the example of a still image acquisition device that corrects hand shake with the use of prisms and also minimizes an image shift due to chromatic aberration of the prisms in acquiring a still image from hand shake-corrected images as a result of the hand shake correction.

Figure 1:
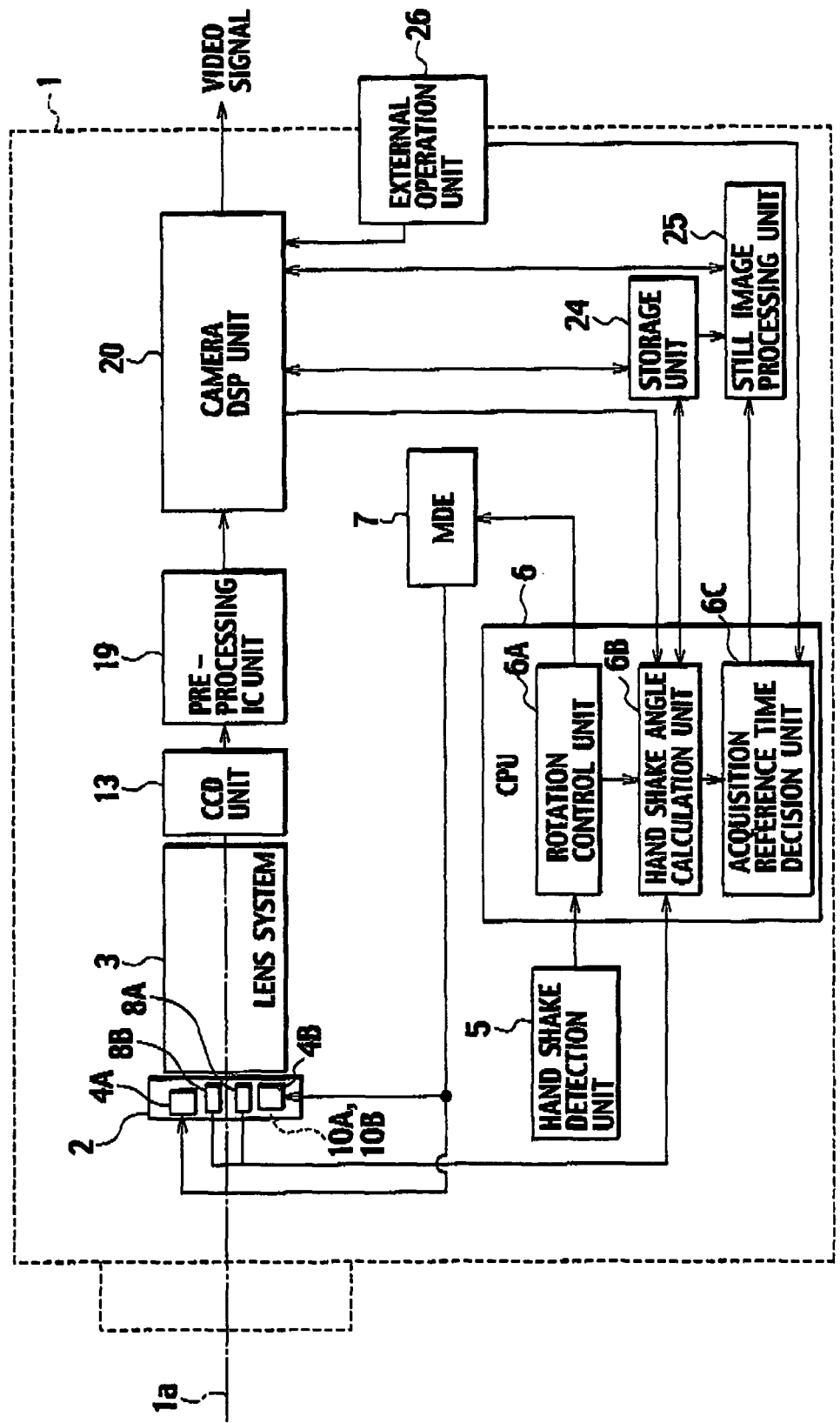
FIG. 1 is a block diagram showing the constitution of a still image acquisition device in accordance with an embodiment of the present invention.

FIG. 1 is a block diagram showing the constitution of the still image acquisition device in accordance with the embodiment of the present invention. The still image acquisition device of the present invention is provided in a video camera 1 as an imaging device, for example.

In this embodiment, the video camera 1 includes a correction unit 2 having a fixed prism and a pair of movable prisms independently rotatable about an optical axis 1a as a rotating center, a lens system 3 for taking pictures of a subject, a CCD unit 13 allowing incident light through the lens system 3 to form an image and also converting a so-formed subject image into electrical signals, a pre-processing IC unit 19 having CDS, AGC and A/D conversion functions, a camera DSP unit 20 applying various digitization on input signals from the pre-processing IC unit 19, actuators 4A, 4B for rotating the pair of movable prisms in the correction emit 2 respectively and independently, a hand shake detection unit 5 for detecting a fluctuation by an angular speed date video camera 1 due to hand shake etc. and generating hand shake signals, a CPU 6 having a rotation control unit 6A that transmits control signals to the actuators 4A, 4B for their rotation control so as to cancel the shake in response to the hand shake signal from the hand shake detecting unit 5, a hand shake angle calculation unit 6B for calculating a hand shake angle from rotating amounts of the movable prisms detected by sensors 8A, 8B and an acquisition reference time decision unit 6C for deciding an acquisition reference time of an image, a motor drive electronic circuit (MDE) 7 for driving the actuators 4A, 4B in response to the control signals from the rotation control unit 6A of the CPU 6, the above sensors 8A, 8B for detecting rotations of the pair of movable prisms in the correction unit 2, a storage unit 24 for storing picturized images etc., a still image processing unit 25 for acquiring a still image and an external operation system 26.

Although the still image acquisition device of this embodiment includes the correction unit 2 and the CPU 6, the device has only to contain at least the rotation control unit 6A, the hand shake angle calculation unit 6B and the acquisition reference time decision unit 6C.

Figure 2:
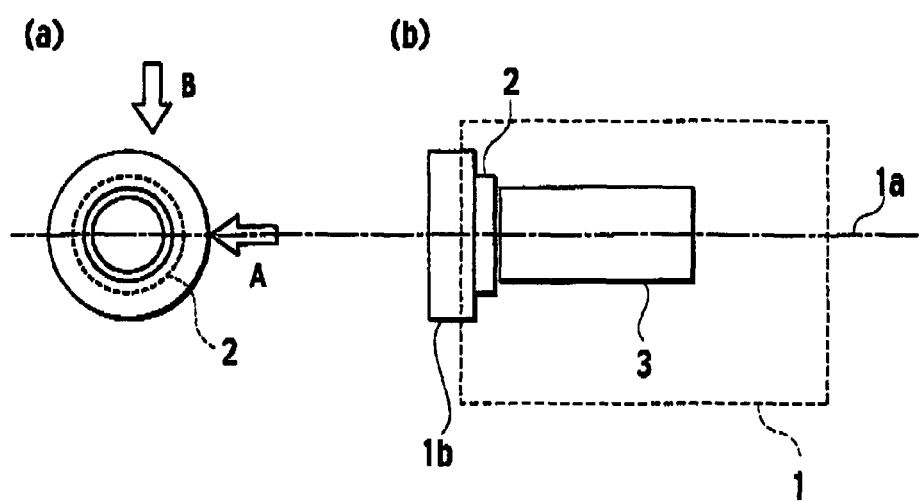
Figure 3:
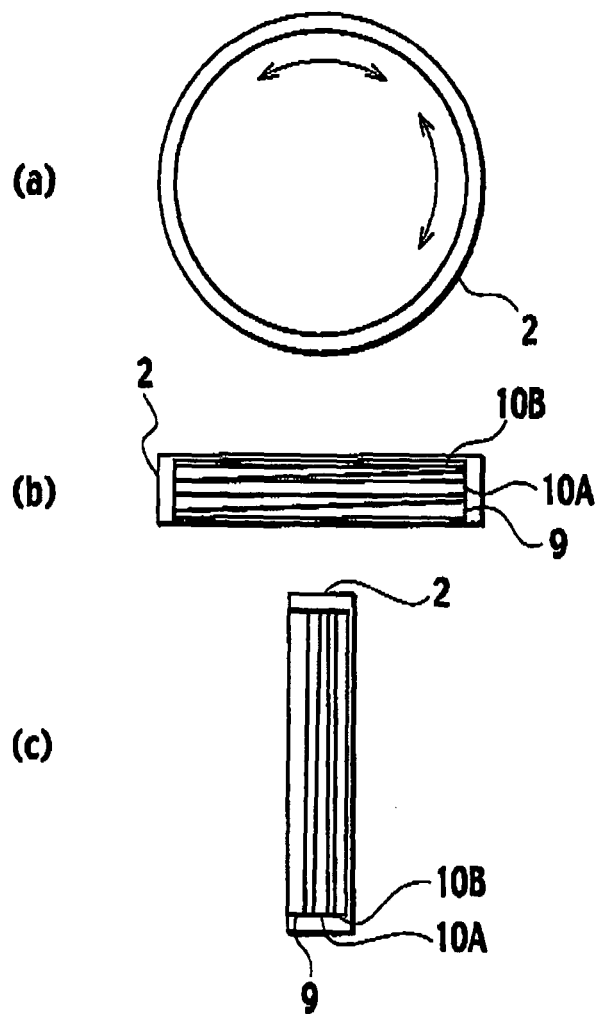
Figure 4:
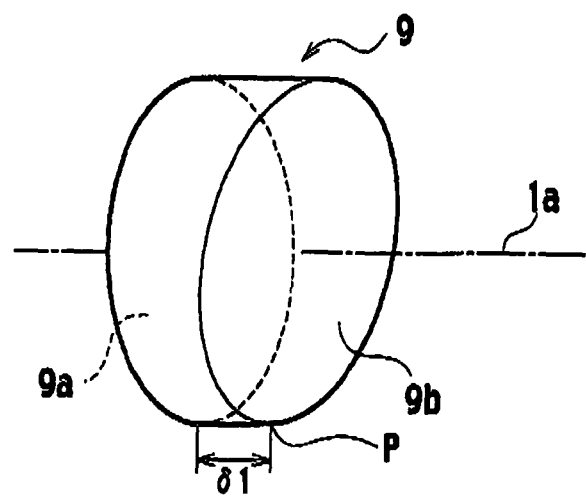
FIG. 4 is a perspective view of a fixed prism that the collection unit of FIG. 3 includes.

FIG. 2 are schematic views showing the correction unit 2 of the still image acquisition device of FIG. 1. FIG. 2(a) is a schematic front view of the unit, while FIG. 2(b) is a schematic side view of the unit. FIG. 3 includes structural views of the correction unit 2. FIG. 3(a) is a front view of the unit. FIG. 3(b) is a sectional view viewed in a direction B of FIG. 2(a), while FIG. 3(c) is a sectional view viewed in a direction A of FIG. 2(a). FIG. 4 is a perspective view of the fixed prism arranged in the correction unit 2.

As shown in FIG. 2, the correction unit 2 is arranged between the lens system 3 and a hood part 1b covering a front face of the lens system 3. As shown in FIGS. 3(a) to 3(c), the correction unit 2 includes a fixed prism 9 immovable in position and a pair of movable prisms 10A, 10B rotatable about the optical axis as the rotating center.

As shown in FIG. 4, the fixed prism 9 includes a first face 9a perpendicular to the optical axis 1a and a second face 9b being a flat surface opposed to the first face 9a at a minute angle slant. The fixed prism 9 is made of amyl etc. The movable prisms 10A, 10B are also similar to the prism 9 in terms of shape and material.

Figure 5:
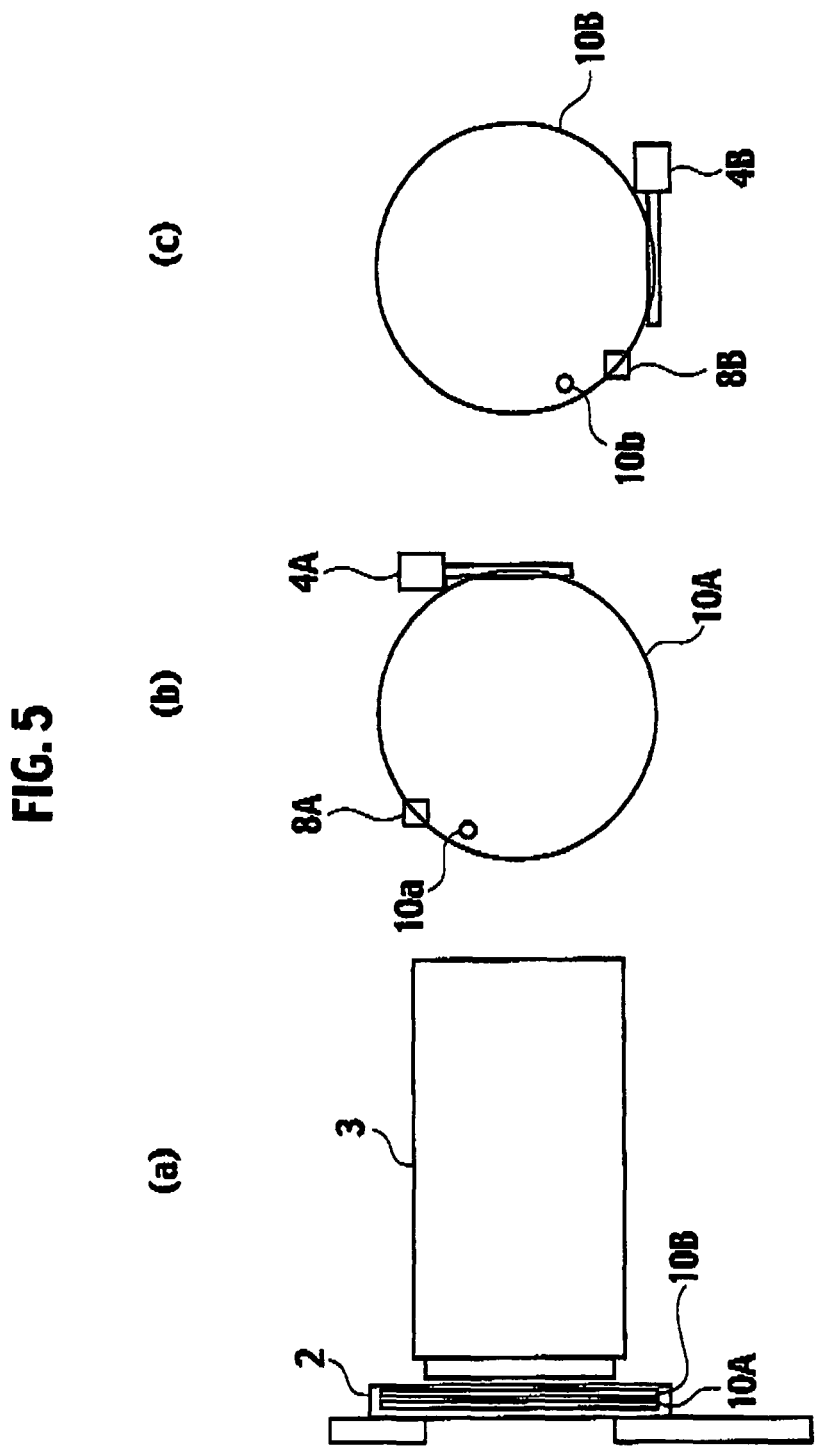

FIG. 5 includes arrangement views of actuators and sensors included in the correction unit 2. FIG. 5(a) is a schematic side view, FIG. 5(b) an arrangement view of an actuator and a sensor of the movable prism 10A, and FIG. 5(c) is an arrangement view of an actuator and a sensor of the movable prism 10B.

The actuators and the sensors are attached to the correction unit 2. As shown in FIGS. 5(b) and 5(c), the actuator 4A and the sensor 8A are provided for the movable prism 10A, while the actuator 4B and the sensor 8B are provided for the movable prism 10B.

The actuators 4A, 4B rotate the movable prisms 10A, 10B in response to the control signals from the rotation control unit 6A of the CPU 6. The actuators 4A, 4B are formed by any ones of compact pulse motors, compact linear motors, compact ultrasonic motors, etc. all of which have small load torques in common.

The sensors 8A, 8B are formed by e.g. compact photo interrupters, MR elements, hall elements or the like. In operation, the sensors 8A, 8B detect the rotating conditions of the movable prisms 10A, 10B and further output the information about the rotating conditions to the CPU 6.

If adopting the compact photo interrupters for the sensors 8A, 8B, they would be used in combination with pulse motors. The movable prisms 10A, 10B are covered, on their circumferences, with masking materials on which holes 10a, 10b are formed respectively. The holes 10a, 10b are positioned in a manner that when the movable prisms 10A, 10B are brought into their initial positions, the holes 10A, 10B accord with the sensors 8A, 8B, respectively.

The compact photo interrupter includes an infrared-emitting diode and a photo transistor. The photo interrupter is arranged so as to interpose the movable prism 10A or 10B between the infrared-emitting diode and the photo transistor.

When the device is powered ON, the movable prisms 10A, 10B are rotated. Then, the compact photo interrupters detect the prisms' original positions since the photo transistors receive lights of the infrared-emitting diodes passing through the holes 10a, 10b. The information about each of the movable prisms 10A, 10B in rotation could be obtained by counting the number of pulses during rotating of the prisms upon setting the number of pluses to zero at the original position.

If adopting MR elements or hall elements for the sensors 8A, 8B, magnetic bodies are attached to the movable prisms 10A, 10B respectively, instead of providing the holes 10a, 10b.

In this case, the information about the movable prisms 10A, 10B in rotation could be obtained since the MR elements or the hall elements detect respective changes in magnetic field due to the magnetic bodies rotating together with the movable prisms 10A, 10B.

In the still image acquisition device of this embodiment, the image fluctuation due to hand shake is corrected by rotating the movable prisms 10A, 10B so as to cancel the shake detected by the hand shake detection unit 5. Successively, it is performed to first detect the rotation angles of the movable prisms 10A, 10B, secondary calculate a hand shake angle by the detected rotation angles and finally acquire, as the still image, an image corresponding to a time immediately after the hand shake angle has reached zero or a minimum value.

Therefore, we first describe the process of hand shake correction below. The process of still image acquisition will be described thereafter.

(Hand Shake Correction)

In the still image acquisition device of this embodiment, the image fluctuation due to hand shake is corrected by rotating the movable prisms 10A, 10B so as to cancel the shake detected by the hand shake detection unit 5.

FIG. 6 includes views explaining the movement of a subject image by a prism. FIG. 6(a) is a view explaining refraction of light by the prism, while FIG. 6(b) is a view of the prism of FIG. 6(a) viewed in its front direction (arrow a). In FIG. 6(b), the prism 11 of FIG. 6(a) is rotated by an angle α. As shown in FIGS. 6(a) and 6(b), incident light is refracted by the prism 11 at a refraction angle i', so that an image of a subject A is shifted (of parallel translation) to a subject A' as a result of directing to a point P.

In FIGS. 6(a) and 6(b), "i" denotes a prism angle (incident angle of light) of the prism 11, "L" a prism length, "δ" a prism height, "$δ_1$" a prism height at the thinnest part, "N" a refraction index, "i'" a refraction angle of light, "θ" an image shift angle (deflection angle), "α" a rotation angle of the prism, "$L_α$" a rotation amount of the prism, "$_{vector}e$" a unit vector in the direction of image shifting direction, and "$_{vector}θ$" designates an image shift vector. Assume here that the suffix "vector" represents a vector quantity. In FIGS. 6 to 11, these vector quantities are represented by bold faces in place of suffix "vector".

Here, the following relationship is established:

$$_{vector}θ = θ \cdot _{vector}e. \tag{1}$$

FIG. 6(a) shows that, among the prism angle (incident angle) i, the refraction angle i' and the image shift angle (deflection angle) θ, there is established:

$$θ = i' - i. \tag{2}$$

In addition, Snell's law leads to $$\sin i' = N \sin i. \tag{3}$$

Assume now that the prism angle i is small, the equation (3) can be approximated as $$i' = N i. \tag{4}$$

Therefore, substituting the equation (4) into the equation (2) gives $$θ = (N-1)i. \tag{5}$$

Further, FIG. 6(b) shows that, between the prism rotation length "$L_α$" and the prism rotation angle "α", there is established:

$$L_α = (L/2)α, \tag{6}$$

that is, $$α = (2/L)L_α. \tag{7}$$

Furthermore, the following relationship is established as well:

$$δ = L \tan i + δ_1, \tag{8}$$

that is, $$L = (δ - δ_1)/\tan i. \tag{9}$$

Figure 7:
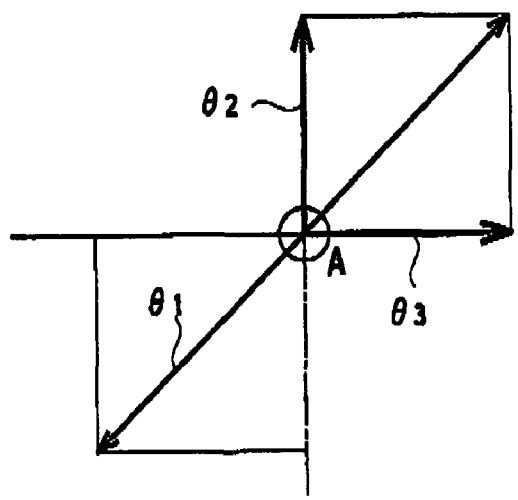
FIG. 7 is a view showing image shift vectors when movable prisms do not rotate.

FIG. 7 is a view showing respective image shift vectors under condition that the movable prisms 10A, 10B in the correction unit 2 do not rotate (in the initial state).

In FIG. 7, $_{vector}θ_1$, $_{vector}θ_2$ and $_{vector}θ_3$ are image shift vectors by the fixed prism 9, the movable vectors 10A and 10B, respectively. As shown in FIG. 7, the positions of the fixed prism 9 and the movable prisms 10A, 10B are established so that $_{vector}\theta_1$ cancels a synthetic vector of $_{vector}\theta_2$ and $_{vector}\theta_3$. Consequently, as the fixed prism 9 and the movable prisms 10A, 10B in three sheets become equivalent to a parallel flat plate, the incident angle on the correction unit 2 becomes equal to an emitting angle, so that a subject image does not move.

Figure 8:
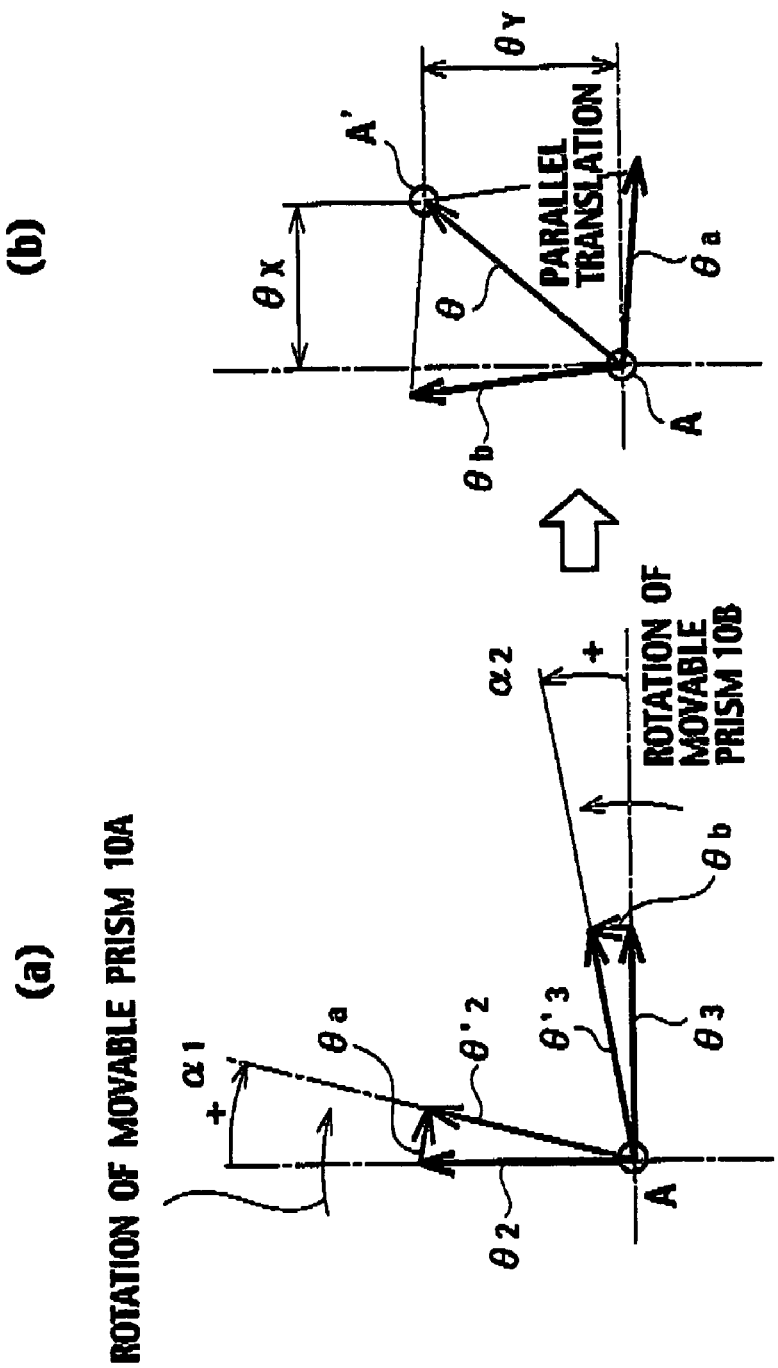

FIG. 8 includes views explaining the movements of the subject image in case that the movable prisms 10A, 10B rotate. FIG. 8(a) is a view showing the image shift vectors when the movable prisms rotate, while FIG. 8(b) is a view showing displacements of the image shift vectors of FIG. 8(a).

Assume in FIG. 8(a), $_{vector}\theta_2'$ and $_{vector}\theta_3'$ represent image shift vectors when the movable prisms 10A, 10B rotate by angles $\alpha_1$ and $\alpha_2$, respectively. Here, it is assumed that rotating directions shown in FIG. 8(a) are positive (+) directions of angles $\alpha_1$ and $\alpha_2$, respectively.

Further, it is assumed that the following relationships are established:

$$_{vector}\theta_a = _{vector}\theta_2' - _{vector}\theta_2, \quad (10)$$

$$_{vector}\theta_b = _{vector}\theta_3' - _{vector}\theta_3. \quad (11)$$

Consequently, as shown in FIG. 8(b), the image of the subject A move to A' in translation. Then, as a synthetic vector of $_{vector}\theta_a$ and $_{vector}\theta_b$, the image shift vector is described as $$_{vector}\theta = _{vector}\theta_a + _{vector}\theta_b = (\theta_X, \theta_Y). \quad (12)$$

Then, FIGS. 8(a) and 8(b) shows that the following relationships are established:

$$\theta_X = \theta_2 \sin \alpha_1 - \theta_3(1 - \cos \alpha_2), \quad (13)$$

$$\theta_Y = \theta_3 \sin \alpha_2 - \theta_2(1 - \cos \alpha_1), \quad (14)$$

Here, $\theta_2$ denotes a scalar of $_{vector}\theta_2$, while $\theta_3$ denotes a scalar of $_{vector}\theta_3$.

We here consider a vector having components $\alpha_1$ and $\alpha_2$, that is, $_{vector}\alpha = (\alpha_1, \alpha_2)$. Resolving the equations (13) and (14) with respect to $\alpha_1$, $\alpha_2$ gives $$\alpha_1 = \pm \cos^{-1}(C/D) + \alpha_1^*, \quad (15)$$

$$\alpha_2 = \pm \cos^{-1}\{[(\theta_X + \theta_3) - \theta_2 \sin \alpha_1]/\theta_3\} \quad (16)$$

where $$C = [A^2 + B^2 + \theta_2^2 - \theta_3^2]/2\theta_2, \quad (17)$$

$$D = (A^2 + B^2)^{1/2}, \quad (18)$$

$$\alpha_1^* = \pm \cos^{-1}(A/D), \text{ (selecting sign of } B) \quad (19)$$

$$A = (\theta_Y + \theta_2), \text{ and} \quad (20)$$

$$B = (\theta_X + \theta_3). \quad (21)$$

Here, if the sign of $\alpha_1$ is minus (−), the sign of $\theta_Y$ is selected as the sign of $\alpha_2$. While, if the sign of $\alpha_1$ is plus (+), the sign of plus (+) is selected as the sign of $\alpha_2$.

FIG. 9 includes views showing parallel translating forms of a subject image (subject). FIG. 9(a) is a view of the subject image moved to a second quadrant, FIG. 9(b) a view of the subject image moved to a first quadrant, FIG. 9(c) a view of the subject image moved to a third quadrant, and FIG. 9(d) is a view of the subject image moved to a fourth quadrant.

When the subject image moves into the first quadrant, as shown in FIG. 9(b), the inequalities $\alpha_1 > 0$ and $\alpha_2 > 0$ are established because $\theta_X > 0$ and $\theta_Y > 0$. Further, when the subject image moves into the second quadrant, as shown in FIG. 9(a), the inequalities $\alpha_1 < 0$ and $\alpha_2 > 0$ are established because $\theta_X < 0$ and $\theta_Y > 0$. Still further, when the subject image moves into the third quadrant, as shown in FIG. 9(c), the inequalities $\alpha_1 < 0$ and $\alpha_2 < 0$ are established because $\theta_X < 0$ and $\theta_Y < 0$. Again, when the subject image moves into the fourth quadrant, as shown in FIG. 9(d), the inequalities $\alpha_1 > 0$ and $\alpha_2 < 0$ are established because $\theta_X > 0$ and $\theta_Y < 0$.

FIG. 10 includes views explaining a equivalent focal distance and a shift amount FIG. 10(a) is a view explaining the equivalent focal distance, while FIG. 10(b) is a view explaining the shift amount.

In FIG. 10(a), "$S_F$" designates a distance between the subject A and a first principal point, and "f" designates a focal length of the lens system 3. Then, the equivalent focal distance $f_m$ is identical to a distance between a second principal point of the lens system 3 and a CCD unit 13 for imaging a subject image 14A, and is represented by $$f_m = f + S_B \quad (22)$$

where $$S_B = f^2/S_F. \quad (23)$$

Next, as shown in FIG. 10(b), it is supposed that the correction unit 2 is inserted so that the subject image 14A is displaced to a subject image 14A' with an image shift angle $\theta$. Then, a shift amount S is expressed by $$S = f_m \tan \theta. \quad (24)$$

FIG. 11 includes views explaining the hand shake correction. FIG. 11(a) is a view explaining the movement of a subject image due to hand shake, while FIG. 11(b) is a view explaining the hand shake correction against the movement of the subject image due to hand shake.

As shown in FIG. 11(a), if the lens system 3 is rotated upwardly in relation to a main body, such as video camera (i.e. rotation in the clockwise direction of FIG. 11), then the subject A is rotated relatively downwardly (i.e. rotation in the counter-clockwise direction of FIG. 11).

As a result, the subject image 14A is shifted to the subject image 14A' running off the CCD unit 3. Supposing a shake angle as "$\theta^*$" and a unit vector in the direction of hand shake as "$_{vector}e^*$" ($= -_{vector}e$), a hand shake angle vector "$_{vector}\theta^*$" is represented by $$_{vector}\theta^* = \theta^* _{vector}e^*. \quad (25)$$

FIG. 11(b) shows a situation in which the correction unit 2 is inserted in front of the lens system 3. Then, if the image shift vector $\theta$ and the shake-angle vector $\theta^*$ by the correction unit 2 satisfy with the following hand shake correcting condition:

$$_{vector}\theta = -_{vector}\theta^*, \quad (26)$$

the subject image 14A' is moved to the position of the subject image 14A, effecting the hand shake correction.

Next, the operation of the still image acquisition device of this embodiment will be described.

The sensors 8A, 8B detect the rotating states of the movable prisms 10A, 10B and further output the information about the rotating states to the controller 6.

The hand shake detection unit 5 detects a fluctuation of the video camera 1 due to hand shake and outputs the detected fluctuation in the form of a hand shake signal to the rotation control unit 6A of the CPU 6. On receipt of the hand shake signal, the rotation control unit 6A of the CPU 6 calculates a hand shake angle vector θ*, representing a magnitude of the fluctuation and its direction, by $$_{vector}\theta^* = (\theta_X^*, \theta_Y^*). \quad (27)$$

Here, using the equation (26) leads to $$(\theta_X, \theta_Y) = (-\theta_X^*, \theta_Y^*). \quad (28)$$

Then, the rotation control unit 6A of the CPU 6 calculates a vector $_{vector}\alpha$ based on the equations (15) to (21) and outputs control signals to the motor drive electronic circuit 7 so that the rotating angles of the movable prisms 10A, 10B become $\alpha_1$, $\alpha_2$ respectively.

The motor drive electronic circuit 7 drives the actuators 4A, 4B in response to the control signals from the rotation control unit 6A of the CPU 6, while the actuators 4A, 4B rotate the movable prisms 10A, 10B so that their rotating angles become $\alpha_1$, $\alpha_2$ respectively.

In this way, the still image acquisition device of this embodiment corrects the image fluctuation due to heard shake by rotating the movable prisms 10A, 10B so as to cancel the fluctuation detected by the hand shake detection unit 5.

(Still Image Acquisition Process)

Next, the process of acquiring a still image from the subject image subjected to the above hand shake correction will be described below.

As mentioned above, the image fluctuation due to hand shake can be corrected by rotating the movable prisms 10A, 10B. However, as the image fluctuation correction is carried out by utilizing the optical refractive indexes of the prisms, the subject image is accompanied with chromatic aberration due to different optical refractive indexes every optical wavelengths.

Figure 12:
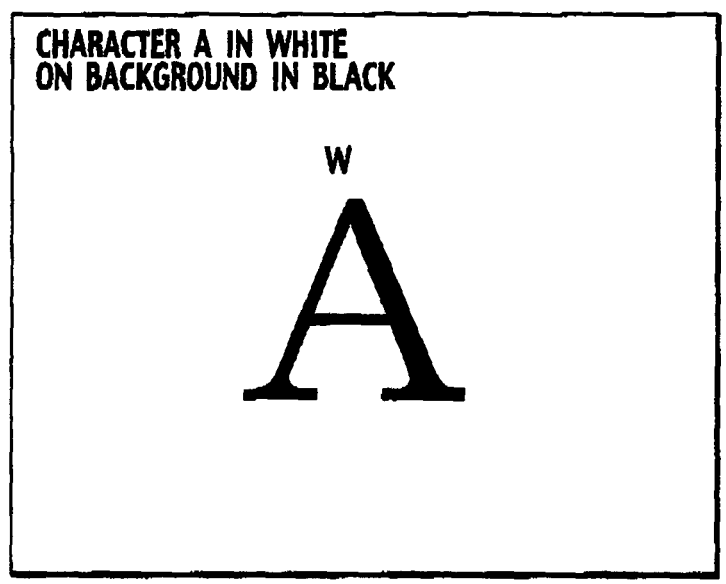
FIG. 12 is a view showing an image by an image senor imaging a character "A" in white on a black background in an arrangement where the prism is not on the optical axis.
Figure 13:
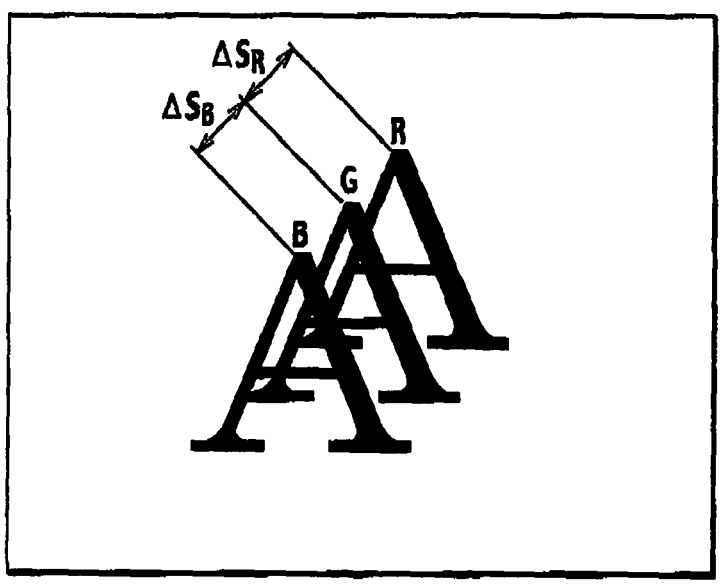
FIG. 13 is a view showing an image by the image senor imaging the character "A" in white on the black background in an arrangement where the prism is on the optical axis.

In the arrangement where the prisms are not positioned on the optical axis, FIG. 12 shows an image obtained by an image sensor having respective color filters of RGB and also imaging a character "A" in white on black background without passing through the prisms. While, in the arrangement where the prisms are positioned on the optical axis, FIG. 13 shows an image obtained by the image sensor imaging the character "A" in white on black background through the prisms. Note, these figures are illustrated while being inversed in monochrome.

In FIG. 12, the image "A" is colored in white so as to be visible clearly. On the contrary, in FIG. 13, three kinds of images of RGB are misaligned to each other because the lights are refracted by the prism with different refractive indexes by respective wavelengths of the lights. This is nothing other than an image shift due to chromatic aberration.

The greater the correction amount required to cancel the image fluctuation gets, in other words, the larger the hand shake angle gets, the larger the image shift due to chromatic aberration does get.

Therefore, the still image acquisition device is constructed so as to minimize the image shift due to chromatic aberration by first detecting the rotation angles of the movable prisms 10A, 10B in the correction operation, next calculating hand shake angles from the detected rotation angles and finally acquiring, as the still image, an image corresponding to a time immediately after the hand shake angle reaches zero or a minimum value.

In detail, the still image acquisition device calculates hand shake angles in the horizontal and vertical directions from the rotation angles $\alpha_{10}$, $\alpha_{20}$ of the movable prisms 10A, 10B in the correction operation detected by the sensors 8A, 8B. Then, when receiving a command signal requiring a still image through a user's manipulation of buttons, an outside indication or the like, the same device decides, as a still image acquisition reference time, a point of time when the absolute value of the hand shake angle of the horizontal direction or the vertical direction is zero or a minimum value and acquires a hand shake-corrected image read out from the image sensor immediately after the acquisition reference time, as the still image from the camera DSP unit 20.

Figure 14:
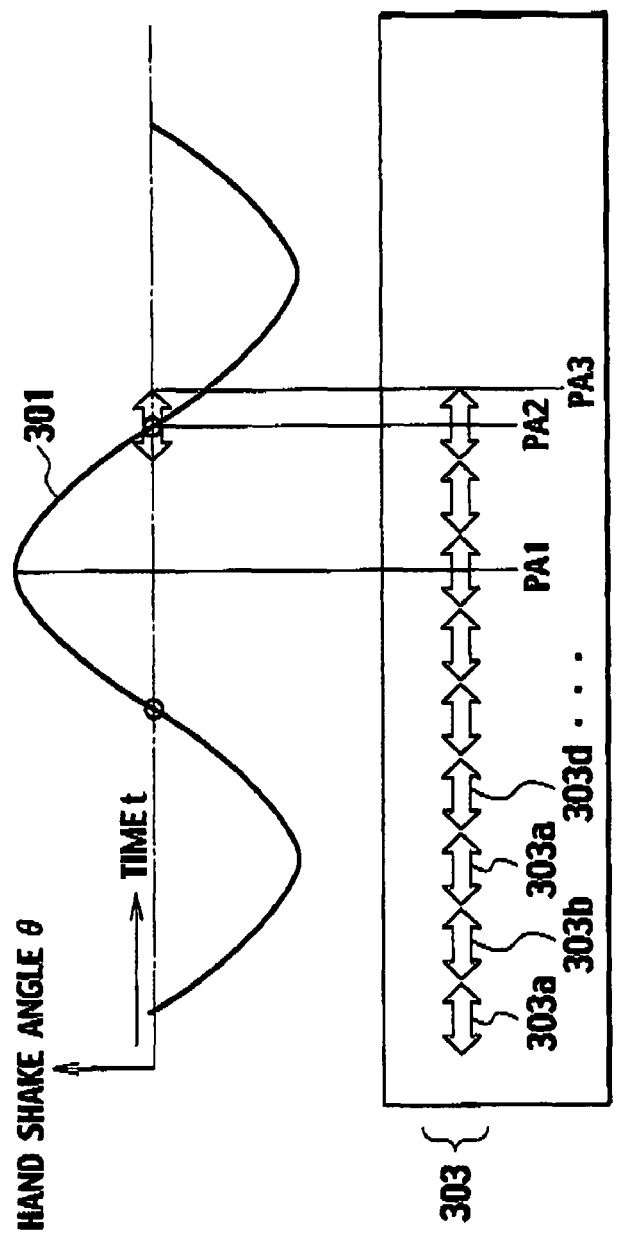
FIG. 14 is a view explaining a hand shake angle curve when a hand shake angle is zero.

FIG. 14 is a view explaining a hand shake angle curve including a situation that the hand shake angle is zero.

As obvious from FIG. 14, the hand shake angle curve 301 varies with time due to a user's hand shake (e.g. oscillating curve). On the other hand, as shown with an accumulation process 303 in FIG. 14, as a fixed period is required to accumulate each image upon the hand shake correction in the CCD unit 13, a timing of allowing an acquisition of a still image from the so-accumulated image information comes after completing each of the accumulation processes, that is, a right end of both arrows of each accumulation process 303 in the figure.

Again, PA1 of FIG. 14 designates a timing of receiving the command signal requiring a still image acquisition, PA2 the above acquisition reference time, and PA3 designates a time of acquiring the still image, respectively.

In FIG. 14, at time PA1, the acquisition reference time decision unit 6C of the CPU 6 receives the command signal requiring the still image acquisition by a user's manipulation of the external operation system 26. On receipt of the command signal, the acquisition reference time decision unit 6C starts an operation of judging whether the absolute value of the hand shake angle is zero (or a minimum value) or not.

In FIG. 14, at time PA2, the acquisition reference time decision unit 6C of the CPU 6 detects that the hand shake angle is zero. Then, the acquisition reference time decision unit 6C decides a point of time when the hand shake angle becomes zero as the still image acquisition reference time. At time PA3 when the accumulation process immediately after PA2 has been completed, the still image processing unit 25 acquires a hand shake-corrected image from the camera DSP unit 20, as the still image.

The acquisition reference time decision unit 6C acquires the information of hand shake angles as being the fluctuation correction amount continuously or at regular intervals and detects a point of time when the absolute value of the hand shake angle is zero or a minimum value.

When acquiring the information at regular intervals, the unit 6C detects a point of time when the absolute value of the hand shake angle is zero or a minimum value, based on the information about hand shake angle. Further, the unit 6C establishes, as the acquisition reference time, an acquisition point of time immediately after or before the so-detected point of time.

Figure 15:
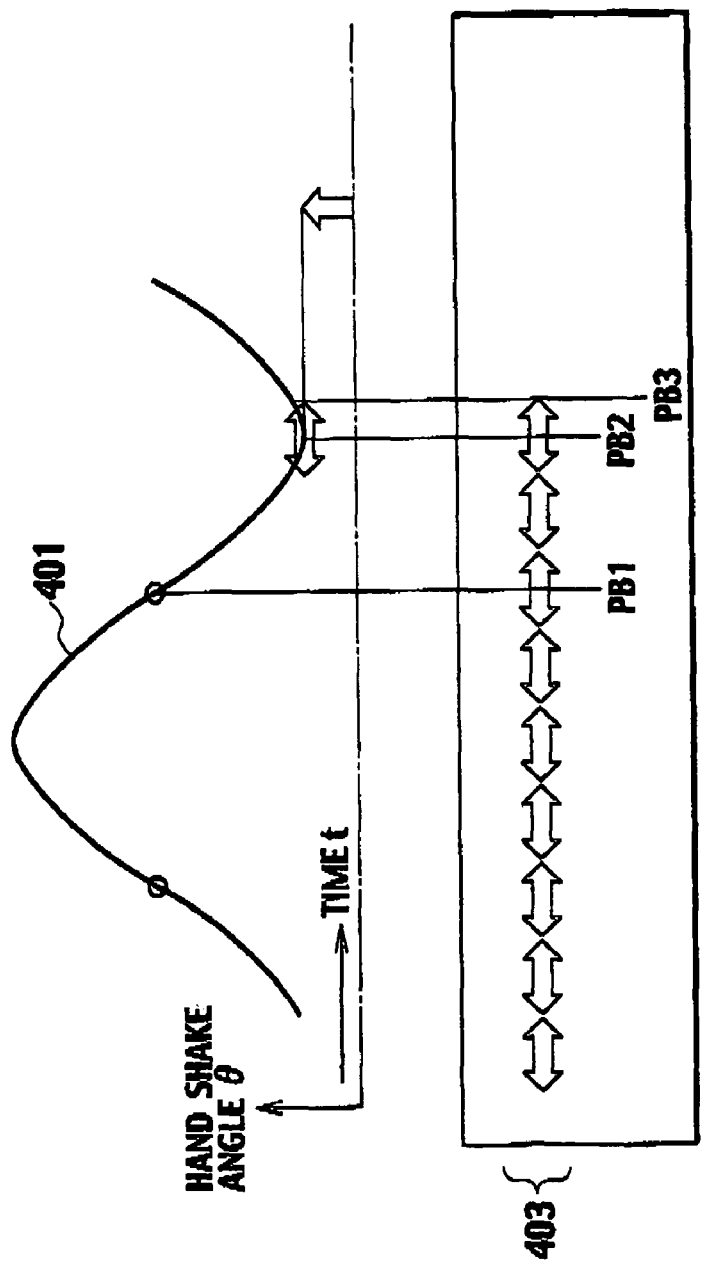
FIG. 15 is a view explaining a hand shake angle curve when an absolute value of the hand shake angle is a minimum value.

FIG. 15 is a view explaining a hand shake angle curve including a situation that the hand shake angle is a minimum value.

PB1 of FIG. 15 designates a timing of receiving the command signal requiring a still image acquisition, PB2 the still image acquisition reference time, and PB3 designates a time of acquiring the still image, respectively.

In FIG. 15, at time PB1, the acquisition reference time decision unit 6C of the CPU 6 receives the command signal requiring the still image acquisition by a user's manipulation of the external operation system 26. On receipt of the command signal, the acquisition reference time decision unit 6C starts an operation of judging whether the absolute value of the hand shake angle is zero (or a minimum value) or not.

In FIG. 15, at time PB2, the acquisition reference time decision unit 6C of the CPU 6 detects that the hand shake angle is a minimum value. Then, the acquisition reference time decision unit 6C decides a point of time when the hand shake angle becomes the minimum value as the still image acquisition reference time. At time PB3 when the accumulation process immediately after PB2 has been completed, the still image processing unit 25 acquires a hand shake-corrected image from the camera DSP unit 20, as the still image.

Figure 16:
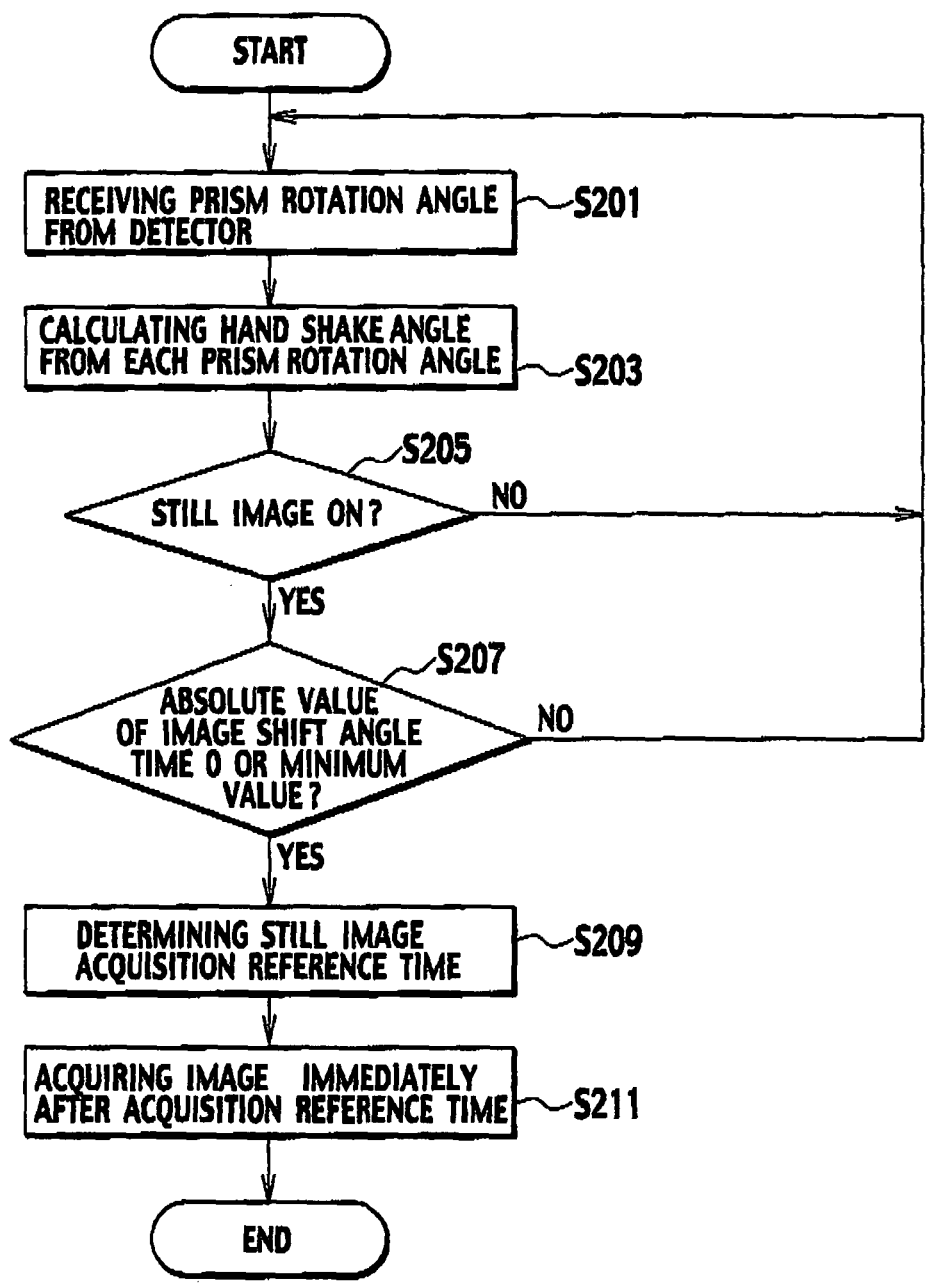
FIG. 16 is a view showing a processing flow of the still image acquisition device in accordance with the embodiment of the present invention.

Next, the process flow of the still image acquisition device of this embodiment will be described with reference to a flow chart of FIG. 16, below.

First, the hand shake angle calculation unit 6B of the CPU 6 receives the rotation angles $\alpha_{10}$, $\alpha_{20}$ of the movable prisms 10A, 10B detected by the sensors 8A, 8B (step S201).

Next, the hand shake angle calculation unit 6B of the CPU 6 calculates the image shift vector $_{vector}\theta=(\theta_X, \theta_Y)$ in the following form:

$$\theta_X=\theta_2 \sin \alpha_{10}-(1-\cos \alpha_{20})\theta_3, \quad (29)$$

$$\theta_Y=\theta_3 \sin \alpha_{20}-(1-\cos \alpha_{10})\theta_2. \quad (30)$$

Note that $\theta_2$ and $\theta_3$ are image shift angles of the movable prisms 10A, 10B, respectively.

Then, the hand shake angle calculation unit 6B of the CPU 6 calculates the hand shake angle vector $_{vector}\theta^*=(\theta_X^*, \theta_Y^*)$ representing both magnitude and direction of this fluctuation with the use of $\theta_X$, $\theta_Y$ as the components of $_{vector}\theta$ by the following equation (step S203):

$$(\theta_X^*,\theta_Y^*)=(-\theta_X,-\theta_Y). \quad (31)$$

Next, when receiving the command signal requiring the still image acquisition through a user's manipulation of buttons accepted by the external operation system 26 (step S205), the acquisition reference time decision unit 6C of the CPU 6 decides a point of time corresponding to a hand shake angle in the horizontal or vertical direction calculated by the hand shake angle calculation unit 6B that an absolute value of the calculated hand shake angle is zero or a minimum value, as the still image acquisition reference time (step S207, S209).

Note, as the acquisition reference time decision unit 6C of the CPU 6 determines the still image acquisition reference time by the hand shake angle in either the horizontal direction or the vertical direction, it is necessary to establish which of the horizontal and vertical directions should be determined in priority for the still image acquisition reference time, in advance.

Considering that the horizontal resolution of an optical lens deteriorates in the circumference of both sides of a screen because of its oblong structure, for example, the band shake angle in the horizontal direction is established as the acquisition reference. Alternatively, if desired to take priority of contrast in the vertical direction of the screen previously, the hand shake angle in the vertical is established as the acquisition reference.

Next, the still image processing unit 25 receives the acquisition reference time determined by the acquisition reference time decision unit 6C of the CPU 6 and acquires, as the still image, a hand shake-corrected image corresponding to a readout timing immediately after the acquisition reference time, that is an image controlled by the rotation control unit 6A of the CPU 6 from the camera DSP unit 20 (step S211).

Consequently, when acquiring the still image from images having their fluctuations corrected, the still image acquisition device of this embodiment can acquire a still image immediately after a timing of having the smallest band shake angle, in other words, a still image in which image shift due to chromatic aberration is the smallest one. As a result, it is possible to provide a user with a clear still image.

Although the still image acquisition device of this embodiment adopts the movable prisms 10A, 10B as the light refraction means and calculates the hand shake angle from the detected rotation angles of the movable prisms 10A, 10B, there may be adopted, as the other light refraction means, a well-known method, such as a prism to be inclined and a lens to be shifted.

In adopting a method of inclining a prism, there may be carried out to correct the image fluctuation by changing an inclination angle of an imaging equipment to respective different directions from either the vertical direction or the horizontal direction of the equipment, to detect an inclination angle (control amount) of the prism and to finally calculate a hand shake angle by the so-detected inclination angle.

Variations of Embodiment

Variation 1

Again, the still image acquisition device of this embodiment is constructed so as to minimize the image shift due to chromatic aberration by first detecting the rotation angles of the movable prisms 10A, 10B in the correction operation, next calculating hand shake angles from the detected rotation angles and finally acquiring, as the still image, an image read out immediately after the hand shake angle has reached zero or a minimum value.

In the variation 1, in order to simplify the device, the hand shake angles in the horizontal and vertical directions are calculated from a fluctuation detected by the hand shake detection unit 5, directly.

In detail, the band shake detection unit 5 detects image shift angles, while the hand shake angle calculation unit 6B receives the band shake angles through the rotation control unit 6A of the CPU 6 thereby to calculate the hand shake angles by the equation (30).

Thereafter, when receiving the command signal requiring the still image acquisition through a user's manipulation of buttons accepted by the external operation system 26, the acquisition reference time decision unit 6C decides a point of time corresponding to a hand shake angle calculated by the hand shake angle calculation unit 6B that an absolute value of the calculated hand shake angle is zero or a minimum value, as the still image acquisition reference time. Successively, it is performed to acquire a hand shake-corrected image corresponding to a point of time immediately after the acquisition reference time determined by the acquisition reference time decision unit 6C, that is, an image taken under the control of the rotation control unit 6A of the CPU 6.

In this way, as the hand shake angles are calculated by the image shift angles detected by the hand shake detection unit 5 directly, it is possible to utilize a general-purpose photorefractive structure as the light refraction means, allowing a simplification of the still image acquisition device in its constitution.

Variation 2

Although the still image acquisition device of this embodiment is constructed so as to acquire, as the still image, an image read out immediately after the hand shake angle is zero or a minimum value from the camera DSP unit 20 directly, the variation 2 adopts the still image acquisition attained by selecting a still image from images stored in the storage unit 24.

In detail, the still image acquisition device of the variation 2 is constructed so that the storage unit 24 previously stores the hand shake-corrected images for a predetermined period, the information for specifying their imaging points of time and the hand shake angles in the horizontal and vertical directions calculated by the hand shake angle calculation unit 68, in coordination with each other.

Then, when receiving the command signal requiring the still image acquisition through a user's manipulation of buttons accepted by the external operation system 26, the acquisition reference time decision unit 6C of the CPU 6 decides, as the still image acquisition reference time, a point of time when the absolute value of a hand shake angle in the horizontal or vertical direction, which is calculated by the hand shake angle calculation unit 6B of the CPU 6, has reached zero or a minimum value. Alternatively, the acquisition reference time decision unit 6C decides, as the still image acquisition reference time, a point of time when the absolute value of a hand shake angle in the horizontal or vertical direction stored in the storage unit 24 has reached zero or a minimum value.

Thereafter, the still image processing unit 25 acquires, as the still image to be acquired, an image corresponding to a point of time immediately after the acquisition reference time determined by the acquisition reference time decision unit 6C of the CPU 6 from the camera DSP unit 20 or the storage unit 24.

Consequently, it is possible to acquire a still image in the most recent before receiving the command signal requiring the still image acquisition, the so-acquired still image containing the timing of realizing zero or a minimum value in the absolute value of the hand shake angle. That is, it is possible to acquire a still image at the timing of a smaller hand shake angle, in other words, a still image whose image shift due to chromatic aberration is the smallest one.

Besides, the period of storing the hand shake-corrected image in the storage unit 24 has to be established in advance. Assuming that the period for storage is set to one second (1 sec.), there would be stored a plurality of hand shake-corrected images read out since a time preceding a user's manipulating of buttons of the external operation system 26 by one second (1 sec.) in the storage unit 24. From this point of view, it is desirable to set the storing period with a time length so as not to allow a user to have uncomfortable feeling in the difference between an image at a point of time of manipulating the buttons of the external operation system 26 and an image actually acquired as the still image.

Variation 3

Although the still image acquisition device of this embodiment is constructed so as to acquire, as the still image, an image corresponding to a point of time immediately after the hand shake angle has reached zero or a minimum value from the camera DSP unit 20 directly, the variation 3 enables an acquisition of a still image from the storage unit 24 previously storing the hand shake-corrected images whose the hand shake angles are zero in common.

In detail, the still image acquisition device is constructed so that the storage unit 24 previously stores the hand shake-corrected images read out immediately after the hand shake angle in the horizontal or vertical direction calculated by the hand shake angle calculation unit 6B of the CPU 6 is zero and the information for specifying their imaging points of time, in coordination with each other.

Then, when receiving the command signal requiring the still image acquisition, the acquisition reference time decision unit 6C of the CPU 6 decides, as the still image acquisition reference time, a point of time when an absolute value of the hand shake angle in the horizontal or vertical direction, which is calculated by the hand shake angle calculation unit 6B, has reached zero or a minimum value. Alternatively, the acquisition reference time decision unit 6C decides, as the still image acquisition reference time, the latest point of time when the absolute value of a hand shake angle in the horizontal or vertical direction stored in the storage unit 24 has reached zero or a minimum value.

Thereafter, the still image processing unit 25 acquires a hand shake-corrected image from the camera DSP unit 20 or the storage unit 24, as the still image to be acquired. Note, the band shake-corrected image is an image which has been read out and accumulated while including a point of time when the hand shake angle is zero, corresponding to the point of time immediately after the acquisition reference time determined by the acquisition reference time decision unit 6C.

Consequently, even when the hand shake angle becomes zero before receiving the command signal requiring the still image acquisition, it is possible to acquire a still image accumulated including the above timing and subsequently read out. That is, it is possible to acquire a still image at the timing of a smaller hand shake angle, in other words, a still image whose image shift due to chromatic aberration is the smallest one.

Variation 4

The still image acquisition device of this embodiment is constructed so as to acquire an image corresponding to a point of time immediately after predetermined one of the hand shake angles in the horizontal and vertical directions has reached zero or a minimum value, as the still image. On the contrary, according to the variation 4, it is executed to acquire, as the still image, an image read out immediately after either the hand shake angle in the horizontal direction or the hand shake angle in the vertical direction has reached zero or a minimum value in advance to the other hand shake angle since the acquisition command signal was received.

In detail, the hand shake angle calculation unit 6B of the CPU 6 calculates the hand shake angles in both horizontal and vertical directions. On the other hand, the still image acquisition unit 6C of the CPU 6 determines, as the still image acquisition reference time, a point of time corresponding to one of the hand shake angles in the horizontal and vertical directions, which has reached zero or a minimum value in advance to the other hand shake angle.

Figure 17:
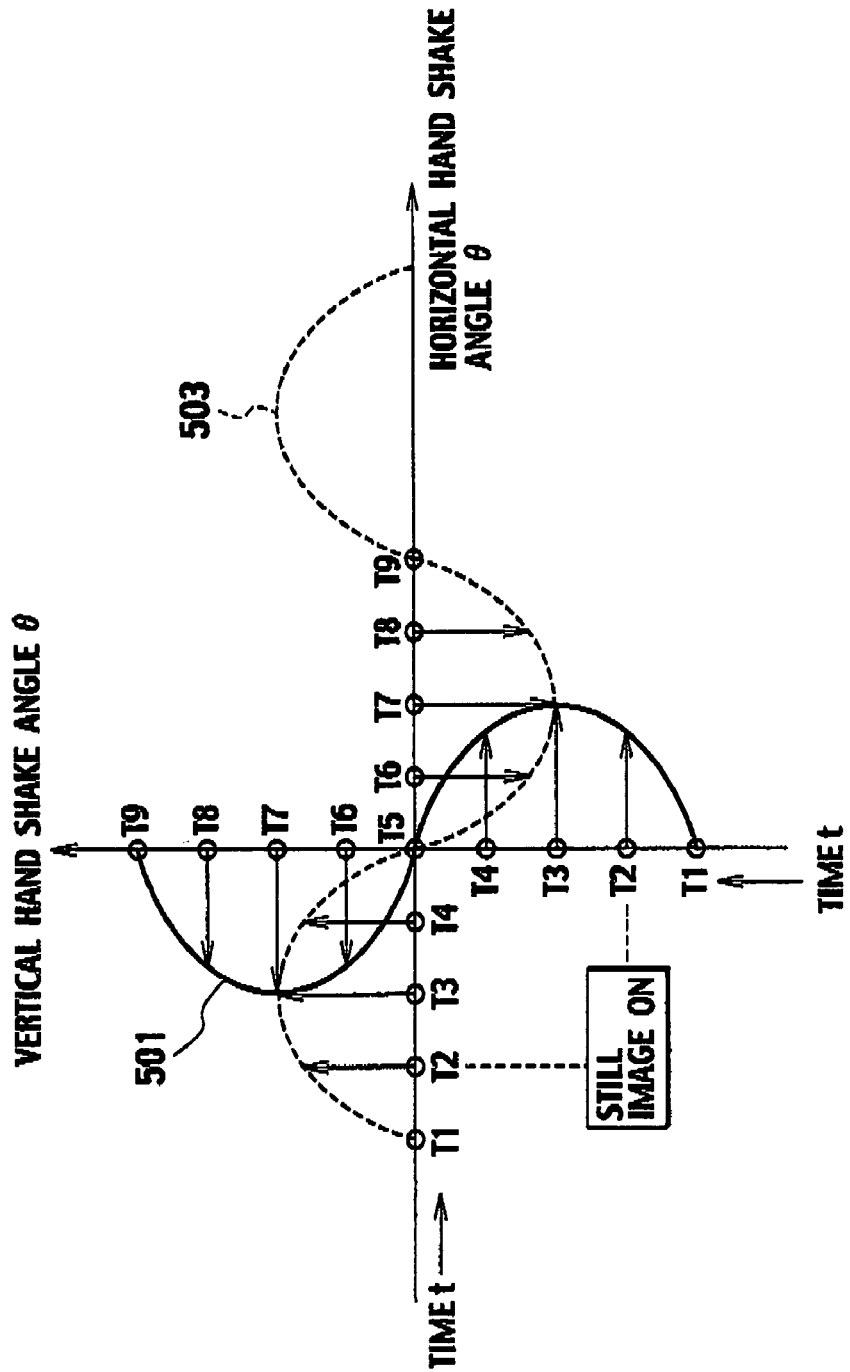
FIG. 17 is a view explaining a hand shake angle curve when a phase difference between a hand shake in the horizontal direction and a hand shake in the vertical direction is zero.

FIG. 17 shows hand shake angle curves in a situation that there is no phase difference in between the hand shake in the horizontal direction and the hand shake in the vertical direction.

As understood from FIG. 17, the hand shake angle curves in the horizontal and vertical directions can be drawn corresponding to the rotation angles of the movable prisms 10A, 10B, independently. Then, the acquisition reference time decision unit 6C of the CPU 6 determines, as the still image acquisition reference time, a point of time corresponding to one of the band shake angles in both horizontal and vertical directions, which has reached zero or a minimum value ahead of the other hand shake angle.

In FIG. 17, there is produced no phase difference in between the hand shake in the horizontal direction and the hand shake in the vertical direction. Therefore, if it is assumed that the time of receiving the command signal requiring the still image acquisition through a user's manipulation of buttons accepted by the external operation system 26 is T2 in FIG. 17, the times when the hand shake angles in the horizontal and vertical direction become zero are T5 together. Therefore, in case of FIG. 17, even if any of the hand shake angles in the horizontal and vertical direction is determined in preference as the acquisition reference time, the same result would be given in both cases.

While, if there is a phase difference in between the hand shake in the horizontal direction and the hand shake in the vertical direction, the determination of the acquisition reference time in favor of either the horizontal hand shake or the vertical hand shake would allow a faster acquisition of a still image whose hand shake angle is smaller, in other words, a still image whose image shift due to chromatic aberration is the smallest.

Figure 18:
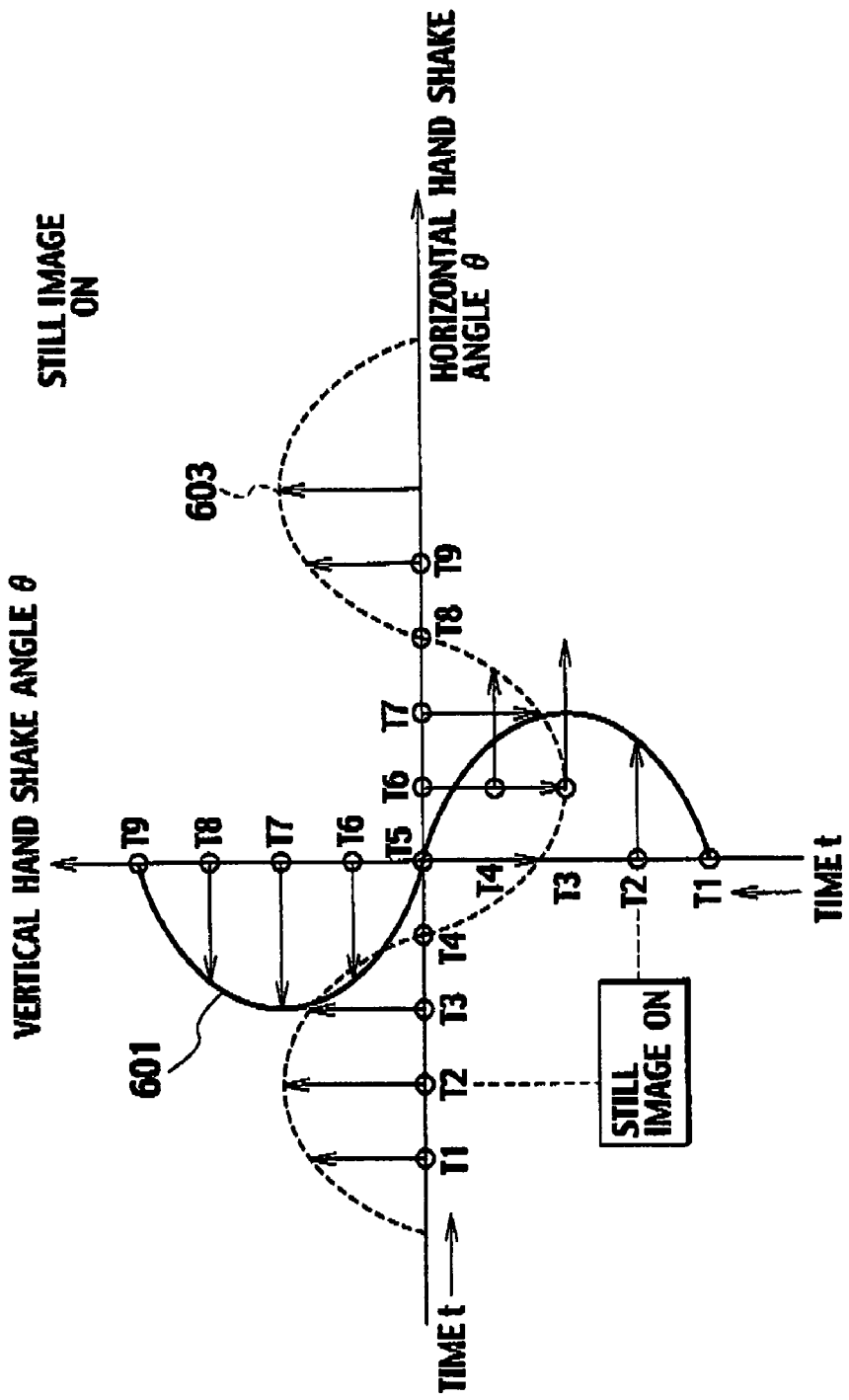
FIG. 18 is a view explaining a hand shake angle curve when the phase of a hand shake angle in the vertical direction is shifted from the phase of a hand shake angle in the horizontal direction to a minus direction by 45 degrees.

FIG. 18 shows the hand shake curves where, by way of example, the phase in the vertical direction is shifted to a minus direction by 45 degrees in comparison with that of FIG. 17.

As understood from FIG. 18, if it is assumed that the time of receiving the command signal requiring the still image acquisition through a user's manipulation of buttons accepted by the external operation system 26 is T2 in FIG. 18, the time when the hand shake angle in the vertical direction become zero is T4, while the time when the hand shake angle in the horizontal direction become a minimum value is T5. Thus, as the hand shake angle in the vertical direction becomes zero (or a minimum value) in advance to the hand shake angle in the horizontal direction, it is carried out to give preference to the vertical hand shake angle over the horizontal hand shake angle. Thus, the point of time when the absolute value of the vertical hand shake angle is zero (i.e. time T4) is determined as the still image acquisition reference time.

Consequently, as either the horizontal hand shake angle or the vertical hand shake angle is established corresponding to the hand shake of the camera automatically, it is possible to acquire a still image whose hand shake angle is smaller more quickly, in other words, a still image whose image shift due to chromatic aberration is the smallest.

Variation 5

The still image acquisition device of this embodiment is constructed so as to acquire an image as the still image, which corresponds to a point of time immediately after the hand shake angle has reached zero or a minimum value, from the camera DSP unit 20 directly. While, according to the variation 5, a point of time immediately after a predetermined period has passed is determined as the acquisition reference time.

In detail, if the hand shake angle calculated by the hand shake angle calculation unit 6B of the CPU 6 does not become zero or a minimum value within a predetermined acquisition limit period, then the acquisition reference time decision unit 6C of the CPU 6 determines a time when this acquisition limit period has passed, as the still image acquisition reference time.

Figure 19:
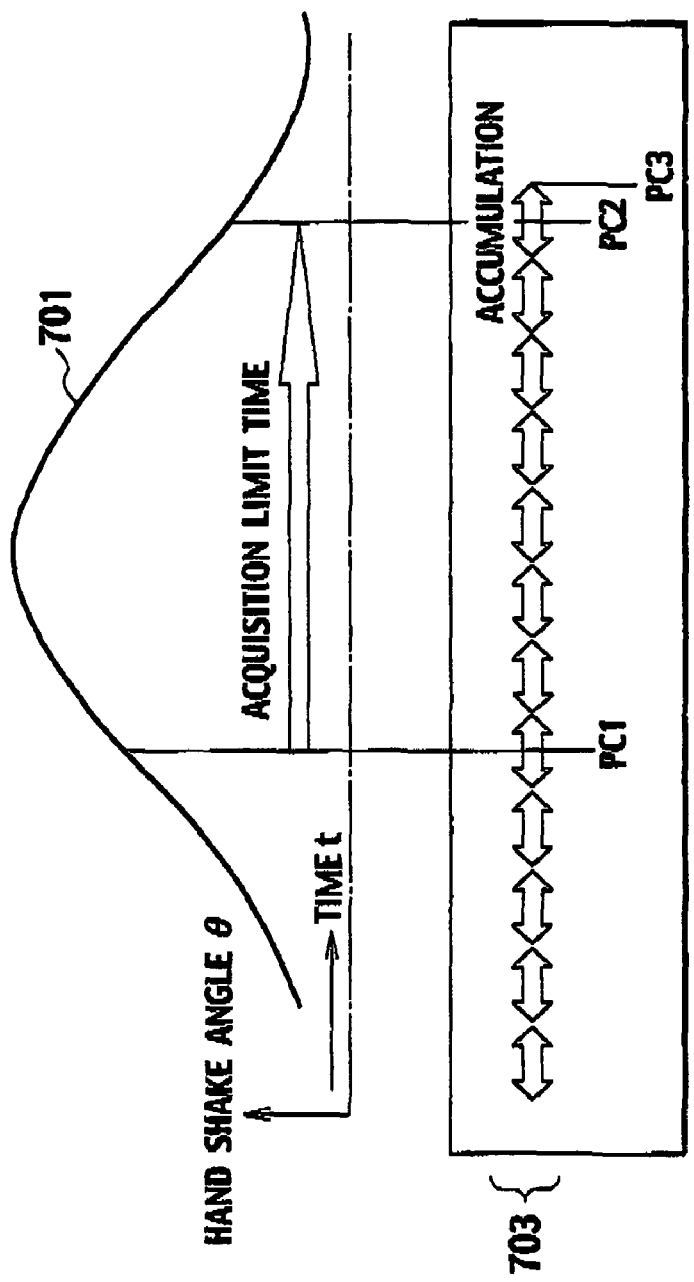
FIG. 19 is a view explaining a hand shake angle curve in case that the hand shake angle does not become zero or a minimum value within a predetermined acquisition time limit.

FIG. 19 is an explanatory view showing a hand shake angle curve when the hand shake angle does not become zero or a minimum value within the predetermined acquisition limit period.

In FIG. 19, PC1 denotes a timing of receiving the command signal requiring the still image acquisition, PC2 a still image acquisition reference time and PC3 denotes a time of acquiring a still image.

In FIG. 19, at time PC1, the acquisition reference time decision unit 6C of the CPU 6 receives the command signal requiring the still image acquisition by a user's manipulation of the external operation system 26. Thus, the acquisition reference time decision unit 6C judges whether the absolute value of the hand shake angle is either zero or a minimum value or not. However, FIG. 19 shows a situation that the absolute value of the hand shake angle calculated by the band shake calculation unit 6B of the CPU 6 has not reached zero or a minimum value yet despite that the acquisition limit period passed at time PC2.

Therefore, the acquisition reference time decision unit 6C determines the time PC2 as the still image acquisition reference time and thereafter, the still image processing unit 25 acquires the hand shake-corrected image as the still image from the camera DSP unit 20 at time PC3 corresponding to a timing of readout.

In this way, even if the hand shake angle does not become zero or a minimum value within the predetermined period, it is possible to determine the still image acquisition reference time, allowing an acquisition of the still image.

Besides, this acquisition limit period has to be established in advance. Here, it is assumed that the acquisition limit period is set to one second (1 sec.). In this case, if the absolute value of the hand shake angle does not reach zero or a minimum value for one second since a user's manipulating of buttons, a point of time when one second has passed since the user's manipulation is determined as the still image acquisition reference time. From this point of view, it is desirable to set the acquisition limit period with a time length so as not to allow a user to have uncomfortable feeling in the difference between an image at a point of time of manipulating the buttons of the external operation system 26 and an image actually acquired as the still image.

Variation 6

Figure 20:
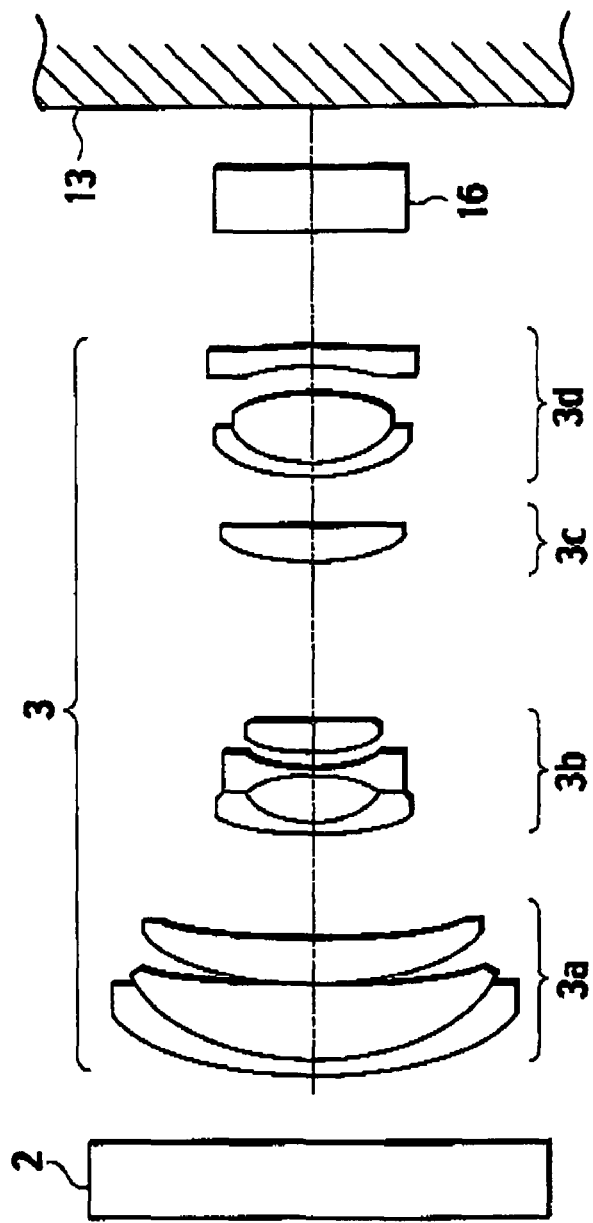
FIG. 20 is a view showing a lens system of FIG. 1.

Although the lens system 3 is expressed in the form of one block in the video camera 1 of this embodiment shown in FIG. 1, the lens system 3 may be formed by a plurality of lenses in group. FIG. 20 is a view showing the lens system of FIG. 1. FIG. 21 is a view showing an arrangement among the correction unit 2 of FIG. 1, the lens system 3 and the others. FIG. 21(a) is a view showing an arrangement where the correction unit 2 is arranged in the lens system 3. FIG. 21(b) is a view showing an arrangement where the correction unit 2 is arranged behind the lens system 3.

The lens system 3 comprises first to fourth lens groups 3a to 3d. Behind the lens system 3, there are an optical low-pass filter 16 for suppressing noise (false signal), which is not shown in FIG. 1 and the CCD unit 13 for imaging a subject image.

In FIG. 1, the correction unit 2 is arranged in front of the lens system 3 as shown in FIG. 20. However, the correction unit 2 may be arranged inside the lens system 3, as shown in FIG. 21(a). Alternatively, as shown in FIG. 21(b), the correction unit 2 may be arranged behind the lens system 3. Consequently, as the correction unit 2 is arranged in a narrow part of light flux during or after its passage through the lens system 3, it is possible to miniaturize the correction unit 2.

Although the correction unit 2 includes the fixed prism 9 and the movable prisms 10A, 10B as shown in FIG. 3, the fixed prism 9 may be deleted from the device. Alternatively, a further fixed prism may be added to the device.

Figure 22:
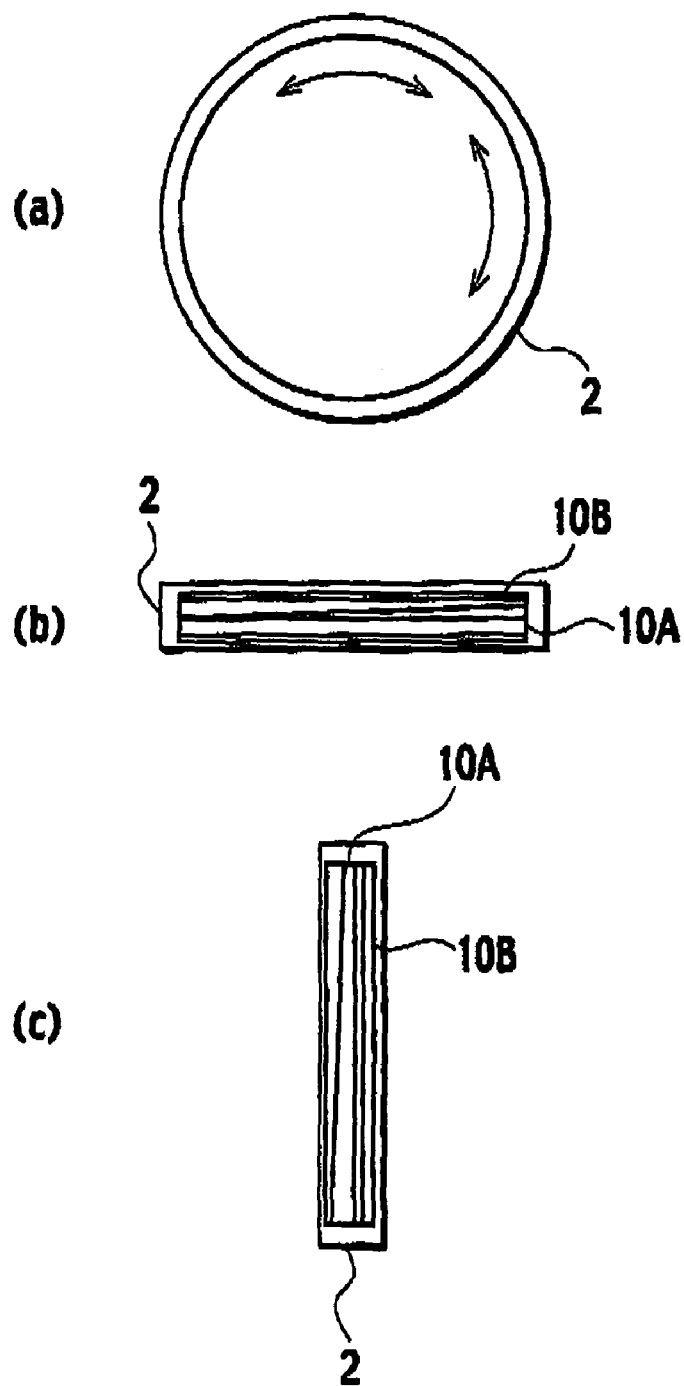

FIG. 22 is a view showing a correction unit with no fixed prism as another form of the correction unit 2. FIG. 22(a) is a front view of the unit, FIG. 22(b) a plan view, and FIG. 22(c) is a side view. Additionally, FIG. 23 is a view showing a correction unit with two sheets of food prisms as the other form of the correction unit 2. FIG. 23(a) is a front view of the unit, FIG. 23(b) a plan view, and FIG. 23(c) is a side view.

In the arrangement of FIG. 23, the positions of respective prisms are adjusted so that an incident angle becomes equal to an emitting angle about the correction unit 2 in the initial state. In common with FIGS. 22 and 23, the other operations are similar to those in the above-mentioned embodiment. Accordingly, the similar effects would be provided in this case.

In FIG. 22, as the shown arrangement is provided with two movable prisms 10A, 10B only, the image is shifted in the initial state by the image shift angle θ, as obvious from FIG. 8(b). However, such a condition does not have direct connection with the image fluctuation correction.

Figure 33:
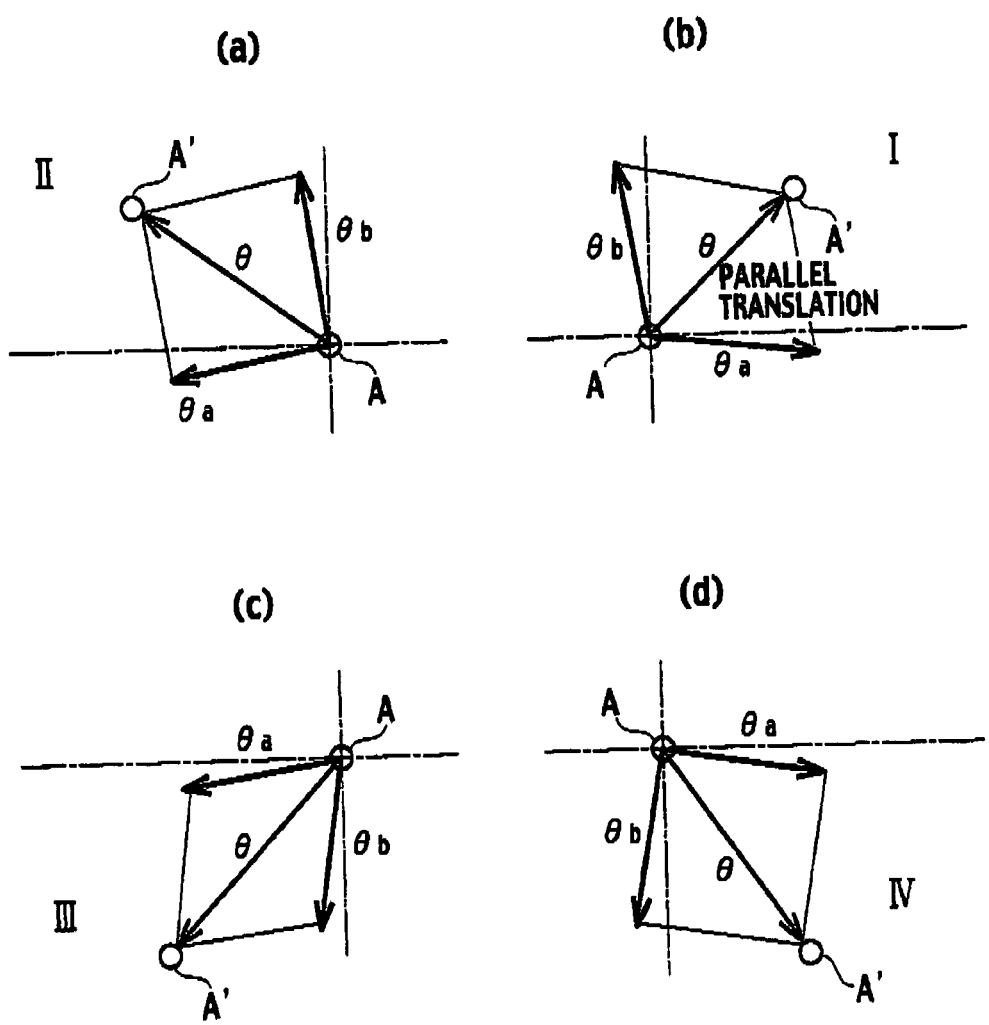

However, it should be noted that the arrangement of FIG. 22 deleting the fixed prism 22 causes the image shift due to chromatic aberration to be increased in comparison with the arrangements of FIGS. 3 and 33. That is, although the correction unit 2 in common with FIGS. 3 and 33 is constructed so that the fixed prism 9 makes an incident angle on the unit 2 equal to the emitting angle in the initial state, the arrangement comes from the purpose of minimizing the influence of prism effect at the image fluctuation correction on the chromatic aberration thereby to reduce an amount of the image shift collection derived therefrom.

On the contrary, as the correction unit of FIG. 22 eliminates the fixed prism 9, the incident angle does not become equal to the emitting angle in the initial state. Comparing with the arrangements of FIGS. 3 and 33, therefore, the image shift due to chromatic aberration gets so large as to cause an increasing of an amount required for correcting the image shift due to chromatic aberration. On the other hand, the arrangement of FIG. 22 with no faced prism allows a length of the correction unit 2 in the direction of the optical axis to be shortened for its miniaturization.

Alternatively, the device may be designed so as to strike a balance between the effect of reducing the correction amount against the image shift due to chromatic aberration and the effect of miniaturizing the correction unit 2. Then, the correction amount of the image shift due to chromatic aberration is not so great as that of FIG. 22, while the correction unit 2 can be small-sized in comparison with the units of FIGS. 3 and 23. That is, the prism angle of the fixed prism 9 may be adjusted so that the amount of the image shift due to chromatic aberration has an intermediate value between the image shift of FIG. 22 and that of FIGS. 3 and 23. With this adjustment, it is possible to strike a balance between the effect of reducing the correction amount against the image shift due to chromatic aberration and the effect of miniaturizing the correction unit 2.

Figure 24:
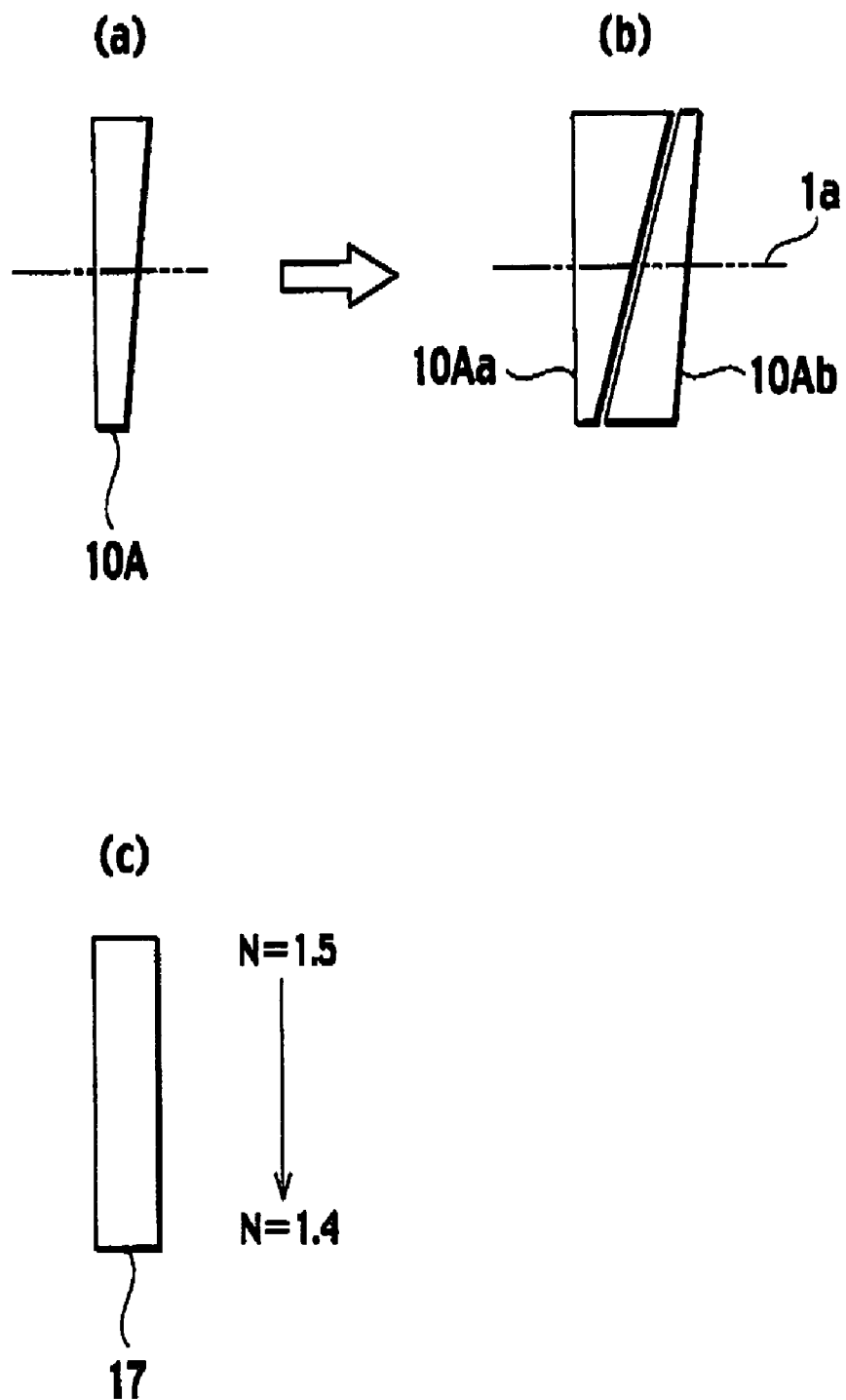

Additionally, each of the prisms in the embodiments of FIGS. 3, 22 and 33 may be provided in the form of a simplex prism or a compound prism. Alternatively, the prism may be formed by a parallel plate having prism effect. FIG. 24 illustrates the other constitution of the prism of the present invention. FIG. 24(a) is a view showing such a simplex prism, FIG. 24(b) a view of such a compound prism, and FIG. 24(c) is a view showing such a parallel plate having prism effect.

For instance, as shown in FIG. 24(b), the movable prism 10A may be provided in the form of a compound prism produced by bonding two sheets of prisms 10Aa, 10Ab with minute angles. In case of this compound prism, it is possible to greaten an angle of each prism body, facilitating a production of a minute-angle prism that could be formed by a simplex prism with difficulty.

Further, as shown in FIG. 24(c), each prism may be replaced by a parallel plate 17 having prism effect with a refraction index N changed from N=1.5 to N=1.4. Although the prism is usually required to control its inclination angle in the course of production, the provision of the parallel plate 17 would facilitate a processing of the prism.

(Image Fluctuation Correction Device)

Next, an embodiment of the image fluctuation correction device will be described. In this embodiment, its explanation will be illustrated by citing the example of an image fluctuation correction device for correcting an image shift produced by chromatic aberrations of prisms non-optically.

Figure 25:
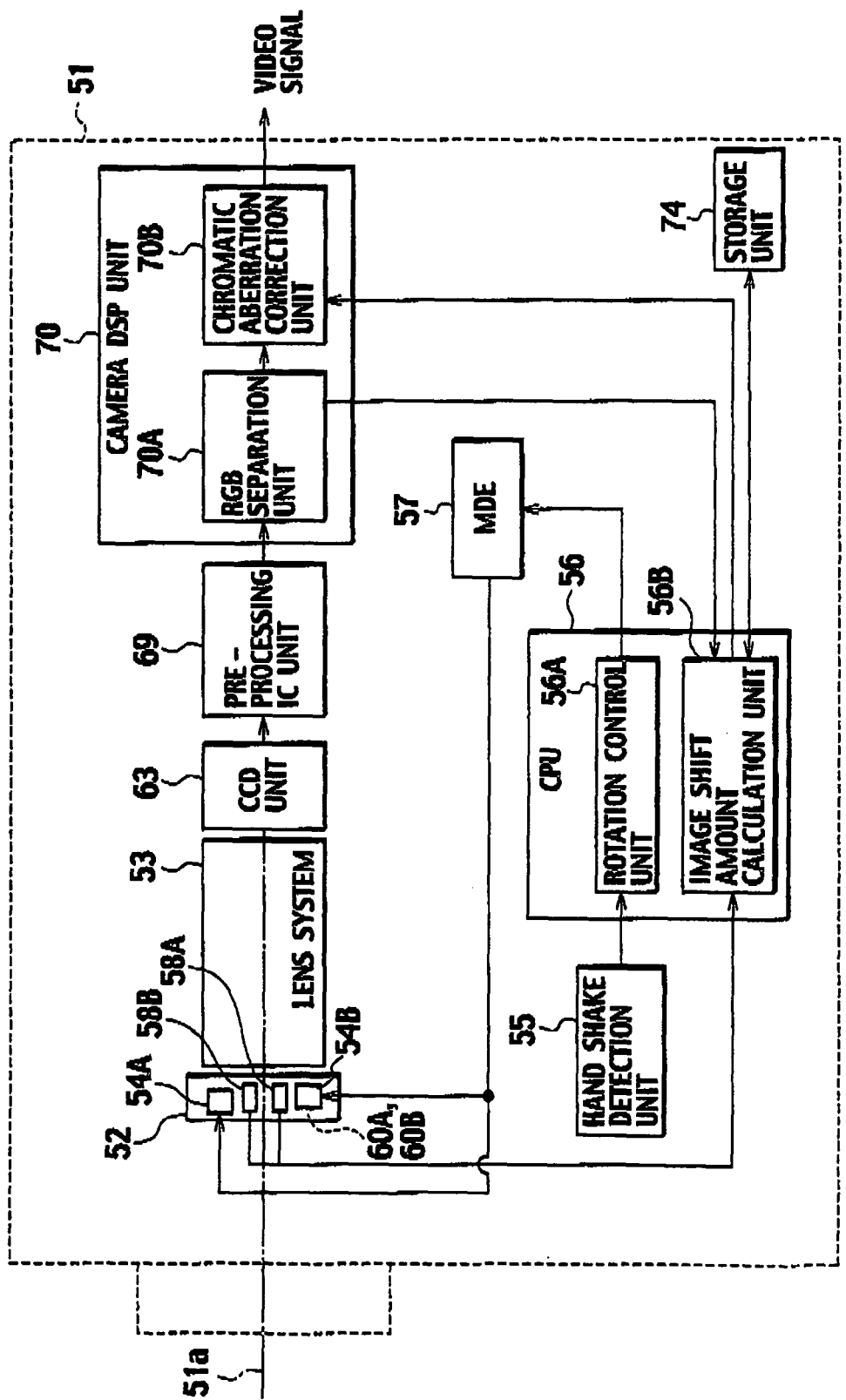
FIG. 25 is a block diagram showing the constitution of an image fluctuation correction device in accordance with an embodiment of the present invention.

FIG. 25 is a block diagram showing the constitution of the image fluctuation correction device in accordance with one embodiment of the present invention. The image fluctuation correction device of the present invention is provided in a well-known video camera 51, for example.

In this embodiment, the image fluctuation correction device includes a correction unit 52 having a pair of movable prisms independently rotatable about an optical axis 51a as a rotating center and a fixed prism, a lens system 53 for taking pictures of a subject, a CCD unit 63 allowing incident light through the lens system 53 to form an image and also converting a so-formed subject image into electrical signals, a pre-processing IC unit 69 having CDS, AGC and A/D conversion fractions, a camera DSP unit 70 having a RGB separation unit 70A for separating signals outputted from the pre-processing IC unit 69 into respective colors RGB and a chromatic aberration correction unit 70B for correcting an image shift due to chromatic aberration of the signals, actuators 54A, 54B for rotating the pair of movable prisms in the correction unit 52 about the optical axis respectively, a hand shake detection unit 55 for detecting a fluctuation of the video camera 51 due to hand shake etc. and generating hand shake signals, a CPU 56 having a rotation control unit 56A that transmits control signals to the actuators 54A, 54B so as to cancel the fluctuation in response to the hand shake signal from the hand shake detecting unit 55, an image shift amount calculation unit 56B for calculating respective image shift amounts in the position coordinate of respective color-separated images due to chromatic aberrations, from respective rotation amounts of the movable prisms detected by sensors 58A, 58B, a motor drive electronic circuit (MDE) 57 for driving the actuators 54A, 54B in response to the control signals from the rotation control unit 56A of the CPU 56 and the above sensors 58A, 58B for detecting rotations of the pair of movable prisms in the correction unit 52.

Figure 26:
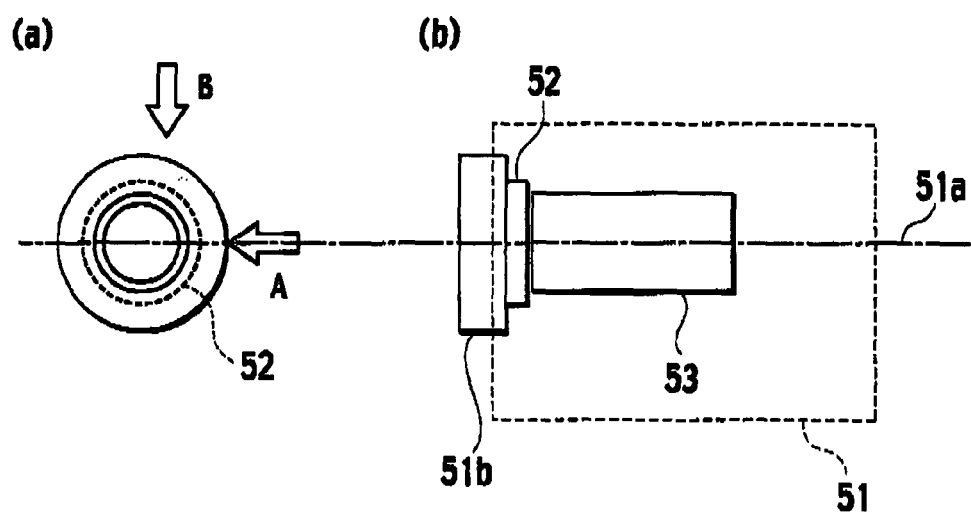
Figure 27:
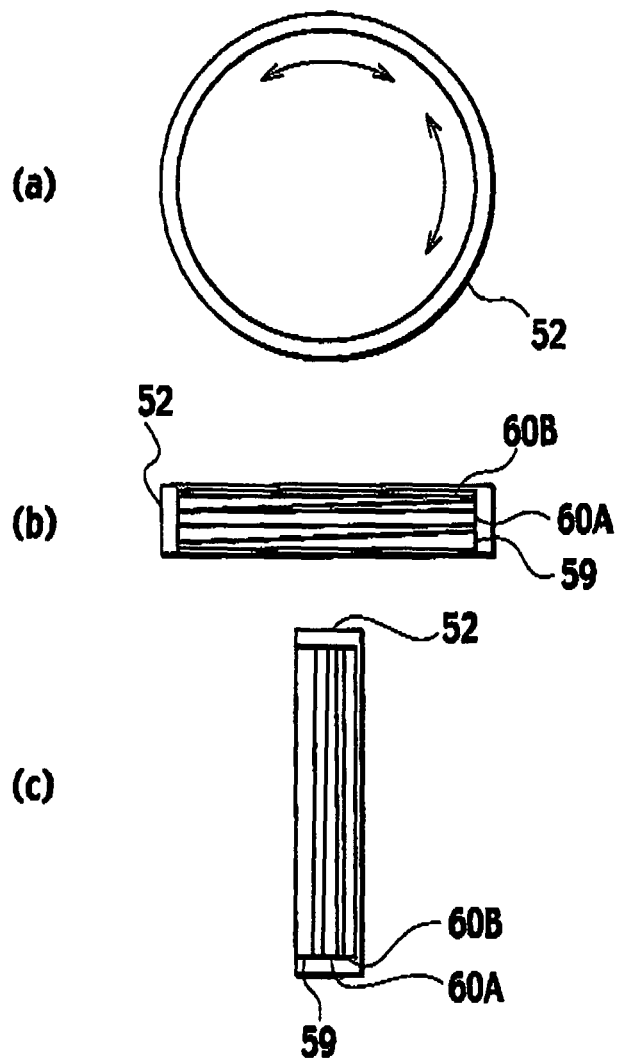
Figure 28:
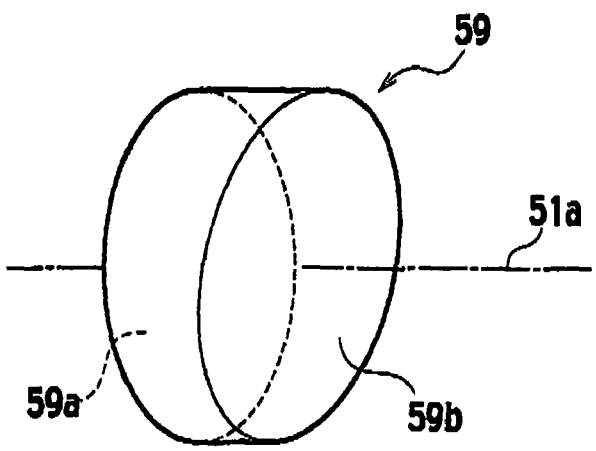
FIG. 28 is a perspective view of a fixed prism that the correction unit of FIG. 27 includes.

FIG. 26 are schematic views showing the correction unit 52 of the image fluctuation correction device of FIG. 25. FIG. 26(a) is a schematic front view of the unit, while FIG. 26(b) is a schematic side view of the unit. FIG. 27 are structural views of the correction unit 52. FIG. 27(a) is a front view of the unit. FIG. 27(b) is a sectional view viewed in a direction B of FIG. 26(a), while FIG. 27(c) is a sectional view viewed in a direction A of FIG. 26(a). FIG. 28 is a perspective view of the fixed prism arranged in the correction unit 52.

As shown in FIG. 26, the correction unit 52 is arranged between the lens system 53 and a hood part 51b covering a front face of the lens system 53. As shown in FIGS. 27(a) to 27(c), the correction unit 52 includes a fixed prism 59 immovable in position and a pair of movable prisms 60A, 60B rotatable about the optical axis as the rotating center.

As shown in FIG. 28, the fixed prism 59 includes a first face 59a perpendicular to the optical axis 51a and a second face 59b being a flat surface opposed to the first face 59a at a minute angle slant. The fixed prism 59 is made of acryl etc. The movable prisms 60A, 60B are also similar to the prism 9 in terms of shape and material.

Figure 29:
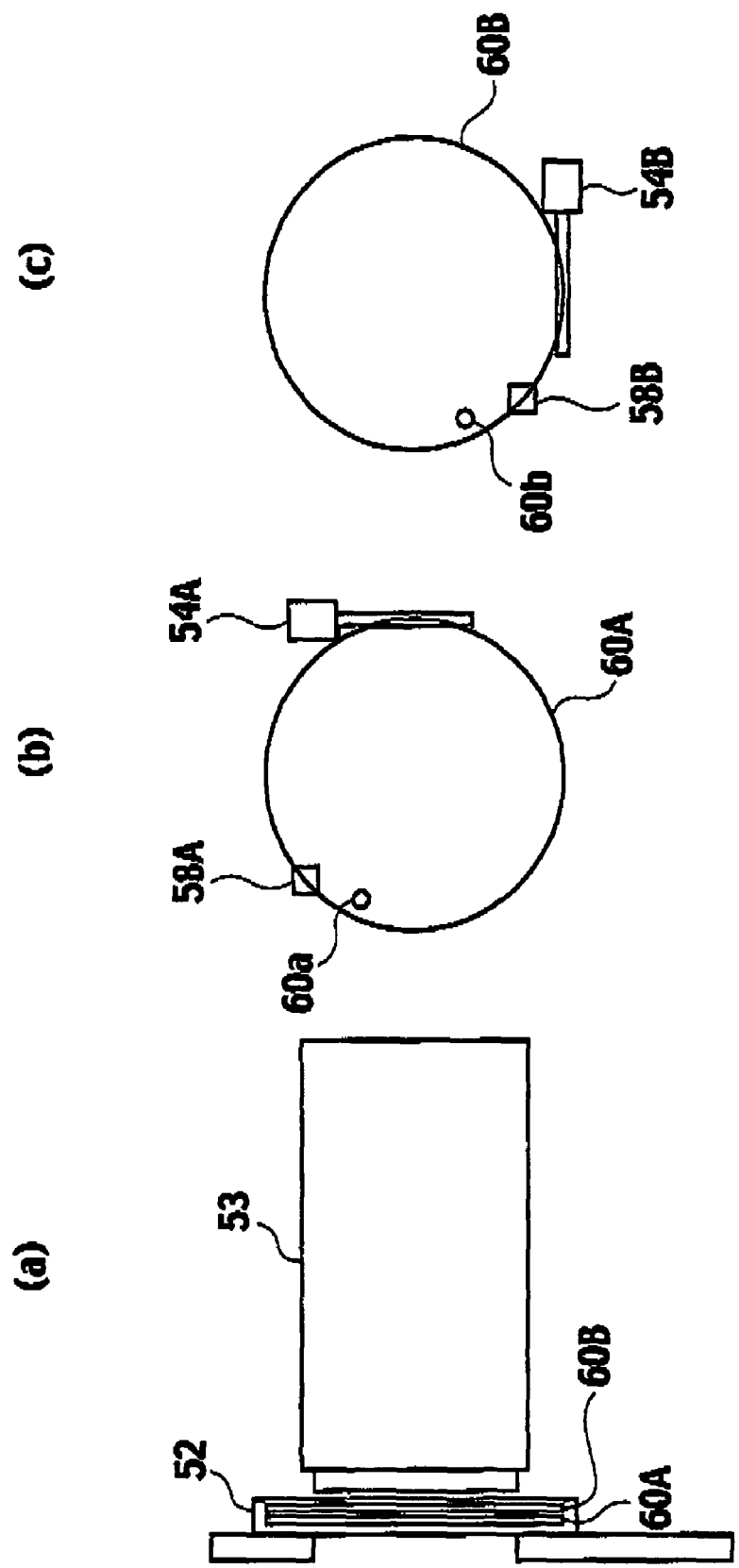

FIG. 29 includes arrangement views of actuators and sensors included in the correction unit 52. FIG. 29(a) is a schematic side view, FIG. 29(b) an arrangement view of an actuator and a sensor of the movable prism 60A, and FIG. 29(c) is an arrangement view of an actuator and a sensor of the movable prism 60B.

The actuators and the sensors are attached to the correction unit 52. As shown in FIGS. 29(b) and 29(c), the actuator 54A and the sensor 58A are provided for the movable prism 60A, while the actuator 54B and the sensor 58B are provided for the movable prism 60B.

The actuators 54A, 54B rotate the movable prisms 60A, 60B in response to the control signals from the rotation control unit 56A of the CPU 56. The actuators 54A, 54B are formed by any ones of compact pulse motors, compact linear motors, compact ultrasonic motors, etc. all of which have small load torques in common.

The sensors 58A, 58B are formed by e.g. compact photo interrupters, MR elements, hall elements or the like. In operation, the sensors 58A, 58B detect the rotating conditions of the movable prisms 60A, 60B and output the information about the rotating conditions to the rotation control unit 56A of the CPU 56.

If adopting the compact photo interrupters for the sensors 58A, 58B, they would be used in combination with pulse motors. The movable prisms 60A, 60B are covered, on their circumferences, with masking materials on which holes 60a, 60b are formed respectively. The holes 60a, 60b are positioned in a manner that when the movable prisms 60A, 60B are brought into their initial positions, the holes accord with the sensors 58A, 58B respectively.

The compact photo interrupter includes an infrared-emitting diode and a photo transistor. The photo interrupter is arranged so as to interpose the movable prism 60A or 60B between the infrared-emitting diode and the photo transistor.

When the device is powered ON, the movable prisms 60A, 60B are rotated. Then, the compact photo interrupters detect the prisms' original positions since the photo transistors receive lights of the infrared-emitting diodes passing through the holes 60a, 60b. The information about each of the movable prisms 60A, 60B in rotation could be obtained by counting the number of pulses during rotating of the prisms upon setting the number of pluses to zero at the original position.

Alternatively, if adopting MR elements or hall elements for the sensors 58A, 58B, magnetic bodies in place of the holes 60a, 60b are attached to the movable prisms 60A, 60B, respectively.

In this case, the information about the movable prisms 60A, 60B in rotation could be obtained since the MR elements or the hall elements detect respective changes in magnetic field due to the magnetic bodies rotating together with the movable prisms 60A, 60B.

In the image fluctuation correction device of this embodiment, the image fluctuation due to hand shake is corrected by rotating the movable prisms 60A, 60B so as to cancel the shake detected by the hand shake detection unit 55. Subsequently, the image shift due to chromatic aberration is corrected by detecting the rotation angles of the movable prisms 60A, 60B.

Therefore, we first describe the process of band shake correction below. The process of chromatic aberration correction will be described thereafter.

(Hand Shake Correction)

Repeatedly, according to the image fluctuation correction device of this embodiment, the image fluctuation due to hand shake is corrected by rotating the movable prisms 60A, 60B so as to cancel the shake detected by the hand shake detection unit 55.

FIG. 30 includes views explaining the movement of a subject image by a prism. FIG. 30(a) is a view explaining refraction of light by the prism, while FIG. 30(b) is a view of the prism of FIG. 30(a) viewed in its front direction (arrow a). In FIG. 30(b), the prism 61 of FIG. 30(a) is rotated by an angle .alpha. As shown in FIGS. 30(a) and 30(b), incident light is refracted by the prism 61 at a refraction angle i', so that an image of a subject A is shifted (of parallel translation) to a subject A'.

In FIGS. 30(a) and 30(b), "i" designates a prism angle (incident angle of light) of the prism 11, "L" a prism length, "δ" a prism height, "$δ_1$" a prism height at the thinnest part, "N" a refraction index, "i'" a refraction angle of light, "θ" an image shift angle (deflection angle), "α" a rotation angle of the prism, "$L_α$" a rotation amount of the prism, "$_{vector}e$" a unit vector in the direction of image shifting direction, and "$_{vector}θ$" designates an image shift vector. Note, assume, suffix "$_{vector}$" represents a vector quantity. In FIGS. 30 to 35, these vector quantities are represented by bold faces in place of suffix "vector".

Here, the following relationship is established:

$$_{vector}θ = θ\,_{vector}e. \tag{32}$$

FIG. 30(a) shows that, among the prism angle (incident angle) i, the refraction angle i' and the image shift angle (deflection angle) θ, there is established:

$$θ = i' - i. \tag{33}$$

In addition, Snell's law leads to $$\sin i' = N \sin i. \tag{34}$$

Assuming now that the prism angle i is small, the equation (33) can be approximated as $$i' = N i. \tag{35}$$

Therefore, substituting the equation (35) into the equation (33) gives $$θ = (N-1)i. \tag{36}$$

Further, between the prism rotation length "$L_α$" and the prism rotation angle "α", there is established:

$$L_α = (L/2)α, \tag{37}$$

that is, $$α = (2/L)L_{60}. \tag{38}$$

Furthermore, the following relationship is established as well:

$$δ = L \tan i + δ_1, \tag{39}$$

that is, $$L = (δ - δ_1)/\tan i. \tag{40}$$

Figure 31:
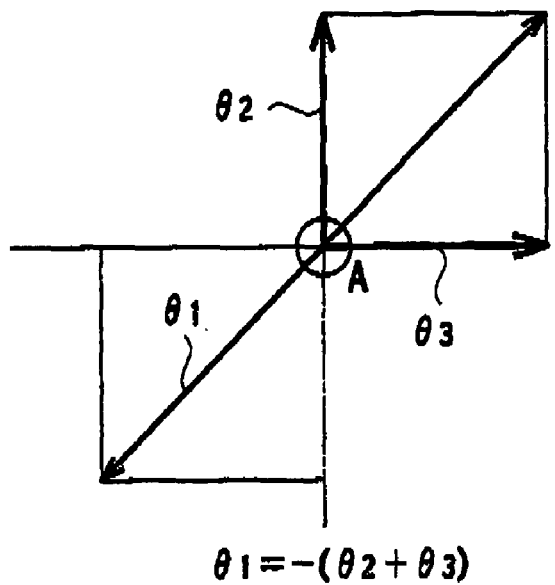
FIG. 31 is a view showing image shift vectors when movable prisms do not rotate.

FIG. 31 is a view showing respective image shift vectors under condition that the movable prisms 60A, 60B in the correction unit 52 do not rotate (in the initial state).

In FIG. 31, $_{vector}θ_1$, $_{vector}θ_2$ and $_{vector}θ_3$ denote respective image shift vectors by the fixed prism 59, the movable vectors 60A and 60B, respectively. As shown in FIG. 31, the positions of the fixed prism 59 and the movable prisms 60A, 60B are established so that $_{vector}θ_1$ cancels a synthetic vector of $_{vector}θ_2$ and $_{vector}θ_3$. Consequently, as the fixed prism 59 and the movable prisms 60A, 60B in three sheets become equivalent to a parallel flat plate, the incident angle on the correction unit 52 becomes equal to an emitting angle, so that a subject image does not move.

Figure 32:
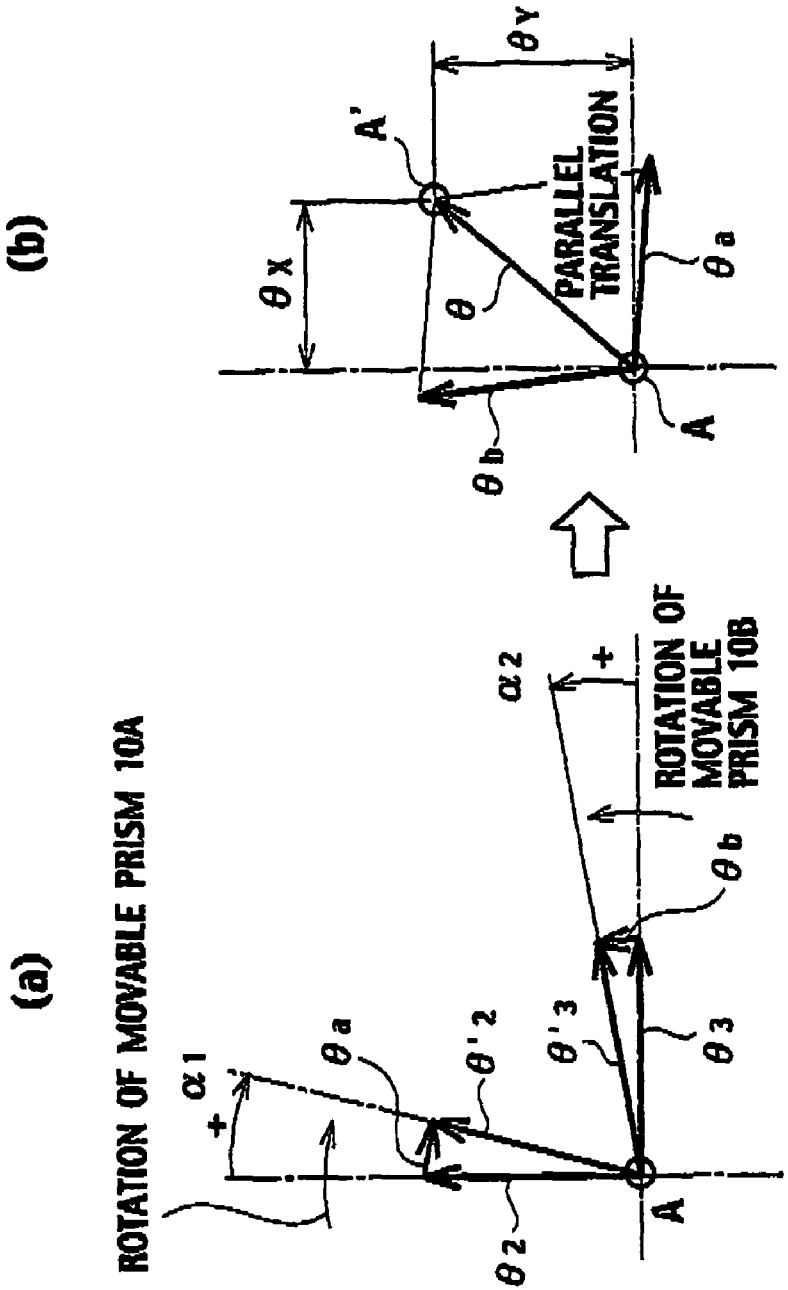

FIG. 32 includes views explaining the movements of the subject image in case that the movable prisms 60A, 60B rotate. FIG. 32(a) is a view showing the image shift vectors when the movable prisms rotate, while FIG. 32(b) is a view showing displacements of the image shift vectors of FIG. 32(a).

Assume in FIG. 32(a), $_{vector}\theta_2'$ and $_{vector}\theta_3'$ represent image shift vectors when the movable prisms 60A, 60B rotate by angles $\alpha_1$ and $\alpha_2$, respectively. Here, it is assumed that rotating directions shown in FIG. 32(a) are positive (+) directions of angles $\alpha_1$ and $\alpha_2$, respectively.

Further, it is assumed that the following relationships are established $$_{vector}\theta_a = {_{vector}\theta_2'} - {_{vector}\theta_2}, \quad (41)$$

$$_{vector}\theta_b = {_{vector}\theta_3'} - {_{vector}\theta_3}. \quad (42)$$

Consequently, as shown in FIG. 32(b), the image of the subject A move to A' in translation. Then, as a synthetic vector of $_{vector}\theta_a$ and $_{vector}\theta_b$, the image shift vector is described as $$_{vector}\theta = {_{vector}\theta_a} + {_{vector}\theta_b} = (\theta_X, \theta_Y). \quad (43)$$

Then, FIGS. 32(a) and 32(b) shows that the following relationships are established:

$$\theta_X = \theta_2 \sin \alpha_1 - \theta_3(1 - \cos \alpha_2), \quad (44)$$

$$\theta_Y = \theta_3 \sin \alpha_2 - \theta_2(1 - \cos \alpha_1). \quad (45)$$

Here, $\theta_2$ denotes a scalar of $_{vector}\theta_2$, while $\theta_3$ denotes a scalar of $_{vector}\theta_3$.

We here consider a vector having components $\alpha_1$ and $\alpha_2$, that is, $_{vector}\alpha = (\alpha_1, \alpha_2)$. Resolving the equations (44) and (45) with respect to $\alpha_1$, $\alpha_2$ gives $$\alpha_1 = \pm \cos^{-1}(C/D) + \alpha_1^*, \quad (46)$$

$$\alpha_2 = \pm \cos^{-1}\{[(\theta_X + \theta_3) - \theta_2 \sin \alpha_1]/\theta_3\}, \quad (47)$$

where $$C = [A^2 + B^2 + \theta_2^2 - \theta_3^2]/2\theta_2, \quad (48)$$

$$D = (A^2 + B^2)^{1/2}, \quad (49)$$

$$\alpha_1^* = \pm \cos^{-1}(A/D), \text{ (selecting sign of } B\text{)} \quad (50)$$

$$A = (\theta_Y + \theta_2), \text{ and} \quad (51)$$

$$B = (\theta_X + \theta_3). \quad (52)$$

Here, if the sign of $\alpha_1$ is minus (−), the sign of $\theta_Y$ is selected as the sign of $\alpha_2$. While, if the sign of $\alpha_1$ is plus (+), the sign of plus (+) is selected as the sign of $\alpha_2$.

FIG. 33 includes views showing parallel translating forms of a subject image (subject). FIG. 33(a) is a view of the subject image moved to a second quadrant, FIG. 33(b) a view of the subject image moved to a first quadrant, FIG. 33(c) a view of the subject image moved to a third quadrant, and FIG. 33(d) is a view of the subject image moved to a fourth quadrant.

When the subject image moves into the first quadrant, as shown in FIG. 33(b), the inequalities $\alpha_1 > 0$ and $\alpha_2 > 0$ are established because $\theta_X > 0$ and $\theta_Y > 0$. Further, when the subject image moves into the second quadrant, as shown in FIG. 33(a), the inequalities $\alpha_1 < 0$ and $\alpha_2 > 0$ are established because $\theta_X < 0$ and $\theta_Y > 0$. Still further, when the subject image moves into the third quadrant, as shown in FIG. 33(c), the inequalities $\alpha_1 < 0$ and $\alpha_2 < 0$ are established because $\theta_X < 0$ and $\theta_Y < 0$. Again, when the subject image moves into the fourth quadrant, as shown in FIG. 33(d), the inequalities $\alpha_1 > 0$ and $\alpha_2 < 0$ are established because $\theta_X > 0$ and $\theta_Y < 0$.

FIG. 34 includes views explaining a equivalent focal distance and a shift amount. FIG. 34(a) is a view explaining the equivalent focal distance, while FIG. 34(b) is a view explaining the shift amount.

In FIG. 34(a), "$S_F$" designates a distance between the subject A and a first principal point, and "f" designates a focal length of the lens system 53. Then, the equivalent focal distance $f_m$ is identical to a distance between a second principal point of the lens system 53 and a CCD unit 63 for imaging a subject image 64A, and is represented by $$f_m = f + S_B \quad (53)$$

where $$S_B = f^2/S_F. \quad (54)$$

Next, as shown in FIG. 34(b), it is supposed that the correction unit 52 is inserted so that the subject image 64A is displaced to a subject image 64A' with an image shift angle θ. Then, a shift amount S is expressed by $$S = f_m \tan \theta. \quad (55)$$

FIG. 35 includes views explaining the hand shake correction. FIG. 35(a) is a view explaining the movement of a subject image due to hand shake, while FIG. 35(b) is a view explaining the hand shake correction against the movement of the subject image due to hand shake.

As shown in FIG. 35(a), if the lens system 53 is rotated upwardly in relation to a main body, such as video camera (i.e. rotation in the clockwise direction of FIG. 35), then the subject A is rotated relatively downwardly (i.e. rotation in the counter-clockwise direction of FIG. 35). As a result, the subject image 64A is shifted to the subject image 64A' running off the CCD unit 63. Supposing a shake angle as "θ*" and a unit vector in the direction of hand shake as "$_{vector}e^*$" ($= -_{vector}e$), the hand shake angle "$_{vector}\theta^*$" is represented by $$_{vector}\theta^* = \theta^* {_{vector}e^*}. \quad (56)$$

FIG. 35(b) shows a situation in which the correction unit 52 is inserted in front of the lens system 53. Then, if the image shift vector θ and the shake-angle vector θ* by the correction unit 52 satisfy with the following hand shake correcting condition:

$$_{vector}\theta = -_{vector}\theta^*. \quad (57)$$

the subject image 14A' is moved to the position of the subject image 14A, effecting the hand shake correction.

Next, the operation of the image fluctuation correction device of this embodiment will be described.

The sensors 8A, 8B detect the rotation of the movable prisms 10A, 10B and output the information about rotation to the controller 6.

The hand shake detection unit 55 detects a fluctuation of the video camera 51 due to hand shake and outputs the detected fluctuation in the form of a hand shake signal to the rotation control unit 56A of the CPU 56. On receipt of the hand shake signal, the rotation control unit 56A of the CPU 56 calculates a hand shake angle vector θ*, representing a magnitude of the fluctuation and its direction, by $$_{vector}\theta^* = (\theta_X^*, \theta_Y^*). \quad (58)$$

Here, using the equation (57) leads to $$(\theta_X, \theta_Y) = (-\theta_X^*, -\theta_Y^*). \quad (59)$$

Then, the rotation control unit 56A of the CPU 56 calculates vector $_{vector}\alpha$ based on the equations (46) to (52) and outputs control signals to the motor drive electronic circuit 57 so that the rotating angles of the movable prisms 60A, 60B become $\alpha_1$, $\alpha_2$ respectively.

The motor drive electronic circuit 57 drives the actuators 54A, 54B in response to the control signals from the rotation control unit 56A of the CPU 56, while the actuators 54A, 54B rotate the movable prisms 60A, 60B so that their rotating angles become $\alpha_1$, $\alpha_2$ respectively.

In this way, the image fluctuation correction device of this embodiment corrects the image fluctuation due to hand shake by rotating the movable prisms 60A, 60B so as to cancel the fluctuation detected by the hand shake detection unit 55.

(Correction of Image Shift by Chromatic Aberration)

Next, the process of correcting an image shift of the subject image upon the above hand shake correction due to the image's chromatic aberration will be described below.

In the above way, the image fluctuation due to hand shake can be corrected by rotating the movable prisms 10A, 10B. However, as the image fluctuation correction is carried out by utilizing the optical refractive indexes of the prisms, the subject image is accompanied with chromatic aberration due to different optical refractive indexes every optical wavelengths.

Figure 36:
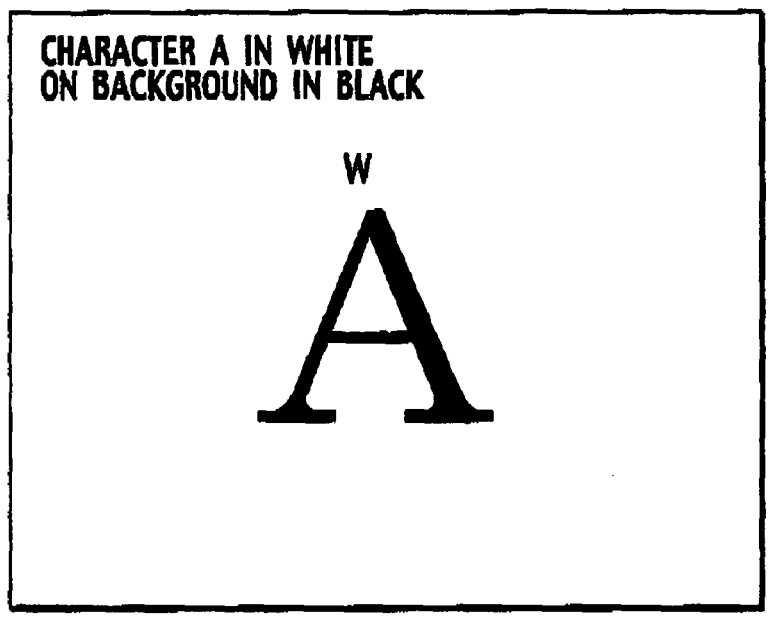
FIG. 36 is a view showing an image by an image senor imaging a character "A" in white on a black background in an arrangement where the prism is not on the optical axis.
Figure 37:
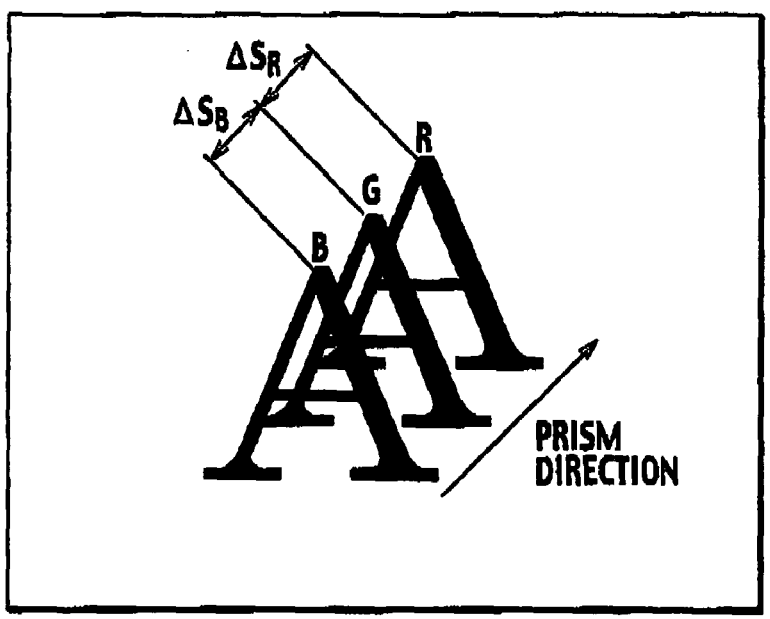
FIG. 37 is a view showing an image by the image senor imaging the character "A" in white on the black background in an arrangement where the prism is on the optical axis.

In the arrangement where the prisms are not positioned on the optical axis, FIG. 36 shows an image obtained by an image sensor having respective color filters of RGB and also imaging a character "A" in white on black background without passing through the prisms. While, in the arrangement where the prisms are positioned on the optical axis, FIG. 37 shows an image obtained by the image sensor imaging the character "A" in white on black background through the prisms. Note, these figures are illustrated while being inversed in monochrome.

In FIG. 36, the image "A" is colored in white so as to be visible clearly. On the contrary, in FIG. 37, three kinds of images of RGB are misaligned to each other because the lights are refracted by the prism with different refractive indexes by respective wavelengths of the lights. This is nothing other than an image shift due to chromatic aberration.

In this way, the chromatic aberration due to the provision of the prisms is not generated about the optical axis as the center in the radial direction but in one direction. Thus, it becomes possible to correct the image shift due to chromatic aberration in non-optical manner.

Therefore, the image fluctuation device of this embodiment is adapted so as to correct the image shift due to chromatic aberration by performing a non-optical correction process as follows.

In detail, the image fluctuation device separates an image upon the image fluctuation correction with respect to each color and calculates respective image shift amounts in the position coordinate of respective color-separated images due to chromatic aberration by rotation angles $\alpha_{10}$, $\alpha_{20}$ of the movable prisms 60A, 60B detected by the sensors 58A, 58B. Then, the image fluctuation device corrects the image shift so as to cancel the calculated image shift amount Next, we described the image fluctuation device of this embodiment of FIG. 25, especially, its device part having charge of correcting the image shift due to chromatic aberration.

As shown in FIG. 25, the subject image upon the above hand shake correction is imaged on a photoelectronic face (not shown) of the CCD unit 63 by the lens system 53. The CCD unit 63 has a filter (not shown) arranged in front of the photoelectronic face on which the subject image is converted to electric signals.

The so-converted electric signals of the subject image are transmitted to the pre-processing IC unit 69. The pre-processing IC unit 69 includes CDS, AGC and A/D conversion functions. The unit 69 operates to remove noise of signals due to the CDS function, amplifies the signals due to the AGC function and perform an A/D conversion due to the A/D conversion function.

In the camera DSP unit 70, the RGB separation unit 70A separates the signals of the subject image outputted from the pre-processing IC unit 69 into R (red), G (green) and B (blue) in color separation. Then, the chromatic aberration correction unit 70B of the camera DSP unit 70 applies the image shift correction due to chromatic aberration on the signals color-separated in RGB colors, based on the image shift amounts calculated by the image shift amount calculation unit 56B.

Next, the correction process of image shift due to chromatic aberration will be described below.

Figure 38:
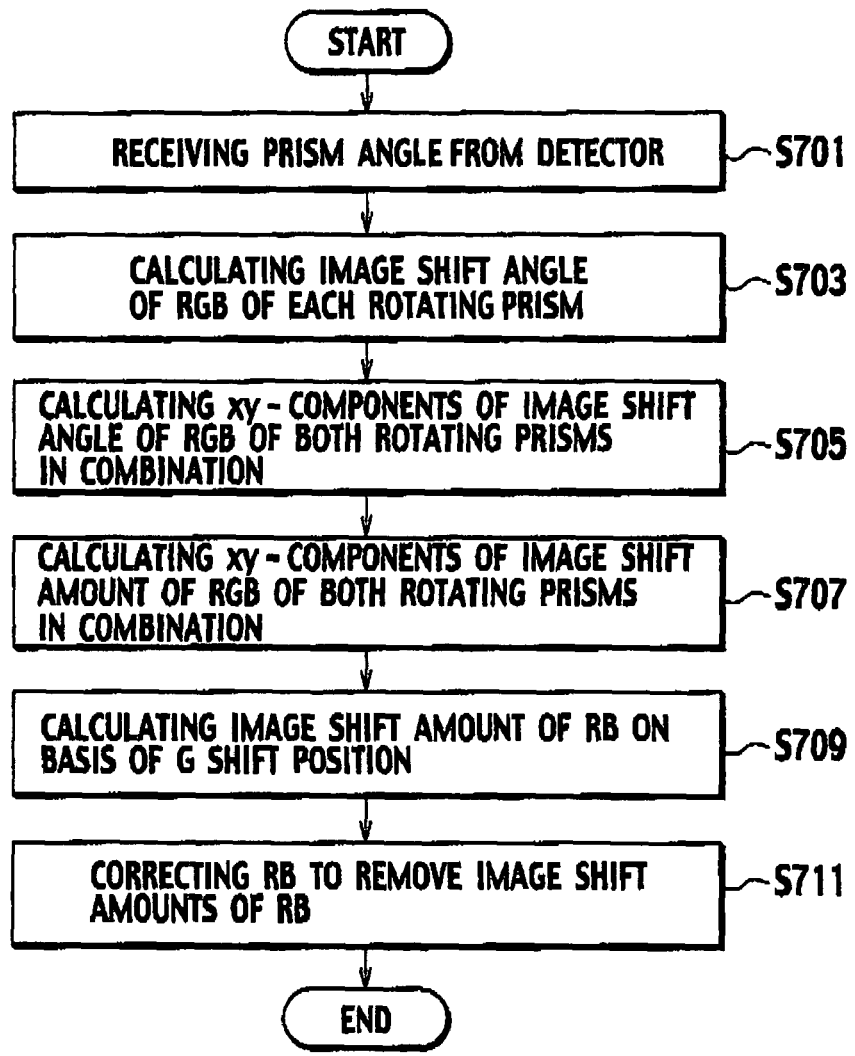
FIG. 38 is a view showing a processing flow of correcting an image shift due to chromatic aberration in the image fluctuation correction device of the embodiment.

FIG. 38 shows a process flow of correcting the image shift due to chromatic aberration in the image fluctuation device of this embodiment.

First of all, the image shift amount calculation unit 56B of the CPU 56 receives the rotation angles $\alpha_{10}$, $\alpha_{20}$ of the movable prisms 60A, 60B detected by the sensors 58A, 58B and calculates the rotation angles by a table, calculation or the like (step S701).

Next, the image shift amount calculation unit 56B of the CPU 56 calculates the image shift angles $\theta_{aR}$, $\theta_{aG}$ and $\theta_{aB}$ for respective outputs R, B of the movable prism 60A by the following equations (step S703):

$$\theta_{aR} = -(1 - N_{aR})i_a, \quad (60)$$

$$\theta_{aG} = -(1 - N_{aG})i_a, \quad (61)$$

$$\theta_{aB} = -(1 - N_{aB})i_a, \quad (62)$$

Here, $N_{aR}$, $N_{aG}$ and $N_{aB}$ denote refractive indexes of the movable prism 60A with respect to each of R, G and B outputs respectively and $i_a$ denotes an apical angle of the prism 60A.

Similarly, if representing refractive indexes of the movable prism 60B with respect to each of R, G and B outputs and an apical angle of the prism 60B by $N_{bR}$, $N_{bG}$, $N_{bB}$ and $i_b$ respectively, then the image shift angles $\theta_{bR}$, $\theta_{bG}$ and $\theta_{bB}$ for respective outputs R, G, B of the movable prism 60B are calculated by the following equations:

$$\theta_{bR} = -(1 - N_{bR})i_b, \quad (63)$$

$$\theta_{bG} = -(1 - N_{bG})i_b, \quad (64)$$

$$\theta_{bB} = -(1 - N_{bB})i_b. \quad (65)$$

Next, from the rotation angles $\alpha_{10}$, $\alpha_{20}$ of the movable prisms 60A, 60B received at step S701 and the image shift angle of the output R calculated at step S703, the image shift amount calculation unit 56B of the CPU 56 calculates x, y-components $(\theta_{xR}, \theta_{yR})$ of the image shift angle of the output R as the composite prism composed of the movable prisms 60A, 60B, by the following equations (step S705):

$$\theta_{xR} = \theta_{aR} \sin \alpha_{10} - (1 - \cos \alpha_{20})\theta_{bR}, \quad (66)$$

$$\theta_{yR} = \theta_{bR} \sin \alpha_{20} - (1 - \cos \alpha_{10})\theta_{aR}. \quad (67)$$

Similarly, respective x, y-components $(\theta_{xG}, \theta_{yG})$, $(\theta_{xB}, \theta_{yB})$ of the image shift angles of the outputs G, B are also calculated with the use of equations (66), (67).

Next, the image shift amount calculation unit 56B of the CPU 56 calculates x, y-components $(S_{xR}, S_{yR})$ of the image shift amount from the x, y-components $(\theta_{xR}, \theta_{yR})$ of the image shift angle of the output R calculated at step 705, by the following equations (step S707):

$$S_{xR} = f_m \tan \theta_{xR}, \quad (68)$$

$$S_{yR} = f_m \tan \theta_{yR}. \quad (69)$$

Similarly respective x, y-components ($S_{xG}$, $S_{yG}$), ($S_{xB}$, $S_{yB}$) of the image shift amounts of the outputs G, B are also calculated with the use of equations (68), (69).

Hereat, in the image fluctuation device of this embodiment, it is executed to correct the outputs R, B to the position of the output G as a relative standard.

For this purpose, the image shift amount calculation unit 56B of the CPU 56 calculates the degree of image shift amounts of the outputs R, B on the basis of the image shift amount of the output G from the x, y-components of the image shift amounts calculated at step S707, by the following equations (step S709):

$$\Delta S_R = (S_{xR} - S_{xG}, S_{yR} - S_{yG}), \quad (70)$$

$$\Delta S_B = (S_{xB} - S_{xG}, S_{yB} - S_{yG}). \quad (71)$$

Next, the chromatic aberration correction unit 70B corrects the color-separation images so as to remove the shift image amounts $\Delta S_R$, $\Delta S_B$ calculated at step S709. In detail, assuming that the components of the image shift amount $\Delta S_R$ about the output R are expressed by ($\Delta S_{xR}$, $\Delta S_{yR}$), the correction is accomplished by newly overwriting values as a result of subtracting the components ($\Delta S_{xR}$, $\Delta S_{yR}$) from the position coordinate ($S_{xR}$, $S_{yR}$) of the output R before the chromatic aberration correction. That is, assuming that the position coordinates of the outputs R, B after correction are expressed by (new$S_{xR}$, new$S_{yR}$), (new$S_{xB}$, new$S_{yB}$) respectively, these coordinates are represented as follows:

$$(\text{new}S_{xR}, \text{new}S_{yR}) = (S_{xR} - \Delta S_{xR}, S_{yR} - \Delta S_{yR}), \quad (72)$$

$$(\text{new}S_{xB}, \text{new}S_{yB}) = (S_{xB} - \Delta S_{xB}, S_{yB} - \Delta S_{yB}). \quad (73)$$

Consequently, the chromatic aberration correction unit 70B can correct the image shift due to chromatic aberration by determining the position coordinates of the outputs R, B and further correcting the positions of respective images of R, B relatively, so that a user can confirm the taken image more clearly and visually.

The position correction is accomplished by first storing the images in a first memory in the DSP unit 70 and continuously applying the correction on a second memory. Alternatively, the correction may be performed by delaying respective signals of R, G and B.

Variation of Embodiment (Variation 1)

In the image fluctuation correction device of this embodiment, the correction is accomplished by calculating the image shift amounts of the RGB output images due to chromatic aberration and further removing the image shift with respect to each image sensor in real time. On the contrary, for simplification of circuits, the variation 1 is characterized by performing the image shift correction due to chromatic aberration with respect to each screen.

For instance, as the rotation angles $\alpha_{10}$, $\alpha_{20}$ of the movable prisms 60A, 60B change with time, the image shift correction due to chromatic aberration with respect to each screen is carried out at regular time intervals. Then, mean values within the regular time are adopted as the rotation angles $\alpha_{10}$, $\alpha_{20}$ of the movable prisms 60A, 60B.

As a result, for instance, if the cycle of hand shake is 8 Hz and the screen frequency is 60 Hz, it is possible to realize sufficient correction effect with small error for the image shift correction due to chromatic aberration since the screen frequency is sufficiently larger than the cycle of hand shake.

(Variation 2)

In the image fluctuation correction device of this embodiment, the correction is accomplished by calculating the image shift amounts $\Delta S_R$, $\Delta S_B$ in the position coordinate of the RGB output images due to chromatic aberration from the rotation angles $\alpha_{10}$, $\alpha_{20}$ of the movable prisms 60A, 60B and further removing the calculated image shift amounts. However, in actual, there is a case of causing a difference between the calculated image shift amounts and actual image shift amounts due to device error etc.

Therefore, in the variation 2, the image shift amounts are determined in consideration of such device error etc.

In detail, assuming $\Delta S_{Rk}$, $\Delta S_{Bk}$ represents image shift amounts in consideration of error, there are established error correction coefficients $K_R$, $K_B$ absorbing differences between the above image shift amounts in consideration of error and the image shift amounts $\Delta S_R$, $\Delta S_B$ on calculation. These error correction coefficients $K_R$, $K_B$ are calculated based on experimental data etc. obtained by a live-shooting test. Then, using the error correction coefficients $K_R$, $K_B$, the image shift amounts $\Delta S_{Rk}$, $\Delta S_{Bk}$ in place of the image shift amounts $\Delta S_R$, $\Delta S_B$ are calculated as follows:

$$\Delta S_{Rk} = K_R \Delta S_R, \quad (74)$$

$$\Delta S_{Bk} = K_B \Delta S_R. \quad (75)$$

The chromatic aberration correction is carried out with the use of the so-calculated new image shift amounts $\Delta S_{Rk}$, $\Delta S_{Bk}$. In addition, by making the error correction coefficients $K_R$, $K_B$ variable, new image shift amounts $\Delta S_{Rk}$, $\Delta S_{Bk}$ may be calculated by the coefficients $K_R$, $K_B$ that a user inputs, accomplishing the chromatic aberration correction.

(Variation 3)

Figure 39:
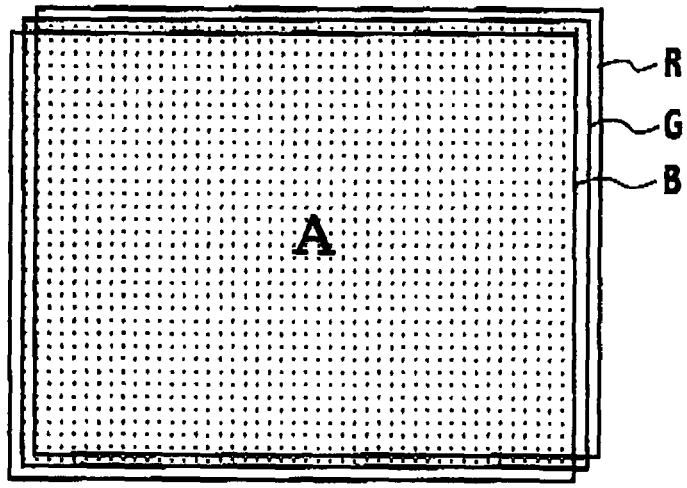
FIG. 39 is a view showing one example of RGB output images when the image shift is caused by the chromatic aberration.

As the image fluctuation correction device of this embodiment is adapted so as to calculate the image shift amounts in the position coordinate of the RGB output images due to chromatic aberration from the rotation angles $\alpha_{10}$, $\alpha_{20}$ of the movable prisms 60A, 60B and further remove the calculated image shift amounts, there is produced an area where only part of the RGB outputs is outputted in the circumference of a screen, as shown in FIG. 39.

Therefore, the chromatic aberration correction unit 70B of the camera DSP unit 70 cuts out a common area where all of the RGB outputs are outputted. Then, if the so-cut common area image is not so large as an image size required for screen outputting, then the common area image is enlarged to the required image size while deleting data corresponding to the other area except the common area.

In addition to the above cutout operation of the common area where all of the RGB outputs are outputted, alternatively, the chromatic aberration correction unit 70B of the camera DSP unit 70 may generate a black-and-white screen from at least one output of the RGB outputs for the other area and further complement the screen part in the circumference of the common area by the so-generated black-and-white screen.

In common with these methods mentioned above, owing to smallness in the correction amount, it would be advantageous if the dimension of the common area image exceeds the size of an output screen to be displayed.

(Variation 4)

It is note that the image fluctuation correction device of this embodiment is taking a single plate construction having a single CCD receptor, such as the CCD unit 63 of FIG. 25, as an example. Therefore, in the camera DSP unit 70, the RGB separation unit 70 is required to color-separate the signals of the subject image from the pre-processing IC unit 69 into the RGB output signals.

Accordingly, the variation 4 is directed to a three-plate construction for color separation with exclusive CCD units for R, G and B.

Figure 40:
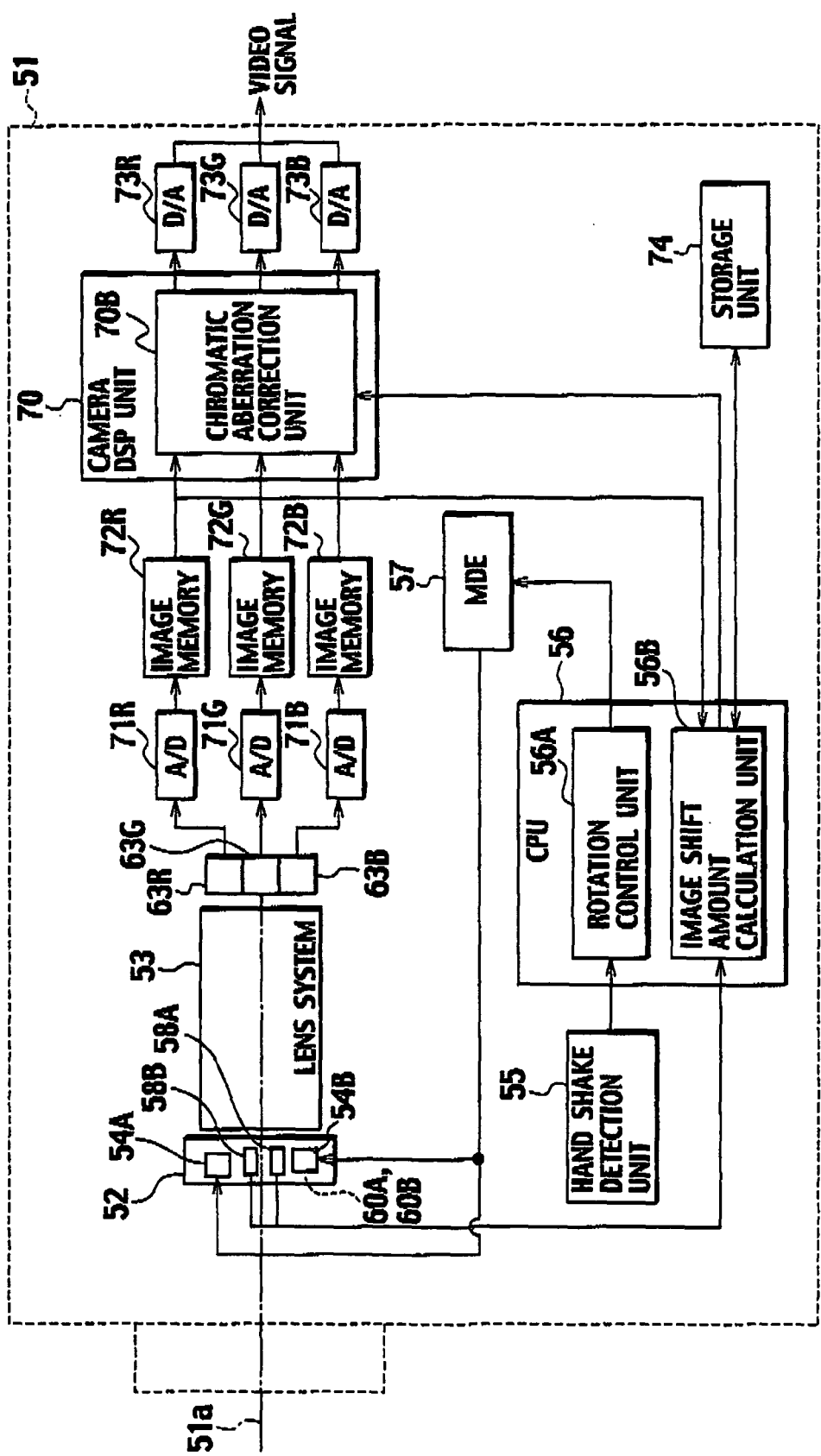
FIG. 40 is a view showing a three-plate type image fluctuation correction device in accordance with an embodiment of the present invention.

FIG. 40 is a block diagram showing the variation 4 adopting such a three-plate type device In the three-plate type image fluctuation correction device of FIG. 40, the lens system 53 separates the subject image to three light beams of R, G and B there to form images on photoelectric conversion faces of respective CCD units 63R, 63G, 63B. In front of the photoelectric faces, there are R, G and B color filters (not shown) to prevent an incidence of light beams of the other colors. Then, so-formed subject images of R, G and B are converted to electrical signals on the photoelectric faces of the CCD units 63R, 63G and 63B. Further, the converted electrical signals are transmitted to the chromatic aberration correction unit 70B of the camera DSP unit 70 through A/D conversion units 71R, 71G and 71B and sequent image memories 72R, 72G and 72B.

The chromatic aberration correction unit 70B of the camera DSP unit 70 carries out the correction of image shift due to chromatic aberration based on the image shift amounts calculated by the image shift amount calculation unit 56B of the CPU 56.

There are a case of producing luminance signals from the R, G and B outputs upon the chromatic aberration correction by the color-separation method and another case of producing luminance signals independently of the R, G and B outputs.

When producing the luminance signals independently of the R, G and B outputs, by correcting the chromatic aberration of the R, G and B outputs and thereafter Adding the information about these R, G and B outputs upon the chromatic aberration to the luminance signals, it is possible to improve the resolution of the device.

For instance, after producing luminance signals from the R, G and B outputs upon the chromatic aberration correction, these luminance signals may be combined with original luminance signals at a constant rate.

(Variation 5)

In the image fluctuation correction device of this embodiment, the image data of an image after the image fluctuation correction is separated with respect to each color and further, the correction is accomplished by calculating the image shift amounts in the position coordinate of the RGB output images due to chromatic aberration from the rotation angles $\alpha_{10}$, $\alpha_{20}$ of the movable prisms 60A, 60B detected by the sensors 58A, 58B and further removing the calculated image shift amounts. While, in the variation 5, the output images are subjected to the correction operation directly.

In detail, the image shift amount calculation unit 56B of the CPU 56 lays R, G, B output images, which have been outputted based on the R, G, B output image data separated by the RGB separation unit 70A, one on top of another. Further, the unit 56B shifts the overlapped R, G, B output images from each other by one pixel horizontally and vertically and totalizes differences of outputs with respect to each pixel. Then, the unit 56B determines the positions of R, G, B output images enabling the total of differences to be minimized. Based on the determined position in this way, the chromatic aberration correction unit 70B performs the image shift correction.

FIG. 41(*a*) shows the address of pixels in arrangement Respective pixels in the form of squares 1 to 5 are arranged in 2-dimensional manner horizontally and vertically. In the figure, (m, n) designates the address of an $n^{th}$. pixel on a line m.

FIG. 41(*b*) shows part of an image having no image shift due to chromatic aberration, in enlargement. FIG. 41(*c*) shows a signal output of this case.

As shown in FIG. 41(*b*), it will be understood that in case of no image shift due to chromatic aberration, the R, G, and B outputs coincide with each other throughout all pixels.

Figure 42:
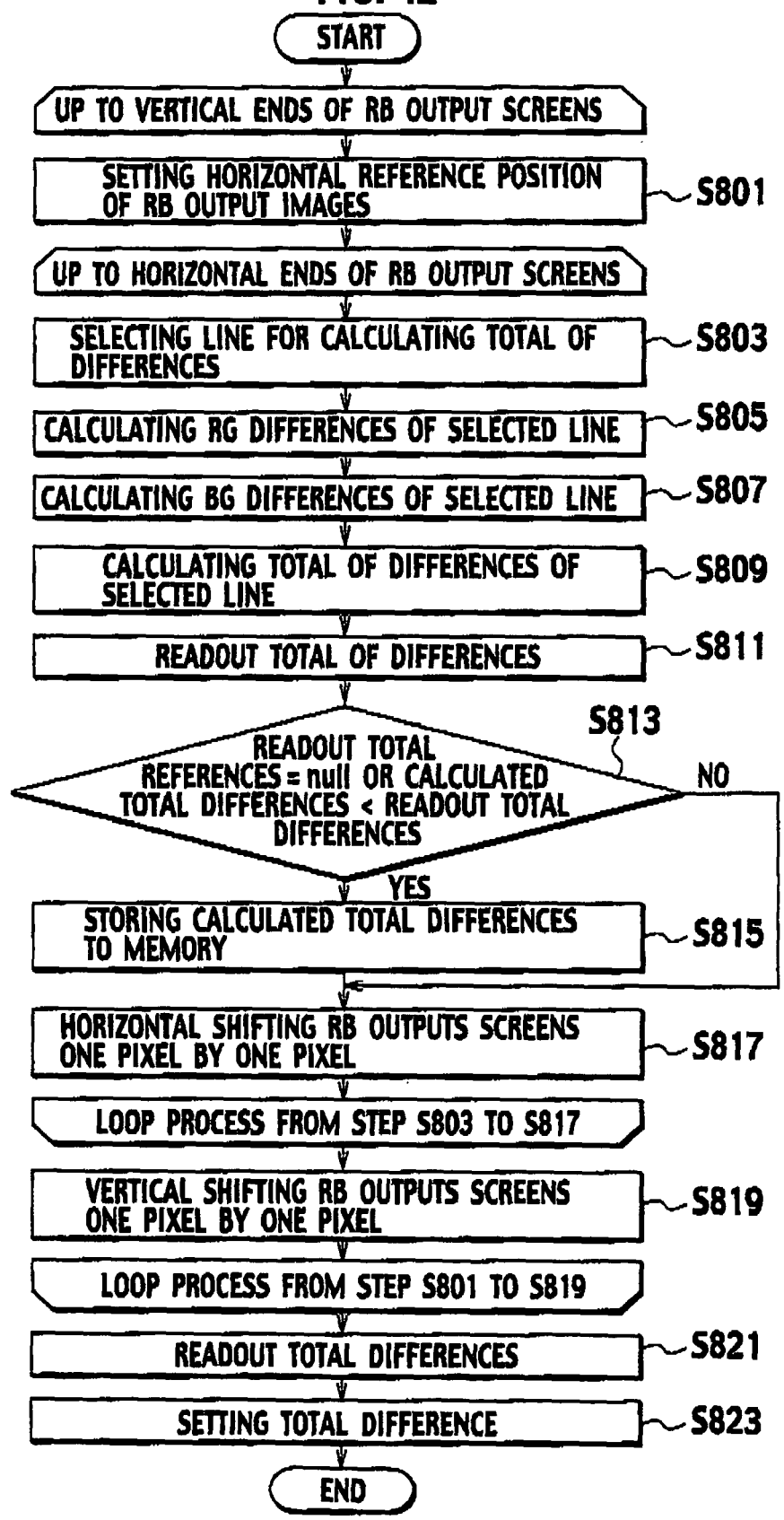
FIG. 42 is a chromatic aberration correction flow chart showing the procedure of correcting chromatic aberration in the image fluctuation correction device of this embodiment.

Next, the procedure of chromatic aberration correction will be described in accordance with a chromatic aberration correction flow of FIG. 42.

First, the image shift amount calculation unit 56B of the CPU 56 sets the positions of R, B output images to their reference positions in order to shift the R, B output images on the basis of the G output image one pixel by one pixel horizontally against the screen and calculate the total of differences (step S801). Here, the reference positions denote respective horizontal positions of the R, B output images before the image shift correction due to chromatic aberration.

It is executed to shift the R, B output images from the horizontal reference positions by one pixel horizontally and further calculate the total of differences up to both ends of the R, B output images. Thus, even when shifting the R, B output images by one pixel vertically (later mentioned), it is possible to calculate all the totals of differences in the horizontal direction at the vertical positions of the output images.

That is, by performing a loop process of calculating the total of differences in the horizontal shifting from step S803 to S817, the loop process being surrounded by a loop process of calculating the total of differences in the vertical shifting from step S801 to S819, it is possible to calculate all of the totals of differences in shifting the R, B output images up to both ends in both vertical and horizontal directions.

Next, the image shift amount calculation unit 56B of the CPU 56 sets up a line to calculate the total of differences (step S803). As the line to be set up, it may be either a fixed line or an elective line that a user can set up optionally.

Next, the image shift amount calculation unit 56B of the CPU 56 calculates the total of differences at step S805 to S809.

This operation will be described based on a concrete example of FIG. 43.

Figure 43:
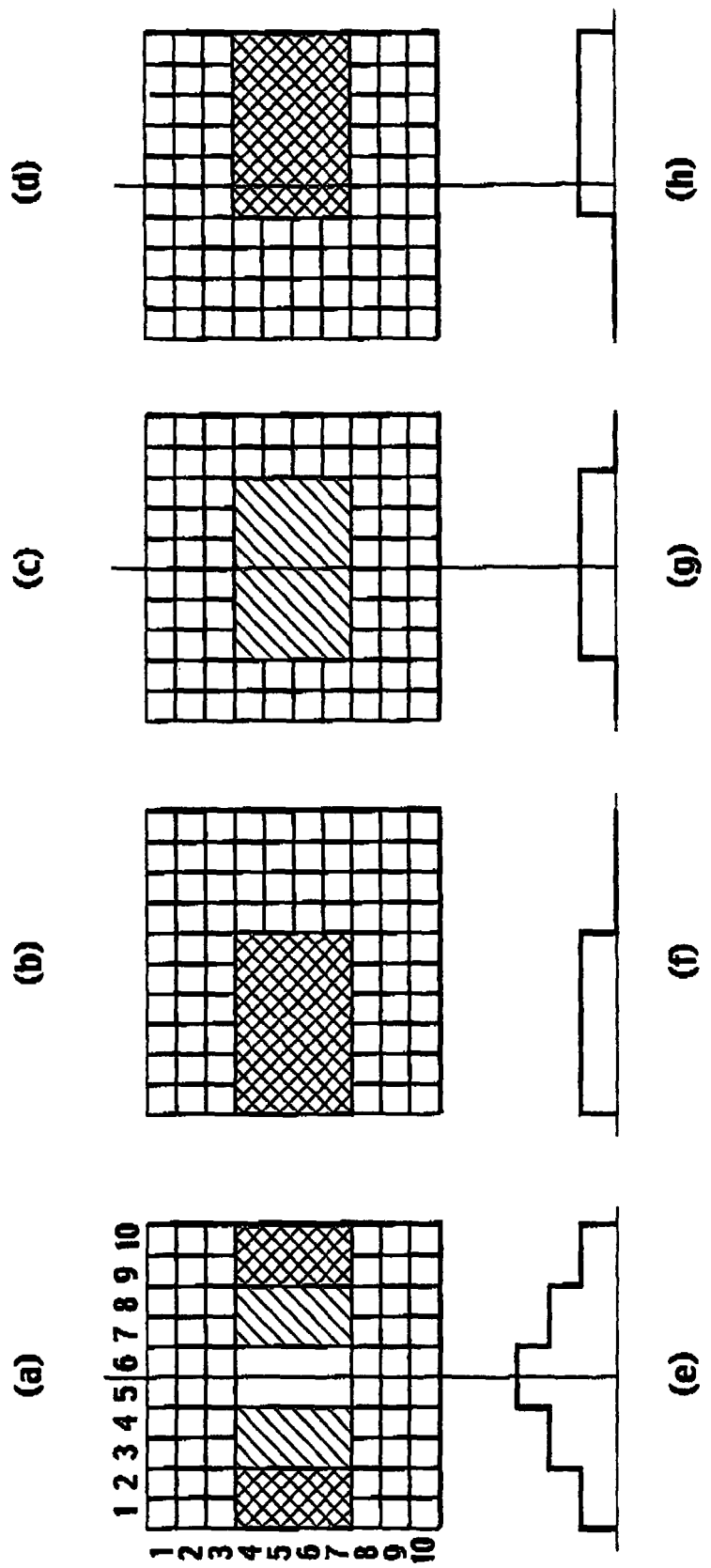
FIG. 43(a) is a view showing an example of enlarged part of a while brachymorphic subject image having an image shift due to chromatic aberration.
FIGS. 43(b) to 43(d) are views showing respective R, G and B output images, as an example.
FIGS. 43(e) to 43(h) are views showing signal outputs corresponding to FIGS. 43(a) to 43(d) respectively, as an example.

FIG. 43(*a*) is a view showing part of a while brachymorphic subject image having an image shift due to chromatic aberration, in enlargement.

FIGS. 43(*b*) to 43(*d*) show respective R, G and B output images. Based on the G output image shown in FIG. 43(*c*), the R output image of FIG. 43(*b*) is shifted to left by two pixels, while the B output image of FIG. 43(*d*) is shifted to right by two pixels.

FIGS. 43(*e*) to 43(*h*) show signal outputs corresponding to FIGS. 43(*a*) to 43(*d*), respectively.

When the image shift due to chromatic aberration occurs in this way, the R, G, B outputs are commonly outputted in only a center area of FIG. 43(*a*) from the coordinate (5, 4) to the coordinate (6, 7). For the other areas, for example, areas from the coordinate (3, 4) to the coordinate (4, 7) have a part of the R, G, B outputs only.

Therefore, the image shift amount calculation unit 56B of the CPU 56 calculates the total of differences equivalent to the number of areas where all the R, G, B outputs are not generated (at steps S805 to S809).

For this purpose, the image shift amount calculation unit 56B of the CPU 56 first calculates a RG difference representing a part where either the R output or the G output is generated (step S805).

Figure 44:
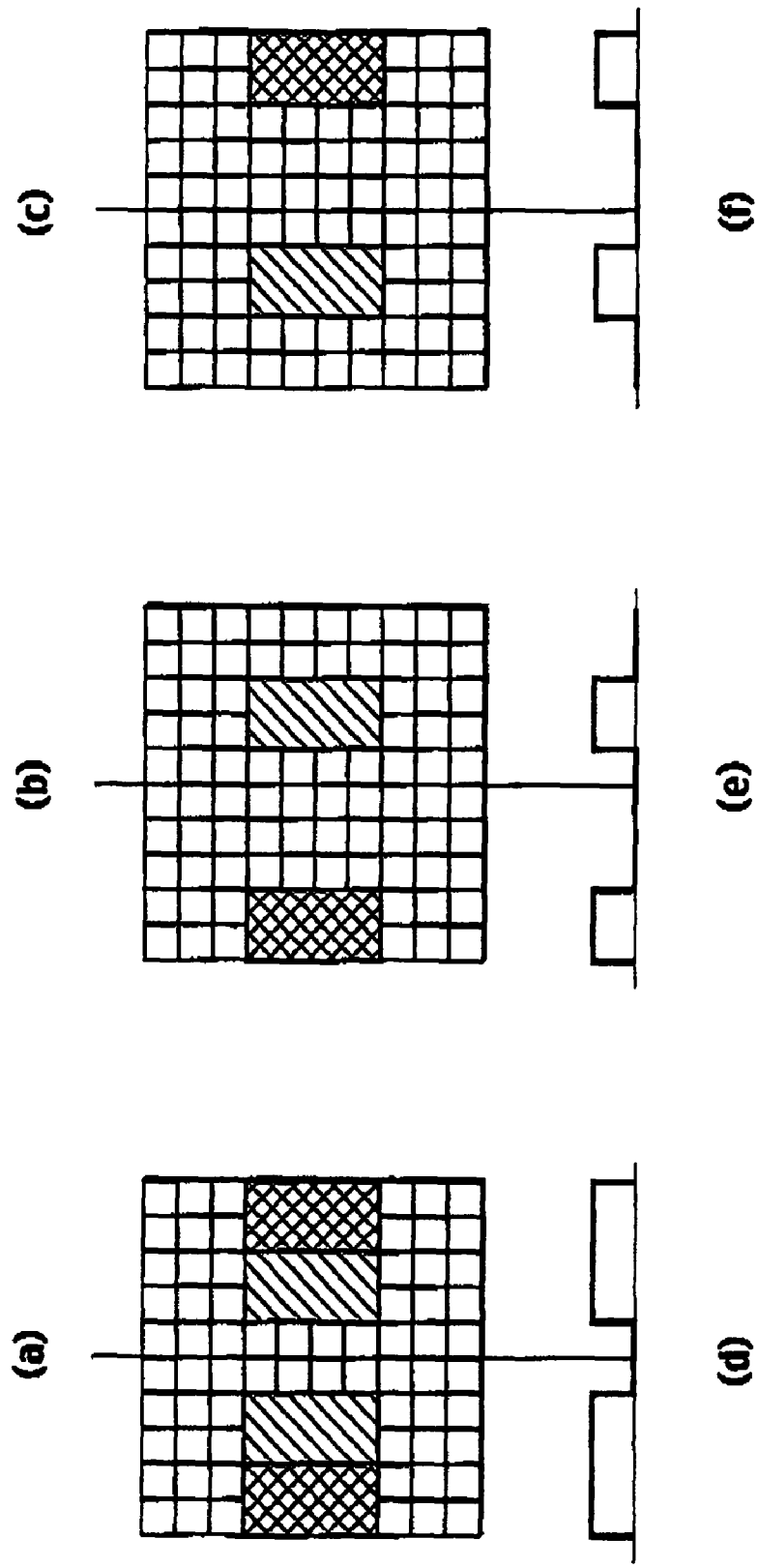
FIG. 44(a) is a view showing differences of R, G, B output images, as an example.
FIG. 44(b) is a view showing the differences of the R, G output images, as an example.
FIG. 44(c) is a view showing the differences of the G, B output images, as an example.
FIG. 44(d) to 44(f) are views showing signal outputs corresponding to FIGS. 44(a) to 44(c) respectively, as an example.

FIG. 44(a) is a view showing the differences of the R, G, B output images, FIG. 44(b) a view showing the differences of the R, G output images and FIG. 44(c) is a view showing the differences of the G, B output images.

As obvious from FIG. 44(b), the image shift amount calculation unit 56B of the CPU 56 calculates the RG difference per one line in the form of "4" pixels.

Next, the image shift amount calculation unit 56B of the CPU 56 calculates a BG difference representing a part where either the B output image or the G output image is generated (step S807). In detail, if defining a part where either the B output or the G output is generated as the BG difference, the BG difference per one line becomes "4" pixels.

Then, the image shift amount calculation unit 56B of the CPU 56 calculates a sum of the RG difference per line at step S805 and the BG difference at step S807, as the total of differences per line.

In FIG. 44(a), the image shift amount calculation unit 56B of the CPU 56 calculates the total of differences per line as 4+4="8" pixels.

Next, the image shift amount calculation unit 56B of the CPU 56 reads out the total of differences from the storage unit 74 (step S811).

Then, if the readout total of difference is a null value or if it is not the null value and the total of differences calculated at step S809 is smaller than the readout total of differences, the total of differences calculated at step 809 is stored in the storage unit 74 (step S813, S815).

Consequently, it is possible to acquire a minimum of the total of differences.

Next, the image shift amount calculation unit 568 of the CPU 56 shifts the R output image to right by one pixel and also shifts the B output image to left by one pixel, on the basis of the G output image (step S817).

FIG. 45(a) and FIG. 45(b) show respective R, B output images obtained by shifting the R, B output images to left and right by one pixel each, respectively. FIG. 45(c) and FIG. 45(d) show signal outputs corresponding to FIGS. 45(a) and 45(b), respectively.

Figure 46:
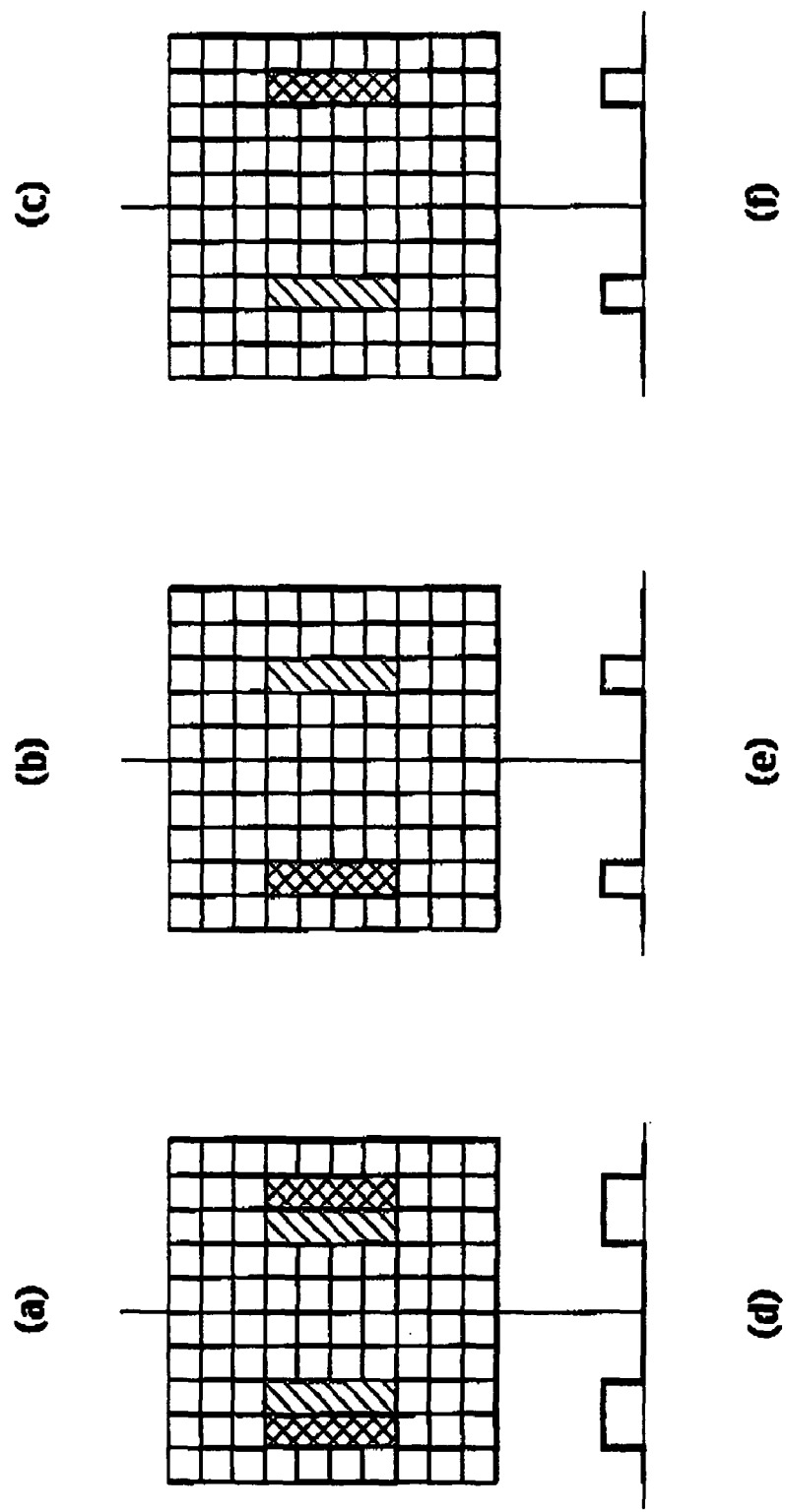
FIG. 46(a) is a view showing differences of R, G, B output images when shifting R, B output images to left and right by one pixel each, as an example.
FIG. 46(b) is a view showing the differences of the R, G output images, as an example.
FIG. 46(c) is a view showing the differences of the G, B output images, as an example.
FIGS. 46(d) to 46(f) are views showing signal outputs corresponding to FIGS. 46(a) to 46(c), as an example.

FIG. 46(a) shows differences of the R, G, B output images obtained by shifting the R, B output images to left and right by one pixel each. FIG. 46(b) shows the differences of the R, G output images, while FIG. 46(c) shows the differences of the G, B output images.

The image shift amount calculation unit 56B of the CPU 56 calculates the total of differences from FIGS. 46(a), 46(b) and 46(c) after shifting the R, B output images to left and right by one pixel each as shown in FIGS. 45(a) and 45(b) (steps S805 to S809).

As understood from FIG. 46(c), the image shift amount calculation unit 56B of the CPU 56 calculates a RG difference per line as "2" pixels (step S805).

Next, as understood from FIG. 46(c), the image shift amount calculation unit 56B of the CPU 56 calculates a BG difference per line as "2" pixels (step S807).

Then, the image shift amount calculation with 56B of the CPU 56 calculates a sum of the RG difference per line at step S805 and the BG difference at step S807. In the example of FIG. 46(a), the total of differences per line becomes 2+2="4" pixels (step S809).

Then, the image shift amount calculation unit 56B of the CPU 56 compares the calculated total of differences with the total of differences read out from the memory (step S813). In case of FIG. 46(a), as the calculated total of differences of "4" pixels is smaller than the total of differences of "8" pixels read out from the storage unit 74, the calculated total of differences of "4" pixels is overwritten onto the storage unit 74 (step S815).

In this way, the image shift amount calculation unit 56B of the CPU 56 shifts the R, G, B output images to left and right by one pixel each and totalizes differences of the outputs with respect to each pixel.

Further, when the positions of the R, G, B output images reach both ends in the horizontal direction, the image shift amount calculation unit 56B of the CPU 56 shifts the R, G, B output images by one pixel vertically. Thereafter, the image shift amount calculation unit 56B shifts the R, G, B output images up to both ends in the horizontal direction by one pixel and totalizes differences of the outputs with respect to each pixel.

Thus, by calculating the total of differences in this way, it is possible to calculate all of the totals of differences in condition of moving the R, B output images up to both ends in the horizontal and vertical directions and also possible to calculate minimum values.

Then, when moving the R, B output images up to both ends in the horizontal and vertical directions, the image shift amount calculation unit 56B of the CPU 56 regards the total of differences stored in the storage unit 74 as a minimum value and determines the positions of the R, B output images corresponding to the minimum value of the total of differences (step S821, S823). Continuously, based on the determined positions, the chromatic aberration correction unit 70B carries out the image shift correction due to chromatic aberration.

As mentioned above, by performing the image shift correction due to chromatic aberration from the output images directly, a user can confirm the taken image visually and more clearly.

(Variation 6)

Although the lens system 3 is illustrated in the form of one block in the image fluctuation correction device of this embodiment shown in FIG. 25, the lens system 3 is formed by plural groups of lenses actually.

Figure 47:
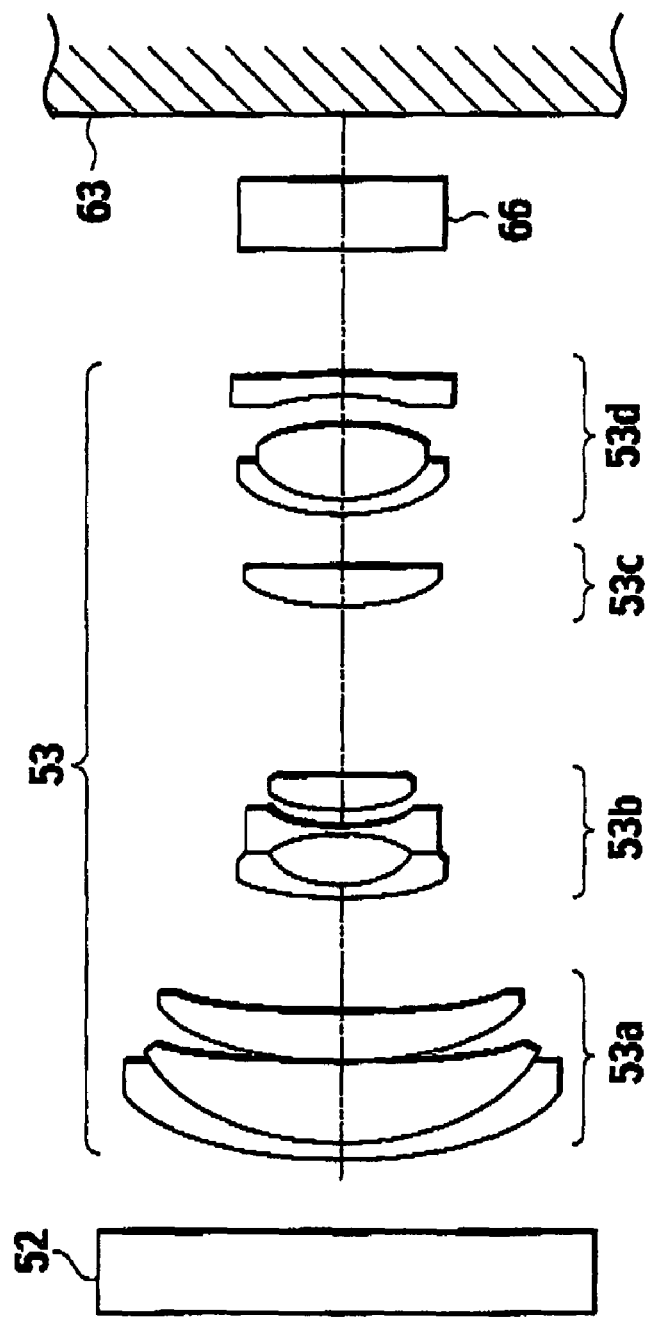
FIG. 47 is a view showing a lens system of FIG. 25.

FIG. 47 is a view showing the lens system 53 of FIG. 25. FIG. 48 includes views showing arrangements among the correction unit 52 of FIG. 25, the lens system 53 and the others. FIG. 48(a) is a view showing the arrangement where the correction unit is arranged in the lens system. FIG. 48(b) is a view showing the arrangement where the correction unit is arranged behind the lens system.

The lens system 53 comprises first to fourth lens groups 53a to 53d. Behind the lens system 53, there are an optical low-pass filter 66 for suppressing noise (false signal), which is not shown in FIG. 25 and the CCD unit 63 for forming a subject image.

In FIG. 25, the correction unit 52 is arranged in front of the lens system 53, as shown in FIG. 47 also. However, the correction unit 52 may be arranged inside the lens system 53, as shown in FIG. 48(a). Alternatively, as shown in FIG. 48(b), the correction unit 52 may be arranged behind the lens system 53. Consequently, as the correction unit 52 is arranged in a narrow part of light flux passing through the lens system 53, it is possible to miniaturize the correction unit 52.

Although the correction unit 52 includes the fixed prism 59 and the movable prisms 60A, 60B as shown in FIG. 27, the fixed prism 59 may be deleted from the device. Alternatively, a further fixed prism may be added to the device.

Figure 49:
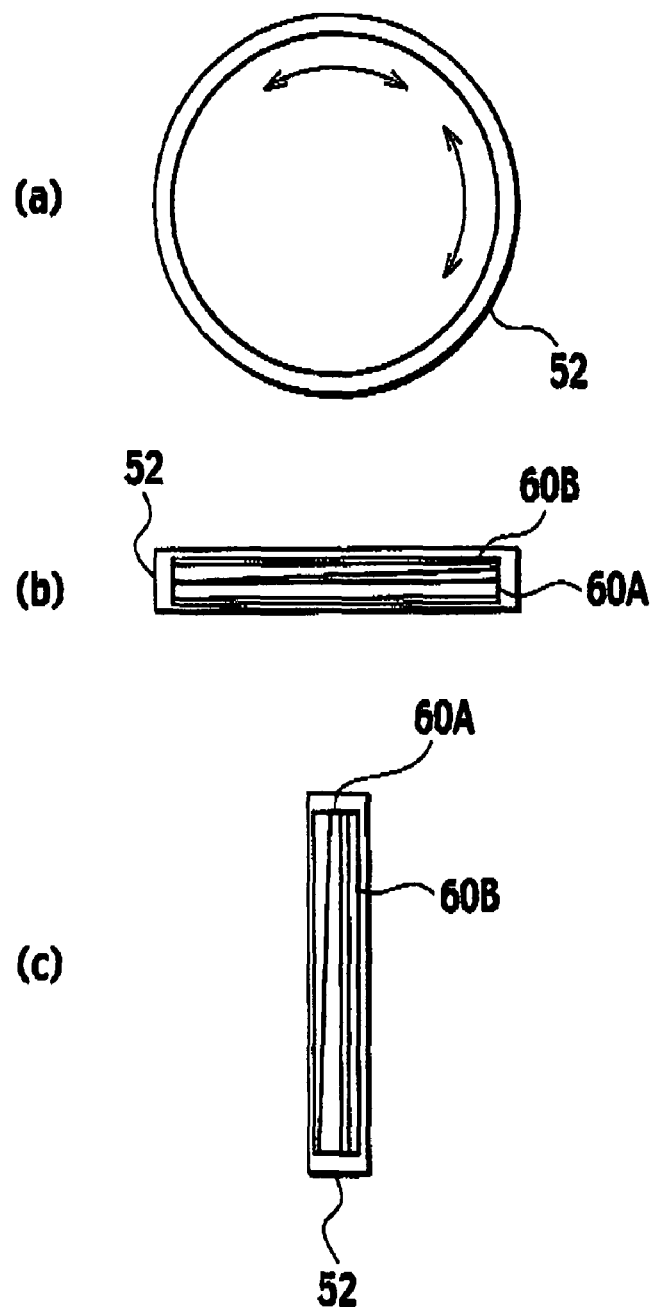

FIG. 49 is a view showing a correction unit with no fixed prism as another form of the correction unit 52. FIG. 49(a) is a front view of the unit, FIG. 49(b) a plan view, and FIG. 49(c) is a side view. Additionally, FIG. 50 is a view showing a correction unit with two sheets of fixed prisms as the other form of the correction unit 52. FIG. 50(a) is a front view of the unit, FIG. 50(b) a plan view, and FIG. 50(c) is a side view.

In the arrangement of FIG. 50, the positions of respective prisms are adjusted so that an incident angle becomes equal to an emitting angle about the correction unit 52 in the initial state. In common with FIGS. 49 and 50, the other operations are similar to those in the above-mentioned embodiment. Accordingly, the similar effects would be provided in this case.

In FIG. 49, as the shown arrangement is provided with two movable prisms 60A, 60B only, the image is shifted in the initial state by the image shift angle θ, as obvious from FIG. 32(b). However, such a condition does not have direct connection with the image fluctuation correction.

It should be noted that the arrangement of FIG. 49 causes the image shift due to chromatic aberration to be increased in comparison with the arrangements of FIGS. 27 and 50. That is although the correction unit in common with FIGS. 27 and 50 is constructed so that the fixed prism 59 makes an incident angle on the unit 52 equal to the emitting angle in the initial state, the arrangement comes from the purpose of minimizing the influence of prism effect at the image fluctuation correction on the chromatic aberration thereby to reduce an amount of the image shift correction derived therefrom. On the contrary, as the correction unit of FIG. 49 eliminates the bred prim 59, the incident angle does not become equal to the emitting angle in the initial state. Comparing with the arrangements of FIGS. 27 and 50, therefore, the image shift due to chromatic aberration gets so large as to cause an increasing of an amount required for correcting the image shift due to chromatic aberration. On the other hand, the arrangement of FIG. 49 with no fixed prism allows a length of the correction unit 52 in the direction of the optical axis to be shortened for its miniaturization.

Alternatively, the device may be designed so as to stile a balance between the effect of reducing the correction amount against the image shift due to chromatic aberration and the effect of miniaturization. Then, the correction amount of the image shift due to chromatic aberration is not so great as that of FIG. 49, while the correction unit 52 can be small-sized in comparison with the units of FIGS. 27 and 50. That is, the prism angle of the fixed prism 59 may be adjusted so that the amount of the image shift due to chromatic aberration has an intermediate value between the image shift of FIG. 49 and that of FIGS. 27 and 50. With this adjustment, it is possible to strike a balance between the effect of reducing the correction amount against the image shift due to chromatic aberration and the effect of miniaturizing the correction unit 52.

Figure 51:
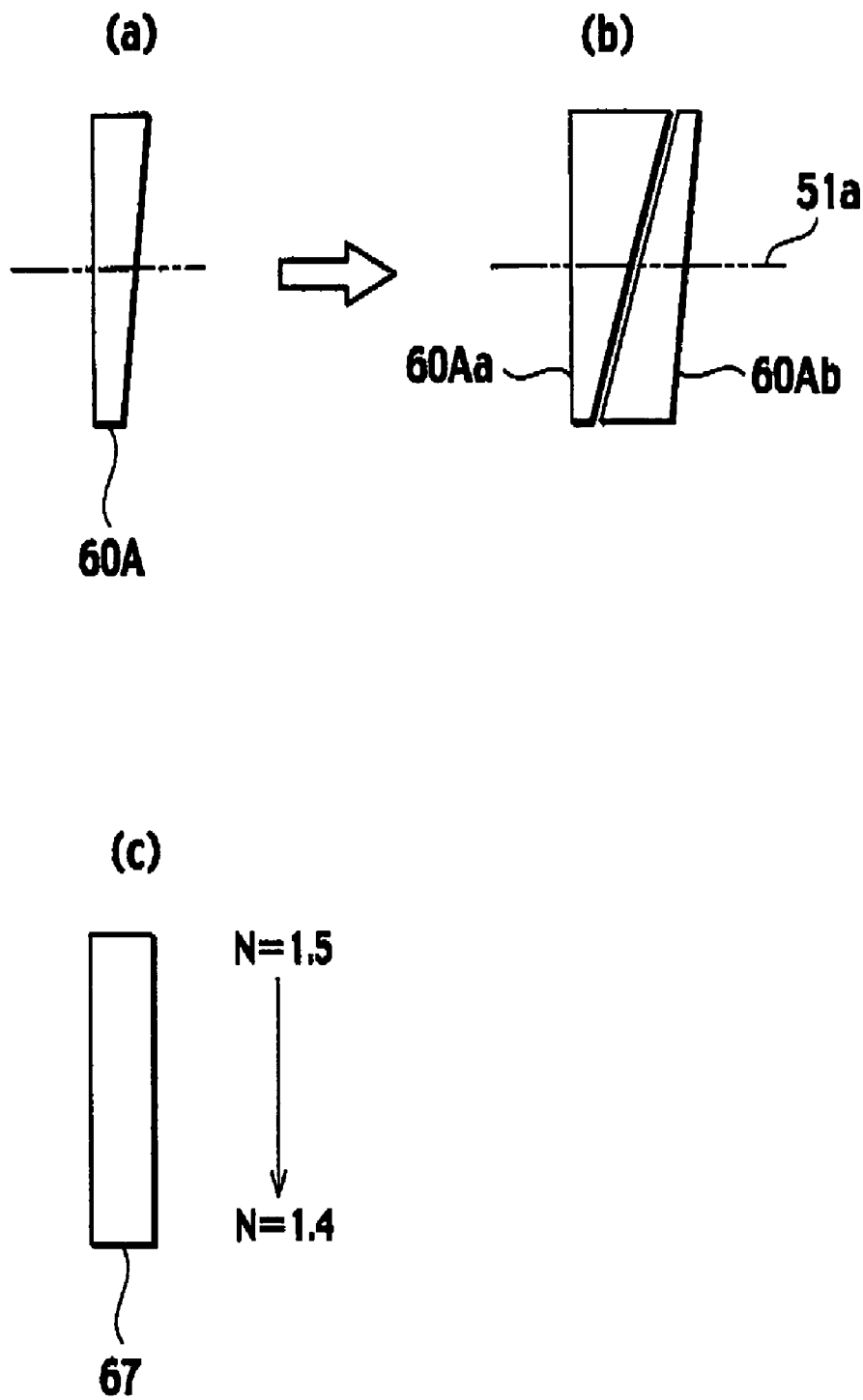

Additionally, each of the prisms in the embodiments of FIGS. 27, 49 and 50 may be provided in the form of a simplex prism or a compound prism. Alternatively, the prism may be formed by a parallel plate having prism effect. FIG. 51 illustrates the other constitution of the prism of the present invention. FIG. 51(a) is a view showing such a simplex prism, FIG. 51(b) a view of such a compound prism, and FIG. 51(c) is a view showing such a parallel plate having prism effect.

For instance, as shown in FIG. 51(b), the movable prism 60A may be provided in the form of a compound prism produced by bonding two sheets of prisms 60Aa, 60Ab with minute angles. In case of this compound prism, it is possible to greaten an angle of each prism body, facilitating a production of a minute-angle prism that could be formed by a simplex prism with difficulty.

Further, as shown in FIG. 51(c), each prism may be replaced by a parallel plate 17 having prism effect with a refraction index N changed from N=1.5 to N=1.4. Although the prism is usually required to control its inclination angle in the course of production, the provision of the parallel plate 17 would facilitate a processing of the prism.

INDUSTRIAL APPLICABILITY

As obvious from the above descriptions, according to the still image acquisition device of the present invention, it is possible to minimize an image shift produced by chromatic aberration in acquiring a still image out of images imaged upon correcting their fluctuations, providing a user with a clear still image. Additionally, according to the image fluctuation correction device of the present invention, it is possible to correct an image shift due to chromate aberration of a refractive element in non-optical manner, enabling a user to confirm a taken image visually and more clearly.

The invention claimed is:

1. A still image acquisition device that corrects fluctuation of images caused by shakes of an imaging device having an image sensor to convert a subject image by incident light through an optical lens to an electrical signal thereby to obtain images and that acquires a still image from corrected hand shake-corrected images, the still image acquisition device comprising:
  a fluctuation detection unit for detecting a horizontal or a vertical fluctuation generated in the imaging device;
  light refraction means arranged on an optical path up to the image sensor, for refracting the light into an arbitrary direction;
  hand shake control means for controlling a refraction direction of the light by the light refraction means so as to cancel the fluctuation detected by the fluctuation detection unit;
  control amount detection means for detecting control amounts of the light refraction means controlled by the hand shake control means;
  hand shake angle calculation means for calculating a hand shake angle in either a horizontal direction or a vertical direction from the control amounts detected by the control amount detection means;
  storing means for storing:
    a plurality of hand shake-corrected images read out by the image sensor within a predetermined period, information specifying respective imaging times of the plurality of hand shake-corrected images; and
    the hand shake angle in either the horizontal direction or the vertical direction calculated by the hand shake angle calculation means
  in a storage unit, in coordination with each other;
  acquisition reference time decision means that decides an acquisition reference time when receiving a command signal requiring an acquisition of the still image, the still image according to:
    a first time when the absolute value of the hand shake angle of the horizontal direction or the vertical direction calculated by the hand shake angle calculation means is zero or a minimum value, or a second time when the absolute value of the hand shake angle in either the horizontal direction or the vertical direction stored in the storage unit is zero or a minimum value; and in case of deciding the second time as the acquisition reference time, a still image processing unit that acquires, as the still image, the hand shake-corrected image read out by the image sensor immediately after or before the acquisition reference time decided by the acquisition reference time decision means, the hand shake-corrected image being stored in the storage unit.

2. The still image acquisition device of claim 1, wherein the acquisition reference time decision means decides the acquisition reference time for acquiring the still image according to a time when, in either the hand shake angle of the horizontal or vertical direction calculated by the hand shake angle calculation means or the hand shake angle of the horizontal or vertical direction stored in the storage unit, an absolute value of one hand shake angle becomes zero or a minimum value in advance of the other hand shake angle.

3. The still image acquisition device of claim 1, wherein, in case that the hand shake angle calculated by the hand shake angle calculation means or the hand shake angle of the horizontal or vertical direction stored in the storage unit does not become zero or a minimum value within a predetermined acquisition limit period, the acquisition reference time decision means decides the acquisition reference time for acquiring the still image according to a time when the predetermined acquisition limit period has passed.

4. A still image acquisition device that corrects fluctuation of images caused by shakes of an imaging device having an image sensor to convert a subject image by incident light through an optical lens to an electrical signal thereby to obtain images and that acquires a still image from corrected hand shake-corrected images, the still image acquisition device comprising:

a fluctuation detection unit for detecting a horizontal or a vertical fluctuation generated in the imaging device;

light refraction means arranged on an optical path up to the image sensor, for refracting the light into an arbitrary direction;

hand shake control means for controlling a refraction direction of the light by the light refraction means so as to cancel the fluctuation detected by the fluctuation detection unit;

control amount detection means for detecting control amounts of the light refraction means controlled by the hand shake control means;

hand shake angle calculation means for calculating a band shake angle in either a horizontal direction or a vertical direction from the control amounts detected by the control amount detection means;

storing means for storing:
a plurality of hand shake-corrected images read out by the image sensor immediately after the hand shake angle of the horizontal direction or the vertical direction calculated by the hand shake angle calculation means is zero; and
information specifying respective imaging times of the plurality of hand shake-corrected images in a storage unit, in coordination with each other;

acquisition reference time decision means that decides an acquisition reference time when receiving a command signal requiring an acquisition of the still image, the still image according to:
a first time when the absolute value of the hand shake angle of the horizontal direction or the vertical direction calculated by the hand shake angle calculation means is zero or a minimum value, or a second time when the hand shake angle in either the horizontal direction or the vertical direction stored in the storage unit is zero; and in case of deciding the second time as the acquisition reference time, a still image processing unit that acquires, as the still images the hand shake-corrected image read out by the image sensor immediately after the acquisition reference time decided by the acquisition reference time decision means, the hand shake-corrected image being stored in the storage unit.

5. The still image acquisition device of claim 4, wherein the acquisition reference time decision means decides the acquisition reference time for acquiring the still image according to a time when, in either the hand shake angle of the horizontal or vertical direction calculated by the hand shake angle calculation means or the hand shake angle of the horizontal or vertical direction stored in the storage unit, an absolute value of one hand shake angle becomes zero or a minimum value in advance of the other hand shake angle.

6. The still image acquisition device of claim 4, wherein, in case that the hand shake angle calculated by the hand shake angle calculation means or the hand shake angle of the horizontal or vertical direction stored in the storage unit does not become zero or a minimum value within a predetermined acquisition limit period, the acquisition reference time decision means decides the acquisition reference time for acquiring the still image according to a time when the predetermined acquisition limit period has passed.

7. A still image acquisition method of correcting fluctuation of images caused by shakes of an imaging device having an image sensor to convert a subject image by incident light through an optical lens to an electrical signal thereby acquiring a still image from corrected hand shake-corrected images, the still image acquisition method comprising:

a fluctuation detection step of detecting a horizontal or a vertical fluctuation generated in the imaging device;

a hand shake control step of controlling a refraction direction of the light by light refraction means arranged on an optical path up to the image sensor so as to cancel the fluctuation detected by the fluctuation detection step;

a control amount detection step of detecting control amounts of the light refraction means controlled by the hand shake control step;

a hand shake angle calculation step of calculating a hand shake angle, in either a horizontal direction or a vertical direction from the control amounts detected by the control amount detection step;

a storing step of storing:
a plurality of hand shake-corrected images read out by the image sensor within a predetermined period;
information specifying respective imaging times of the plurality of hand shake-corrected images; and
the hand shake angle in either the horizontal direction or the vertical direction calculated by the hand shake angle calculation step in a storage unit, in coordination with each other;

an acquisition reference time decision steps of deciding an acquisition reference time when receiving a command signal requiring an acquisition of the still image, the still image according to:
a first time when the absolute value of the hand shake angle of the horizontal direction or the vertical direction calculated by the hand shake angle calculation step is zero or a minimum value, or a second time when the absolute value of the hand shake angle in either the horizontal direction or the vertical direction stored in the storage unit is zero or a minimum value; and in case of deciding the second time as the acquisition reference time, a still image processing step of acquiring, as the still image, the hand shake-corrected image read out by the image sensor immediately after or before the acquisition reference time decided by the acquisition reference time decision step, the hand shake-corrected image being stored in the storage unit.

8. The still image acquisition method of claim 7, wherein the acquisition reference time decision step is formed by deciding the acquisition reference time for acquiring the still image according to a time when, in either the hand shake angle of the horizontal or vertical direction calculated by the band shake angle calculation step or the hand shake angle of the horizontal or vertical direction stored in the storage unit, an absolute value of one hand shake angle becomes zero or a minimum value in advance of the other hand shake angle.

9. The still image acquisition method of claim 7, wherein, in case that the hand shake angle calculated by the hand shake angle calculation step or the hand shake angle of the horizontal or vertical direction stored in the storage unit does not become zero or a minimum value within a predetermined acquisition limit period, the acquisition reference time decision step is formed by deciding the acquisition reference time for acquiring the still image according to a time when the predetermined acquisition limit period has passed.

10. A still image acquisition method of acquiring a still image from corrected hand shake-corrected images which are obtained by correcting fluctuation of images due to shakes of an imaging device having an image sensor to convert a subject image by incident light through an optical lens to an electrical signal, the still image acquisition method comprising:
  a fluctuation detection step of detecting a horizontal or a vertical fluctuation generated in the imaging device;
  a hand shake control step of controlling a refraction direction of the light by light refraction means arranged on an optical path up to the image sensor so as to cancel the fluctuation detected by the fluctuation detection step;
  a control amount detection step of detecting control amounts of the light refraction means controlled by the hand shake control step;
  a hand shake angle calculation step of calculating a hand shake angle in either a horizontal direction or a vertical direction from the control amounts detected by the control amount detection step;
  a storing step of storing:
    a plurality of hand shake-corrected images read out by the image sensor immediately after the hand shake angle of the horizontal direction or the vertical direction calculated by the hand shake angle calculation means is zero; and
    information specifying respective imaging times of the plurality of hand shake-corrected images
  in a storage unit, in coordination with each other;
  an acquisition reference time decision step of deciding an acquisition reference time when receiving a command signal requiring an, acquisition of the still image, the still image according to:
    a first time when the absolute value of the hand shake angle of the horizontal direction or the vertical direction calculated by the hand shake angle calculation step is zero or a minimum value,
    or a second time when the hand shake angle in either the horizontal direction or the vertical direction stored in the storage unit is zero; and
  in case of deciding the second time as the acquisition reference time, a still image processing step of acquiring, as the still image, the hand shake-corrected image read out by the image sensor immediately after the acquisition reference time decided by the acquisition reference time decision step, the hand shake-corrected image being stored in the storage unit.

11. The still image acquisition method of claim 10, wherein the acquisition reference time decision step is formed by deciding the acquisition reference time for acquiring the still image according to a time when, in either the hand shake angle of the horizontal or vertical direction calculated by the hand shake angle calculation step or the hand shake angle of the horizontal or vertical direction stored in the storage unit, an absolute value of one hand shake angle becomes zero or a minimum value in advance of the other hand shake angle.

12. The still image acquisition method of claim 10, wherein:
  in case that the hand shake angle calculated by the hand shake angle calculation step or the hand shake angle of the horizontal or vertical direction stored in the storage unit does not become zero or a minimum value within a predetermined acquisition limit period, and wherein
  the acquisition reference time decision step is formed by deciding the acquisition reference time for acquiring the still image according to a time when the predetermined acquisition limit period has passed.

* * * * *